(12) United States Patent
Lee

(10) Patent No.: US 12,184,826 B2
(45) Date of Patent: Dec. 31, 2024

(54) METHOD AND DEVICE FOR TRANSMITTING IMAGE CONTENT USING EDGE COMPUTING SERVICE

(71) Applicant: SAMSUNG ELECTRONICS CO., LTD., Suwon-si (KR)

(72) Inventor: Jaehong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 18/070,347

(22) Filed: Nov. 28, 2022

(65) Prior Publication Data

US 2023/0091348 A1 Mar. 23, 2023

Related U.S. Application Data

(63) Continuation of application No. PCT/KR2021/006690, filed on May 28, 2021.

(30) Foreign Application Priority Data

May 28, 2020 (KR) .......... 10-2020-0064596

(51) Int. Cl.
*H04N 13/194* (2018.01)
*H04N 13/156* (2018.01)
*H04N 13/161* (2018.01)
*H04N 19/117* (2014.01)

(52) U.S. Cl.
CPC ......... *H04N 13/194* (2018.05); *H04N 13/156* (2018.05); *H04N 13/161* (2018.05); *H04N 19/117* (2014.11)

(58) Field of Classification Search
CPC .. H04N 13/194; H04N 13/156; H04N 13/161; H04N 19/117
See application file for complete search history.

(56) References Cited

U.S. PATENT DOCUMENTS

| 5,959,672 | A | 9/1999 | Sasaki |
| 10,169,846 | B2 | 1/2019 | Stafford et al. |
| 10,424,097 | B2 | 9/2019 | Vembar et al. |
| 2001/0036321 | A1* | 11/2001 | Kishi ............ H04N 19/70 375/E7.048 |

(Continued)

FOREIGN PATENT DOCUMENTS

| EP | 2 815 572 | 10/2013 |
| JP | 4052285 | 2/2008 |

(Continued)

OTHER PUBLICATIONS

Extended Search Report dated Aug. 3, 2023 in European Patent Application No. 21814297.4.

(Continued)

*Primary Examiner* — Mohamed A. Wasel
(74) *Attorney, Agent, or Firm* — Nixon & Vanderhye, P.C.

(57) ABSTRACT

An example method, performed by an edge data network, of transmitting image content, includes obtaining azimuth information and focal position information from an electronic device connected to the edge data network, and generating a filtered first partial image by performing filtering on a first partial image corresponding to the azimuth information by using one filter determined based on the focal position information.

15 Claims, 39 Drawing Sheets

(56) References Cited

U.S. PATENT DOCUMENTS

| | | | | |
|---|---|---|---|---|
| 2008/0247654 | A1* | 10/2008 | Morikawa | G11B 27/329 |
| | | | | 386/E5.072 |
| 2012/0327206 | A1* | 12/2012 | Nonogaki | G06F 3/011 |
| | | | | 348/E7.085 |
| 2014/0092006 | A1 | 4/2014 | Boelter et al. | |
| 2017/0085915 | A1* | 3/2017 | Kuusela | H04N 19/30 |
| 2017/0287112 | A1 | 10/2017 | Stafford et al. | |
| 2018/0262758 | A1 | 9/2018 | El-Ghoroury et al. | |
| 2019/0007681 | A1* | 1/2019 | Tsai | H04N 19/18 |
| 2019/0253743 | A1 | 8/2019 | Tanaka et al. | |
| 2019/0273910 | A1 | 9/2019 | Malaika | |
| 2019/0320184 | A1* | 10/2019 | Zhu | H04N 19/166 |
| 2019/0356894 | A1 | 11/2019 | Oh et al. | |
| 2019/0361526 | A1 | 11/2019 | Young et al. | |
| 2019/0364205 | A1 | 11/2019 | Wozniak et al. | |
| 2020/0007905 | A1 | 1/2020 | Han et al. | |
| 2020/0014940 | A1 | 1/2020 | Dawar et al. | |
| 2020/0021791 | A1 | 1/2020 | Hur et al. | |
| 2020/0045288 | A1 | 2/2020 | Boyce | |

FOREIGN PATENT DOCUMENTS

| | | |
|---|---|---|
| KR | 10-2015-0034804 | 4/2015 |
| KR | 10-2018-0052255 | 5/2018 |
| KR | 10-2019-0106306 | 9/2019 |
| KR | 10-2046713 | 11/2019 |
| WO | 2013/148002 | 10/2013 |
| WO | 2020/006291 | 1/2020 |
| WO | 2020/079320 | 4/2020 |

OTHER PUBLICATIONS

Shi, Shu, et al., "Freedom: Fast Recovery Enhanced VR Delivery Over Mobile Networks," Proceedings of the 17th Annual International Conference On Mobile Systems, Applications, and Services, Jun. 12, 2019, pp. 130-141.

International Search Report (with translation) for PCT/KR2021/006690, dated Sep. 3, 2021, 5 pages.

Huawei Ilab, Cloud VR Bearer Networks, TR26.928, Oct. 2017, 36 Pages.

Pico, G2VR, https://www.pico-interactive.com/kr/G2_4K.html, 5 pages.

3GPP TR 26.928, V16.0.0, $3^{rd}$ Generation Partnership Project, Technical Specification Group Services and System Aspects, Extended Reality (XR) in 5G, Mar. 2020, 131 pages.

Office Action dated Jul. 19, 2024 in Chinese Patent Application No. 202180038761.4 and English-language translation.

Communication pursuant to Article 94(3) EPC dated Sep. 16, 2024 in European Patent Application No. 21814297.4.

* cited by examiner

FIG. 11B
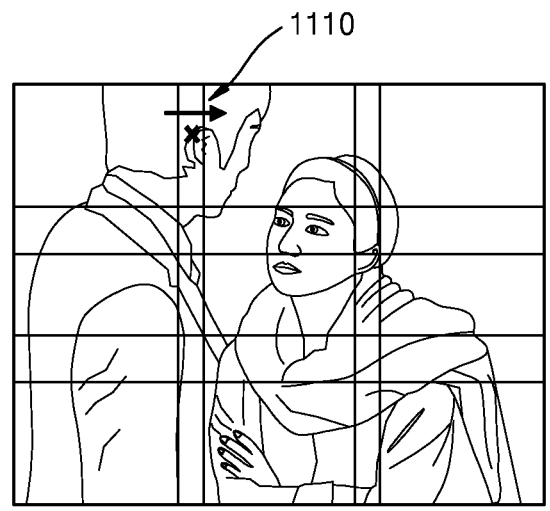
APPLICATION OF FILTER b
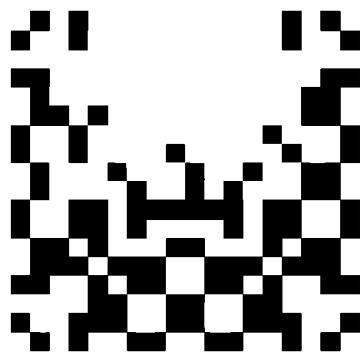

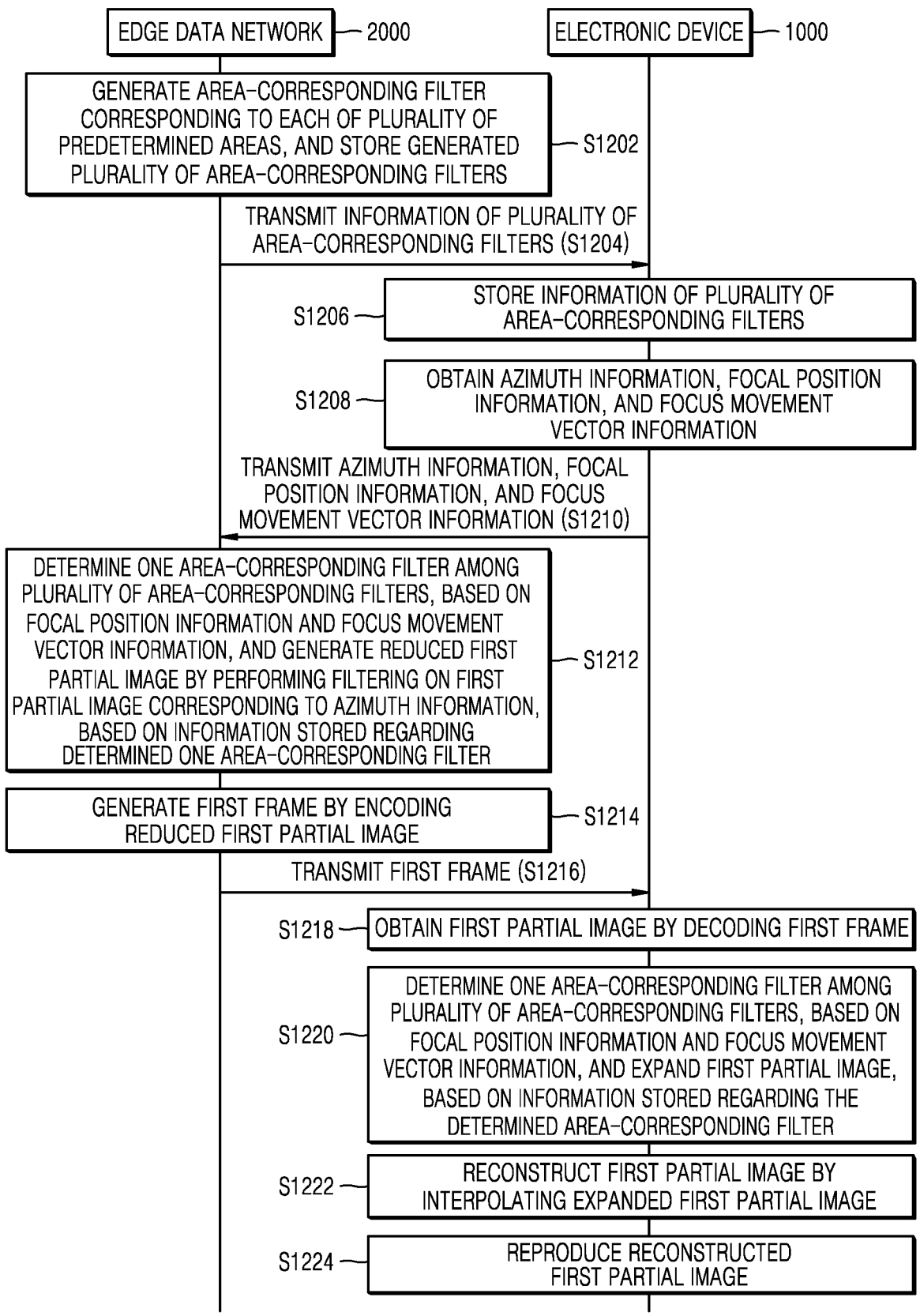

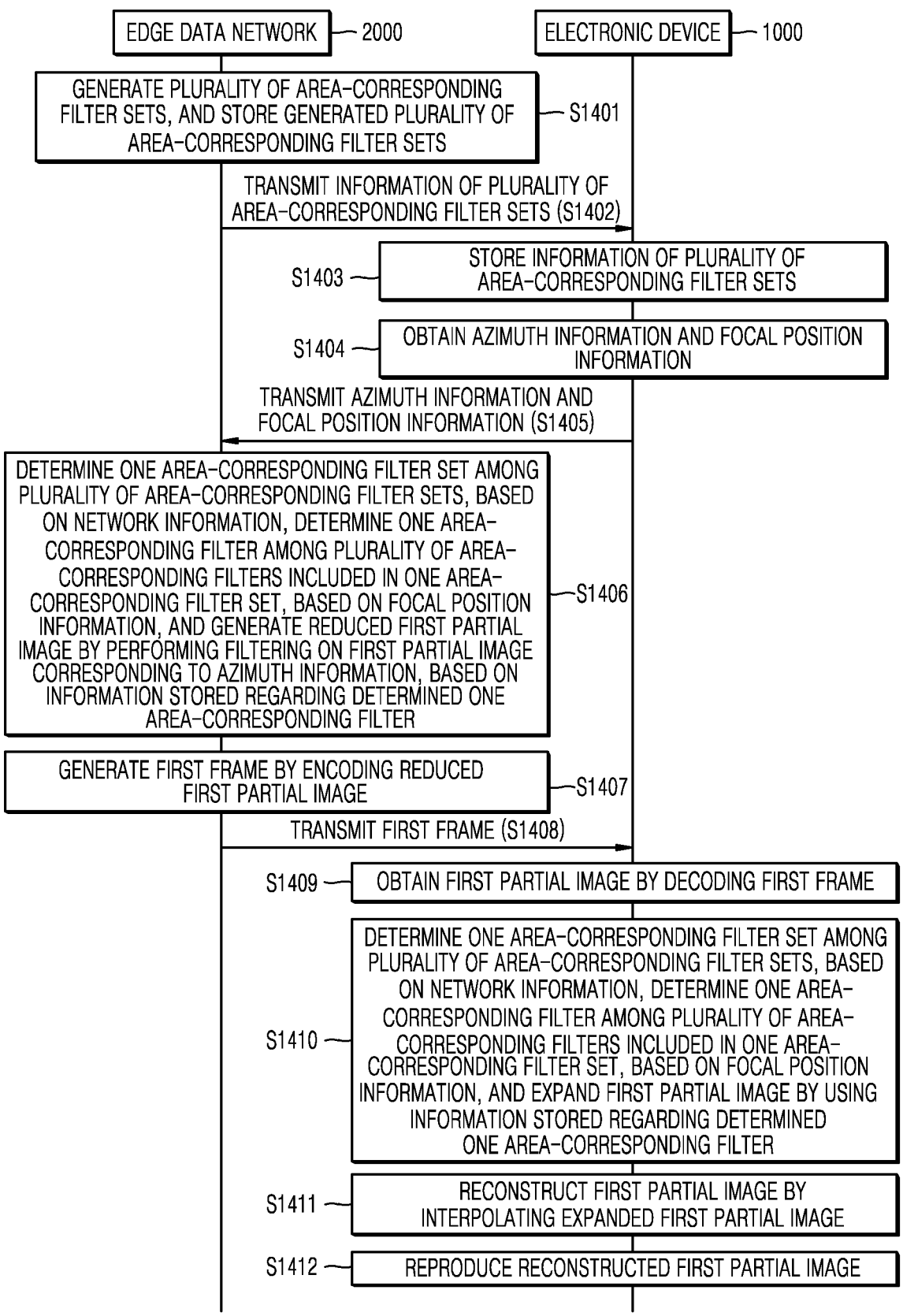

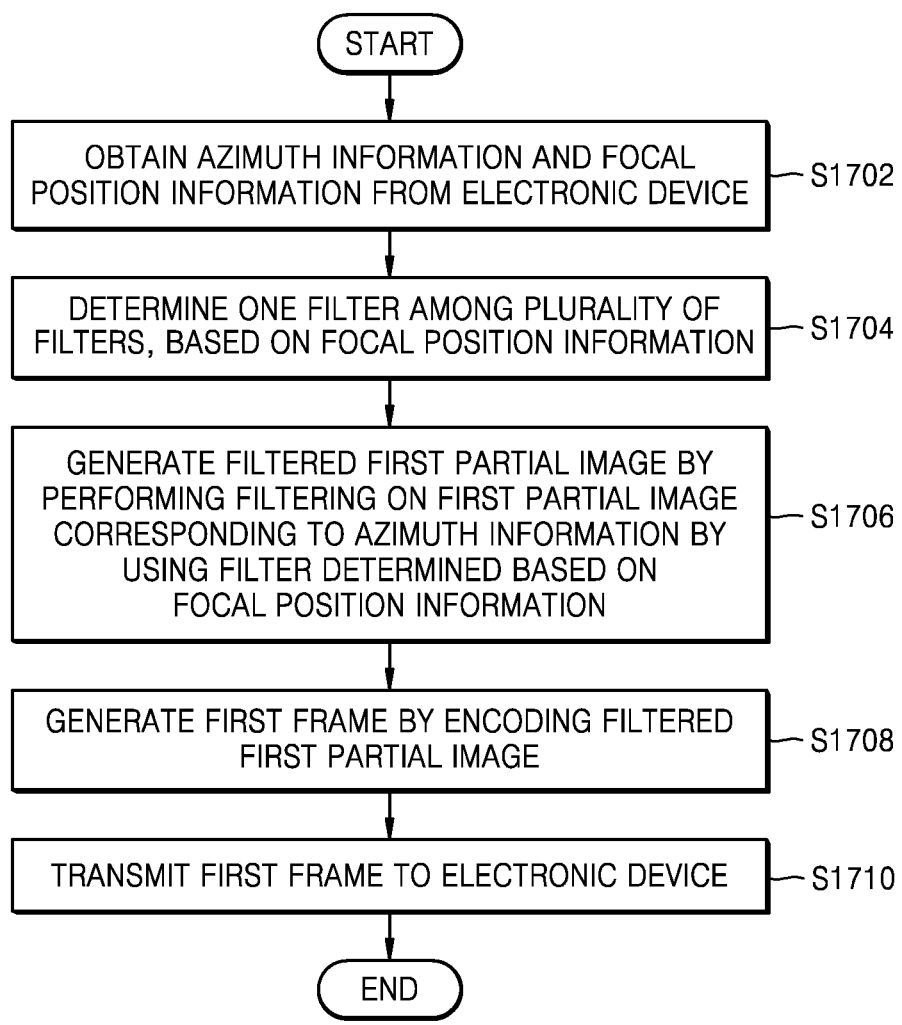

METHOD AND DEVICE FOR TRANSMITTING IMAGE CONTENT USING EDGE COMPUTING SERVICE

CROSS-REFERENCE TO RELATED APPLICATIONS

This application is a continuation of International Application No. PCT/KR2021/006690 designating the United States, filed on May 28, 2021, in the Korean Intellectual Property Receiving Office and claiming priority to Korean Patent Application No. 10-2020-0064596, filed on May 28, 2020, in the Korean Intellectual Property Office, the disclosures of each of which are incorporated by reference herein in their entireties.

BACKGROUND

Field

The disclosure relates to a method and a device for transmitting image content using an edge computing service (e.g., a multi-access edge computing (MEC) service).

Description of Related Art

Recently, edge computing technology for transmitting data using an edge server has been discussed. Edge computing technology may include, for example, multi-access edge computing (MEC) or fog computing (FOC). Edge computing technology may, for example, refer to technology for providing data to an electronic device via a separate server (hereinafter, referred to as an 'edge data network' or an 'MEC server') provided at a location geographically close to the electronic device, for example, inside or around a base station. For example, an application requiring low latency among at least one application installed in an electronic device may transmit and receive data via an edge server provided at a geographically close location, rather than via a server located in an external data network (DN) (e.g., the Internet).

Recently, a service using edge computing technology (hereinafter, referred to as an 'MEC-based service' or 'MEC service') has been discussed, and research and development of electronic devices to support MEC-based services have been conducted. For example, an application of an electronic device may transmit and receive edge computing-based data to and from an edge server (or an application of the edge server) in an application layer.

Along with the progress of research and development to support MEC-based services, techniques for providing high-resolution image content to an electronic device using MEC have been discussed.

SUMMARY

Based on the above-described discussions, the disclosure relates to a method and a device for transmitting image content by using an edge computing service.

Example embodiments of the disclosure provide a method, performed by an edge data network, of transmitting image content to an electronic device, and the edge data network for providing the image content to the electronic device.

In addition, example embodiments provide a method, performed by an electronic device, of receiving image content from an edge data network, and the electronic device for receiving image content from the edge data network.

According to an embodiment, a method, performed by an edge data network, includes obtaining azimuth information and focal position information from an electronic device connected to the edge data network; determining one filter among a plurality of filters, based on the focal position information; generating a filtered first partial image by performing filtering on a first partial image corresponding to the azimuth information by using the filter determined based on the focal position information; generating a first frame by encoding the filtered first partial image; and transmitting the generated first frame to the electronic device.

The first partial image may be a partial image within a first VR image having a predetermined frame index of a VR sequence including a plurality of frames, and the first partial image may include azimuth information indicating a location of the partial image.

The method may further include generating information of an area-corresponding filter corresponding to each of a plurality of predetermined areas within an image; storing the generated information of the plurality of area-corresponding filters; and transmitting the information of the plurality of area-corresponding filters to the electronic device.

The determining of the one filter among the plurality of filters, based on the focal position information, may include determining one of the plurality of areas, based on the focal position information, and determining an area-corresponding filter corresponding to the determined area.

The generating of the filtered first partial image by performing filtering on the first partial image corresponding to the azimuth information using the one filter determined based on the focal position information may include generating a reduced first partial image by performing filtering on the first partial image corresponding to the azimuth information, based on information stored regarding the area-corresponding filter corresponding to the determined area.

The transmitting of the generated first frame to the electronic device may include transmitting the generated first frame and index information indicating one of the plurality of area-corresponding filters.

The obtaining of the azimuth information and the focal position information from the electronic device connected to the edge data network may include obtaining the azimuth information, the focal position information, and focus movement vector information from the electronic device.

The determining of the one filter among the plurality of filters, based on the focal position information, may include determining one area-corresponding filter among the plurality of area-corresponding filters, based on the focal position information and the focus movement vector information.

The generating of the filtered first partial image by performing filtering on the first partial image corresponding to the azimuth information by using the one filter determined based on the focal position information may include generating a reduced first partial image by performing filtering on the first partial image corresponding to the azimuth information, based on information stored regarding the determined one area-corresponding filter.

The focal position information may include first focal position information and second focal position information.

The determining of the one filter among the plurality of filters, based on the focal position information, may include determining one area-corresponding filter among a plurality of area-corresponding filters, based on the second focal position information and the second focal position information.

The generating of the filtered first partial image by performing filtering on the first partial image corresponding to the azimuth information using the one filter determined based on the focal position information may include generating a reduced first partial image by performing filtering on the first partial image corresponding to the azimuth information by using the determined one filter.

The method may further include generating information of a plurality of area-corresponding filter sets; storing the generated information of the generated plurality of area-corresponding filter sets; and transmitting the information of the plurality of area-corresponding filter sets to the electronic device.

Each of the plurality of area-corresponding filter sets may include an area-corresponding filter corresponding to each of a plurality of predetermined areas within an image.

The determining of the one filter among the plurality of filters, based on the focal position information, may include determining one area-corresponding filter set among the plurality of area-corresponding filters, based on network information, and determining one area-corresponding filter among a plurality of area-corresponding filters included in the one area-corresponding filter set, based on the focal position information.

The generating of the filtered first partial image by performing filtering on the first partial image corresponding to the azimuth information by using the one filter determined based on the focal position information may include generating a reduced first partial image by performing filtering on the first partial image corresponding to the azimuth information, based on the determined one area-corresponding filter.

The transmitting of the generated first frame to the electronic device may include transmitting the generated first frame and first index information indicating one area-corresponding filter set from among the plurality of area-corresponding filters to the electronic device.

The transmitting of the generated first frame and the first index information to the electronic device may include transmitting the generated first frame, the first index information, and second index information indicating one area-corresponding filter included in the one area-corresponding filter set to the electronic device.

The method may further include generating information of a plurality of area-corresponding filter sets; storing the generated information of the generated plurality of area-corresponding filter sets; and transmitting the information of the plurality of area-corresponding filter sets to the electronic device.

Each of the plurality of area-corresponding filter sets may include an area-corresponding filter corresponding to each of a plurality of predetermined areas within an image.

The obtaining of the azimuth information and the focal position information from the electronic device connected to the edge data network may include obtaining the azimuth information, the focal position information, and focus movement vector information from the electronic device.

The determining of the one filter among the plurality of filters, based on the focal position information, may include determining one area-corresponding filter set among the plurality of area-corresponding filters, based on the focal position information and the focus movement vector information, and determining one area-corresponding filter among a plurality of area-corresponding filters included in the one area-corresponding filter set, based on the focal position information.

The generating of the filtered first partial image by performing filtering on the first partial image corresponding to the azimuth information by using the one filter determined based on the focal position information may include generating a reduced first partial image by performing filtering on the first partial image corresponding to the azimuth information, based on the determined one area-corresponding filter.

The number of coefficients greater than or equal to a first value in a filter applied to a predetermined area corresponding to the area-corresponding filter may be greater than the number of coefficients greater than or equal to the first value in a filter applied to an area except for the predetermined area.

An overlapping area may be included between predetermined areas corresponding to area-corresponding filters.

According to an example embodiment, an edge data network for transmitting image content to an electronic device includes a network interface; a memory storing one or more instructions; and a processor configured to execute the one or more instructions, wherein the processor is configured to execute the one or more instructions to: obtain azimuth information and focal position information from an electronic device connected to the edge data network; determine one filter among a plurality of filters, based on the focal position information; generate a filtered first partial image by performing filtering on a first partial image corresponding to the azimuth information by using the one filter determined based on the focal position information; generate a first frame by encoding the filtered first partial image; and transmit the generated first frame to the electronic device.

The processor may be further configured to execute the one or more instructions to generate information of an area-corresponding filter corresponding to each of a plurality of predetermined areas within an image; store the generated information of the plurality of area-corresponding filters; transmit the information of the plurality of area-corresponding filters to the electronic device; when determining one filter among a plurality of filters, based on the focal position information, determine one of the plurality of areas, based on the focal position information, and determine an area-corresponding filter corresponding to the determined area; when generating a filtered first partial image by performing filtering on the first partial image corresponding to the azimuth information by using the one filter determined based on the focal position information, generate a reduced first partial image by performing filtering on the first partial image corresponding to the azimuth information, based on information stored regarding the area-corresponding filter corresponding to the determined area; and when transmitting the generated first frame to the electronic device, transmit the generated first frame and index information indicating one of the plurality of area-corresponding filters.

The processor may be further configured to execute the one or more instructions to when obtaining azimuth information and focal position information from an electronic device connected to the edge data network, obtain the azimuth information, the focal position information, and focus movement vector information from the electronic device; when determining one filter among a plurality of filters, based on the focal position information, determine one area-corresponding filter among the plurality of area-corresponding filters, based on the focal position information and the focus movement vector information; and generating a filtered first partial image by performing filtering on the first partial image corresponding to the azimuth information by using the one filter determined based on the focal position information, generate a reduced first partial image by performing filtering on the first partial image corresponding to the azimuth information, based on information stored regarding the determined one area-corresponding filter.

The processor may be further configured to execute the one or more instructions to, when the focal position information includes first focal position information and second focal position information and one filter is determined among a plurality of filters, based on the focal position information, determine one area-corresponding filter among a plurality of area-corresponding filters, based on the first focal position information and the second focal position information; and when generating a filtered first partial image by performing filtering on the first partial image corresponding to the azimuth information by using the one filter determined based on the focal position information, generate a reduced first partial image by performing filtering on the first partial image corresponding to the azimuth information by using the determined one filter.

The processor may be further configured to execute the one or more instructions to generate information of a plurality of area-corresponding filter sets; store the generated information of the plurality of area-corresponding filter sets; transmit the information of the plurality of area-corresponding filter sets to the electronic device, wherein each of the plurality of area-corresponding filter sets includes an area-corresponding filter corresponding to each of a plurality of predetermined areas within an image; when determining one filter among a plurality of filters, based on the focal position information, determine one area-corresponding filter set among the plurality of area-corresponding filters, based on network information, and determining one area-corresponding filter among a plurality of area-corresponding filters included in the one area-corresponding filter set, based on the focal position information; and when generating a filtered first partial image by performing filtering on the first partial image corresponding to the azimuth information by using the one filter determined based on the focal position information, generate a reduced first partial image by performing filtering on the first partial image corresponding to the azimuth information, based on the determined one area-corresponding filter.

The processor may be further configured to execute the one or more instructions to, when transmitting the generated first frame to the electronic device, transmit the generated first frame and first index information indicating one area-corresponding filter set from among the plurality of area-corresponding filters to the electronic device.

The processor may be further configured to execute the one or more instructions to, when transmitting the generated first frame and the first index information to the electronic device, transmit the generated first frame, the first index information, and second index information indicating one area-corresponding filter included in the one area-corresponding filter set to the electronic device.

The processor may be further configured to execute the one or more instructions to generate information of a plurality of area-corresponding filter sets; store the generated information of the plurality of area-corresponding filter sets and transmit the information of the plurality of area-corresponding filter sets to the electronic device, wherein each of the plurality of area-corresponding filter sets includes an area-corresponding filter corresponding to each of a plurality of predetermined areas within an image; when obtaining azimuth information and focal position information from an electronic device connected to the edge data network, obtain the azimuth information, the focal position information, and focus movement vector information from the electronic device; when determining one filter among a plurality of filters, based on the focal position information, determine one area-corresponding filter set among the plurality of area-corresponding filters, based on the focal position information and the focus movement vector information, and determining one area-corresponding filter among a plurality of area-corresponding filters included in the one area-corresponding filter set, based on the focal position information; and when generating a filtered first partial image by performing filtering on the first partial image corresponding to the azimuth information by using the one filter determined based on the focal position information, generate a reduced first partial image by performing filtering on the first partial image corresponding to the azimuth information, based on the determined one area-corresponding filter.

According to an embodiment, a computer-readable recording medium has recorded thereon a program, which, when executed by a computer, performs a method, performed by an edge data network, including obtaining azimuth information and focal position information from an electronic device connected to the edge data network; determining one filter among a plurality of filters, based on the focal position information; generating a filtered first partial image by performing filtering on a first partial image corresponding to the azimuth information by using the filter determined based on the focal position information; generating a first frame by encoding the filtered first partial image; and transmitting the generated first frame to the electronic device.

According to an embodiment, a method, performed by an electronic device, of providing image content from an edge data network connected to the electronic device includes transmitting azimuth information and focal position information to the edge data network; obtaining a first frame from the edge data network by filtering and encoding a first partial image corresponding to the azimuth information, based on the focal position information; obtaining a first partial image by decoding the first frame; reconstructing the first partial image by using one filter among a plurality of filters determined based on the focal position information; and reproducing the reconstructed first partial image.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 11B is a view for explaining a method, performed by an edge data network 2000, of performing filtering by using a plurality of area-corresponding filters having overlapping areas between adjacent areas, according to various embodiments;

FIG. 12A is a flowchart of an operation procedure between an electronic device and an edge data network according to various embodiments;

FIG. 14A is a flowchart of an operation procedure between an electronic device and an edge data network according to various embodiments;

FIG. 17A is a flowchart of a method, performed by an edge data network, of streaming image content, according to various embodiments;

DETAILED DESCRIPTION

Figure 1:
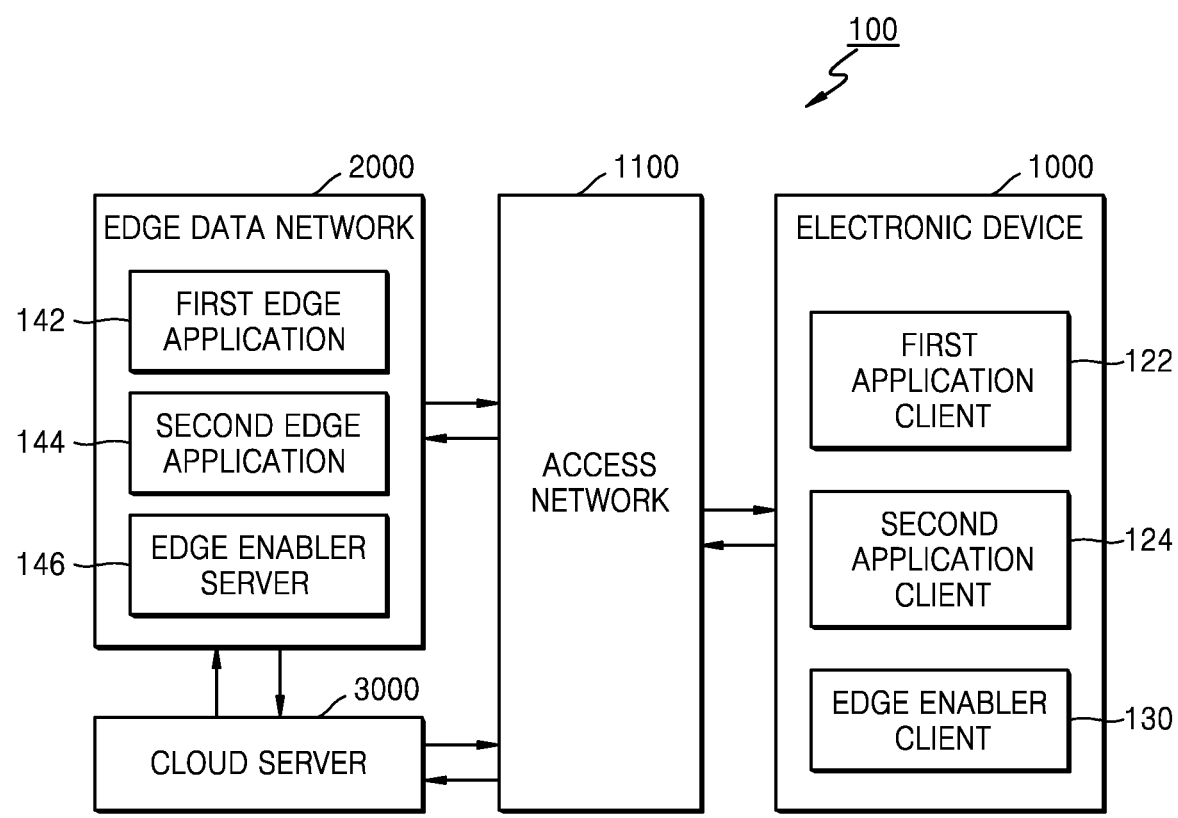
FIG. 1 is a schematic diagram for explaining multi-access edge computing (MEC) technology in a network environment, according to various embodiments.

Example embodiments of the disclosure will now be described more fully with reference to the accompanying drawings.

In the following description of embodiments of the disclosure, descriptions of techniques that are well known in the art and not directly related to the disclosure are omitted. This is to clearly convey the gist of the disclosure by omitting any unnecessary explanation.

For the same reason, some elements in the drawings are exaggerated, omitted, or schematically illustrated. Also, actual sizes of respective elements are not necessarily represented in the drawings. In the drawings, the same or corresponding elements are denoted by the same reference numerals.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art. The scope of the disclosure only defined in the claims. Throughout the specification, like reference numerals or characters refer to like elements.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term 'unit' or '~er(or)' used in the embodiments indicates a software component or a hardware component, or a combination of both, such as a Field Programmable Gate Array (FPGA) or an Application-Specific Integrated Circuit (ASIC), and the term 'unit' or '~er(or)' performs certain roles. However, the term 'unit' or '~er(or)' is not limited to software or hardware. The term 'unit' or '~er(or)' may be configured to be included in an addressable storage medium or to reproduce one or more processors. Thus, the term 'unit' or '~er(or)' may include, by way of example, object-oriented software components, class components, and task components, and processes, functions, attributes, procedures, subroutines, segments of program code, drivers, firmware, micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers(ors)'. In addition, the components and 'units' or '~ers (ors)' may be implemented to operate one or more central processing units (CPUs) in a device or a secure multimedia card. According to an embodiment of the disclosure, the 'unit' or '~er(or)' may include one or more processors.

FIG. 1 is a schematic diagram for explaining multi-access edge computing (MEC) technology in a network environment, according to various embodiments.

Referring to FIG. 1, a network environment 100 of the disclosure may include an electronic device 1000, an edge data network 2000, a cloud server 3000, and an access network (AN) 1100. However, the components included in the network environment 100 are not limited thereto.

According to an embodiment, each of the components included in the network environment 100 may refer to a physical entity unit, or may refer to a software or module unit capable of performing an individual function.

According to an embodiment, the electronic device 1000 may refer to a device used by a user. For example, the electronic device 1000 may refer to a terminal, a user equipment (UE), a mobile station, a subscriber station, a remote terminal, a wireless terminal, or a user device.

The electronic device 1000 may be a terminal for providing content so as for a user to be immersed in a virtual environment including at least one of virtual reality (VR), augmented reality (AR), or mixed reality (MR). In other words, according to an embodiment, the electronic device 1000 may be a head-mounted display (HMD) or a virtual reality headset (VRH) for providing content for VR, AR, or MR.

Referring to FIG. 1, the electronic device 1000 may include a first application client (or an application client) 122, a second application client 124, and an edge enabler client (or an MEC enabling layer (MEL)) 130. The electronic device 1000 may perform a necessary operation using the edge enabler client 130, to use an MEC service. A detailed description of the edge enabler client 130 will be provided below.

According to an embodiment, the electronic device 1000 may execute a plurality of applications. For example, the electronic device 1000 may execute the first application client 122 and the second application client 124. The plurality of applications may require different network services, based on at least one of a required data transmission rate, a latency time (or a speed), reliability, the number of electronic devices having accessed a network, a network access period of the electronic device 1000, or an average data use amount. The different network services may include, for example, an enhanced mobile broadband (eMBB) service, an ultra-reliable and low latency communication (URLLC) service, or a massive machine-type communication (mMTC) service.

An application client of the electronic device 1000 may refer, for example, to a default application previously installed in the electronic device 1000 or an application provided by a third party. In other words, the application client of the electronic device 1000 may refer to a client application program running in the electronic device 1000 for a particular application service. Several application clients may run in the electronic device 1000. At least one of the application clients may use a service provided by the edge data network 2000. For example, an application client may be an application installed and executed in the electronic device 1000, and may provide a function of transmitting and receiving data via the edge data network 2000. The application client of the electronic device 1000 may refer, for example, to application software executed in the electronic device 1000 to use a function provided by one or more particular edge applications.

According to an embodiment, the plurality of applications, namely, the first and second application clients 122 and 124, in the electronic device 1000, may perform data transmission with the cloud server 3000, based on a required network service type, or perform data transmission with the edge data network 2000, based on edge computing. For example, when the first application client 122 does not require a low latency time, the first application client 122 may perform data transmission with the cloud server 3000. As another example, when the second application client 124 requires a low latency time, the second application client 124 may perform MEC-based data transmission with the edge data network 2000.

According to an embodiment, an application in the electronic device 1000 may be referred to as an application client, a client application (Client App), or a UE application (UE App). For convenience, hereinafter, in the disclosure, an application in the electronic device 1000 is referred to as an application client.

According to an embodiment, the AN 1100 may provide a channel for wireless communication with the electronic device 1000. For example, the AN 1100 may refer, for example, to a radio access network (RAN), a base station, an evolved node B (eNodeB or eNB), a 5th-generation (5G) node, a transmission/reception point (TRP), or a 5G NodeB (5GNB).

According to an embodiment, the edge data network 2000 may refer, for example, to a server which the electronic device 1000 accesses to use an MEC service. The edge data network 2000 may be provided at a location geographically close to the electronic device 1000, e.g., inside or around a base station. According to an embodiment, the edge data network 2000 may transmit and receive data to and from the electronic device 1000 without passing through an external data network (DN) (e.g., the Internet). According to an embodiment, the MEC may stand for multi-access edge computing or mobile-edge computing.

According to an embodiment, the edge data network 2000 may be referred to, for example, as an MEC host, an edge computing server, a mobile edge host, an edge computing platform, an MEC server, or the like. For convenience, hereinafter, in the disclosure, the edge data network 2000 may be referred to as an MEC server. Referring to FIG. 1, the edge data network 2000 may include a first edge application 142, a second edge application 144, and an edge enabler server (or an MEC platform (MEP)) 146. The edge enabler server 146 provides an MEC service or performs traffic control or the like in the edge data network 2000, and detailed descriptions of the edge enabler server 146 will be provided below.

According to an embodiment, the edge data network 2000 may execute a plurality of applications. For example, the edge data network 2000 may execute the first edge application 142 and the second edge application 144. According to an embodiment, an edge application may refer to an application provided by a third party in an edge data network which provides an MEC service, and may also be referred to as an edge application. The edge application may be used to establish a data session with an application client in order to transmit and receive data associated with the application client. In other words, the edge application may establish a data session with the application client. According to an embodiment, the data session may refer to a communication path established for an application client in the electronic device 1000 and an edge application in the edge data network 2000 to transmit and receive data to and from each other.

According to an embodiment, an application in the edge data network 2000 may be referred to, for example, as an MEC application (MEC App), an ME (MEC) App, an edge application server, or an edge application. For convenience, hereinafter, in the disclosure, an application in the edge data network 2000 is referred to as an edge application. Although the term 'application' is used in the disclosure, the edge application may refer to an application server existing in the edge data network.

According to an embodiment, the cloud server 3000 may provide content associated with an application. For example, the cloud server 3000 may be managed by a content provider. According to an embodiment, the cloud server 3000 may transmit and receive data to and from the electronic device 1000 via the external DN (e.g., the Internet).

Although not shown in FIG. 1, a core network (CN) and a DN may be between the AN 1100 and the edge data network 2000. According to an embodiment, the DN may provide a service (e.g., an Internet service or an Internet protocol (IP) multimedia subsystem (IMS) service) by transmitting and receiving data (or a data packet) to and from the electronic device 1000 via the CN and the AN 1100. For example, the DN may be managed by a communication provider. According to an embodiment, the edge data network 2000 may be connected to the AN 1100 or the CN via the DN (e.g., a local DN).

According to an embodiment, when the first application client 122 or the second application client 124 is executed in the electronic device 1000, the electronic device 1000 may access the edge data network 2000 via the AN 1100 to transmit and receive data for executing an application client.

In the disclosure, a method of streaming image content between the electronic device 1000, the edge data network 2000, and the cloud server 3000 described above may be provided. In more detail, a method of effectively providing content for VR, AR, or MR to a user, based on the user's interaction information about an image reproduced by the electronic device 1000 is described. An example embodiment of a method, performed by the edge data network 2000, of streaming image content, based on azimuth information and focal position information about the image content reproduced by the electronic device 1000 will now described.

Figure 2A:
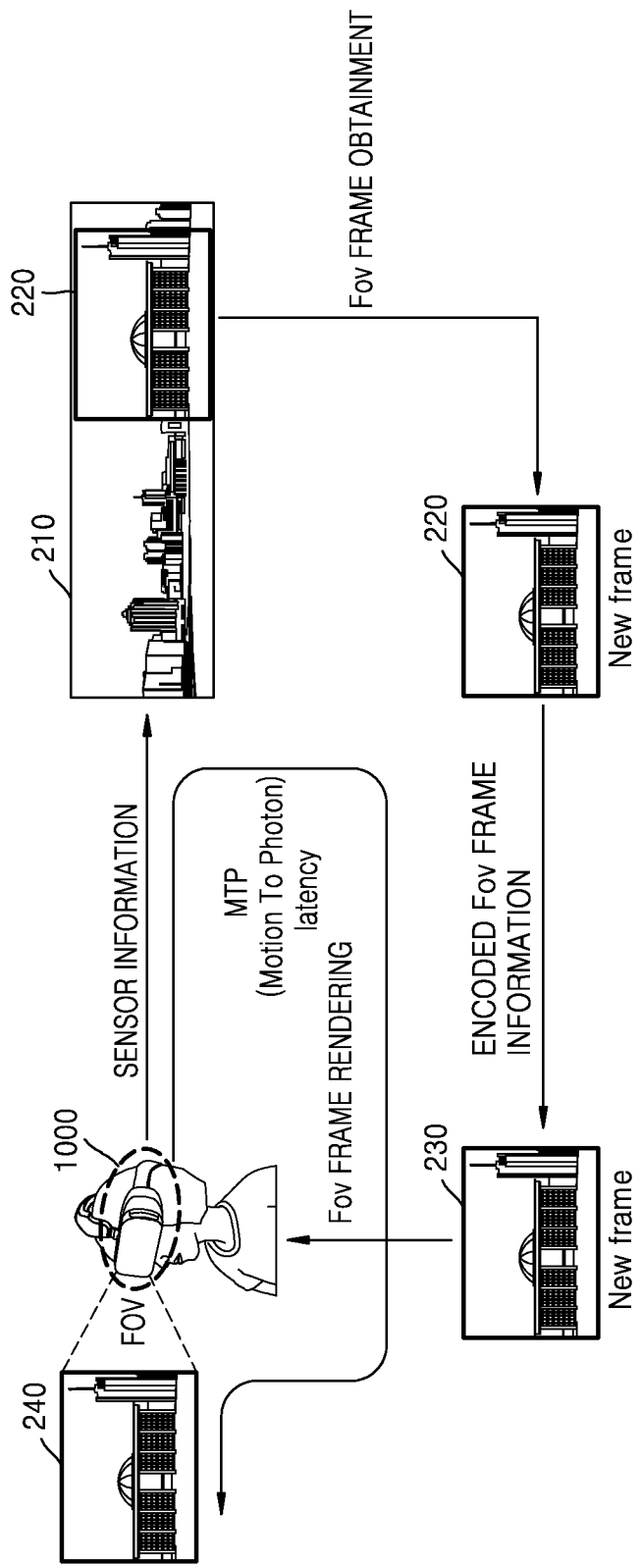
FIG. 2A is a view for explaining a motion to photon (MTP) latency that occurs while an edge data network is providing content to an electronic device according to a Field of View (Fov) transmission technique.

FIG. 2A is a view for explaining a motion to photon (MTP) latency that occurs while an edge data network is providing content to an electronic device according to a Field of View (Fov) transmission technique.

Referring to FIG. 2A, the electronic device 1000 may obtain sensor information including azimuth information and the like through a sensing module, and may periodically or non-periodically transmit the sensor information to the edge data network 2000 when the value of the sensor information is changed. The edge data network 2000 may obtain an Fov frame 220 from the first frame 210 within a VR sequence, based on the azimuth information. The edge data network 2000 may encode the Fov frame 220 to generate encoded Fov frame information, and may transmit the encoded Fov frame information to the electronic device 1000.

The electronic device 1000 may obtain an Fov reconstructed frame 230 by decoding the encoded Fov frame information, and perform rendering on the Fov reconstructed frame, and then the electronic device 1000 may display a rendered Fov frame 240 on a display of the electronic device 1000.

In this case, a time period from the time of detecting a motion of a user using the sensor information obtained through the electronic device 1000, receiving the encoded Fov frame information through the edge data network 2000 based on the sensor information, and performing decoding and rendering to the time of displaying a rendered Fov frame on the display may be defined as a Motion to Photon (MTP) latency. When the MTP latency is large, the user may feel that a delay occurs in a frame reproduced through the electronic device 1000, and thus, the user may feel that the frame reproduction is not smooth. When the MTP latency is sufficiently small, the user may not feel that a delay occurs in the frame reproduced through the electronic device 1000, and thus, the user may feel that the frame reproduction is smooth.

Thus, when the MTP latency can be sufficiently reduced, the user may feel that frame reproduction is smooth, while an edge data network is providing content to an electronic device according to the Fov transmission technique.

Figure 2B:
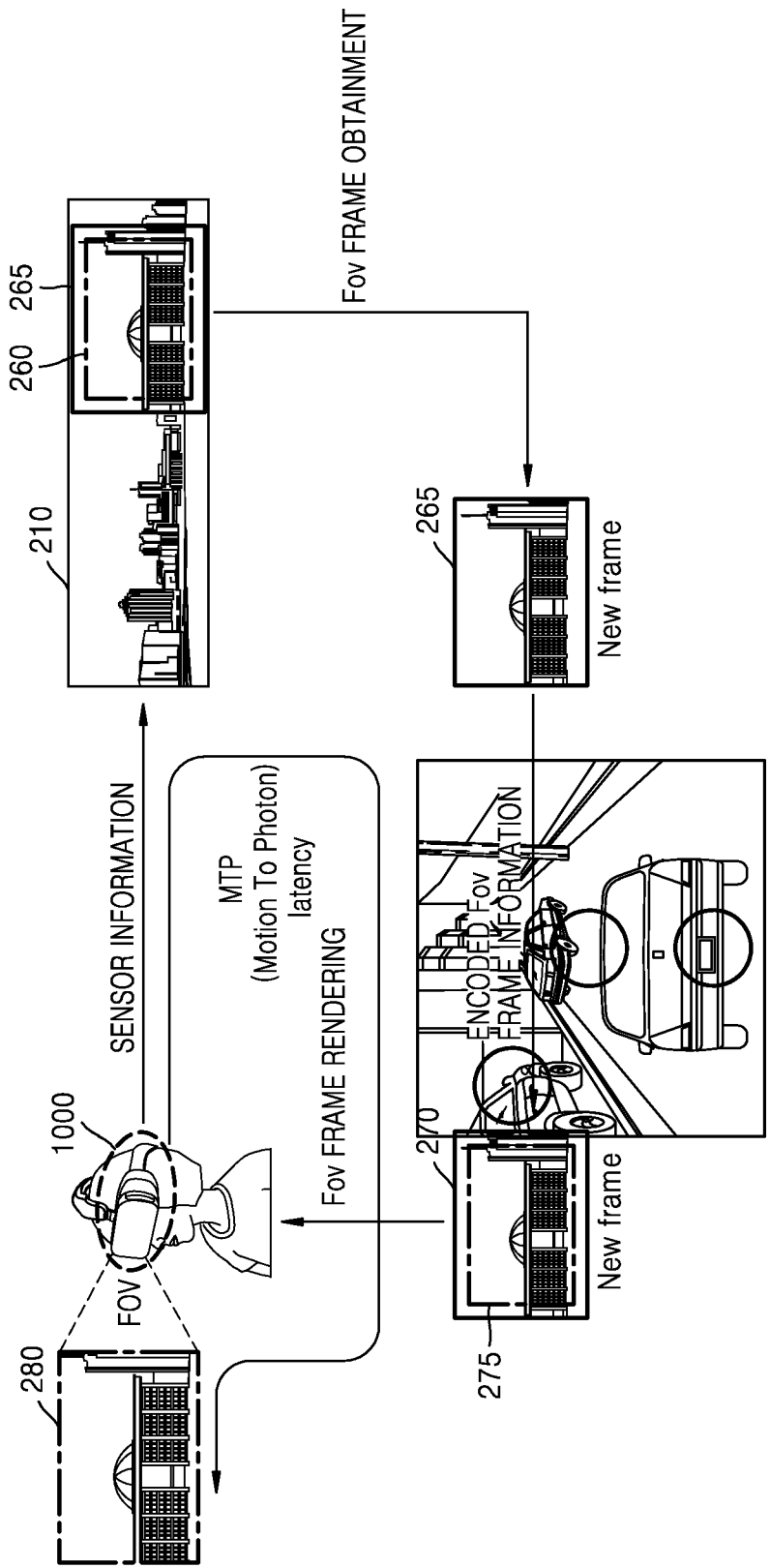
FIG. 2B is a view for explaining an MTP latency that occurs while an edge data network is providing content to an electronic device according to a splitting rendering technique.

FIG. 2B is a view for explaining an MTP latency that occurs while an edge data network is providing content to an electronic device according to a splitting rendering technique.

Referring to FIG. 2B, unlike FIG. 2A, the edge data network 2000 may obtain an extended Fov frame 265 having a size extended by a predetermined range from the size of an Fov frame 260, instead of obtaining an Fov frame based on azimuth information. The electronic device 1000 may receive encoded extended Fov frame information, obtain an extended reconstructed Fov frame 270 by decoding the extended Fov frame information, determine an Fov portion 275 within the extended reconstructed Fov frame, based on the extended reconstructed Fov frame 270, and perform rendering on the determined Fov portion (Fov frame) 275, and then the electronic device 1000 may display a rendered Fov frame 280 on the display of the electronic device 1000. In other words, latency may be reduced by rendering and displaying the Fov frame based on azimuth information sensed at the time of rendering after restoration, which is more recent sensor information than the sensor information used at the time of obtaining the extended Fov frame 265.

As in FIG. 2A, in a process in which an edge data network provides content to an electronic device according to the split rendering technique, MTP latency may occur, and, when the MTP latency is sufficiently small (e.g., less than 20 ms), the user may feel that frame reproduction is smooth.

Figure 2C:
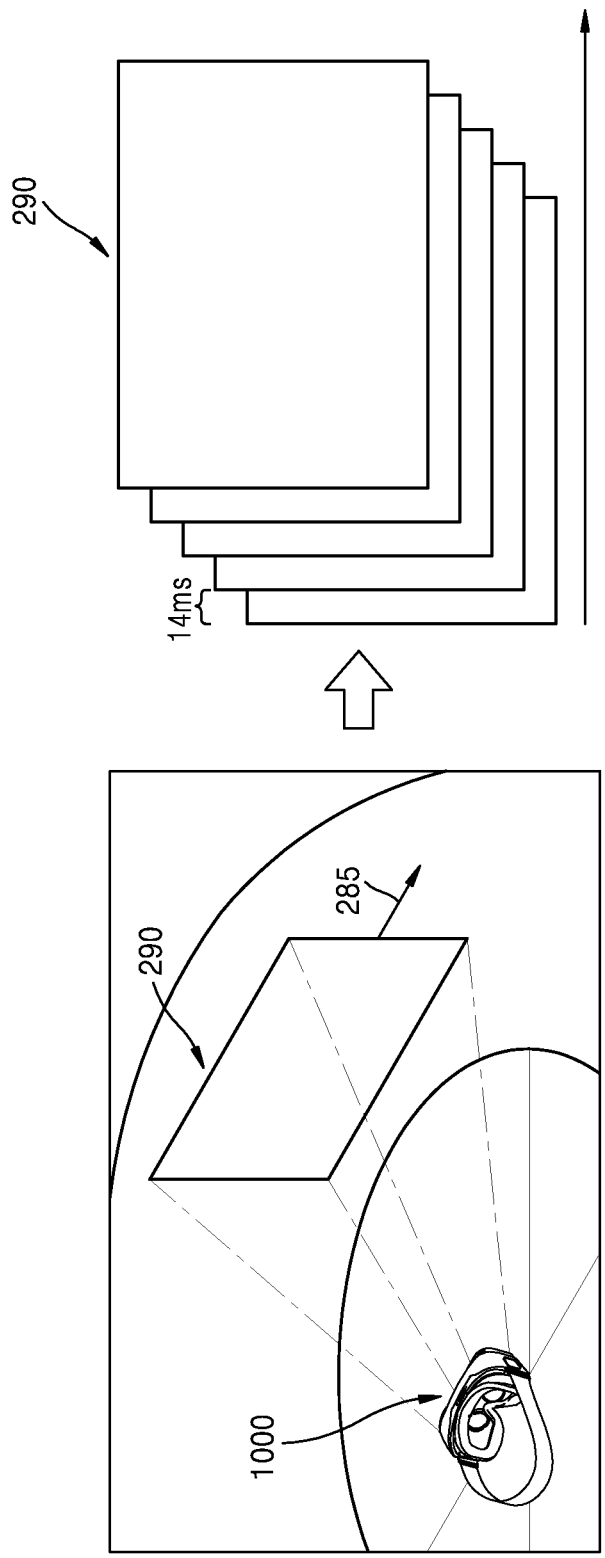
FIG. 2C is a view for explaining MTP latency that variably occurs, when a movement occurs in an electronic device by a user, in a process of providing content according to an Fov transmission technique and a split rendering technique.

FIG. 2C is a view for explaining MTP latency that variably occurs, when a movement occurs in an electronic device by a user, in a process of providing content according to an Fov transmission technique and a split rendering technique.

When the user moves while wearing the electronic device 1000, a movement 285 may occur in the electronic device 1000.

The electronic device 1000 may transmit sensor information regarding a movement and receive encoded Fov frame or extended Fov frame information, based on the sensor information, to reproduce an Fov frame. In this case, generated MTP latency may be variable. In other words, a total latency may be variable according to a time point when the edge data network 2000 encodes and transmits an Fov frame or extended Fov frame 290, based on the sensor information.

Thus, a processing delay while the edge data network 2000 encodes and transmits the Fov frame or extended Fov frame, based on the sensor information, needs to be reduced. For example, when the edge data network 2000 is able to encode and transmit the Fov frame or extended Fov frame, based on the sensor information, so that the processing delay is guaranteed within 14 ms, the user may feel that frame reproduction through the display of the electronic device 1000 is smooth.

Techniques for reducing processing delay among MTP latencies, according to various embodiments of the disclosure, will now be described.

Figure 3:
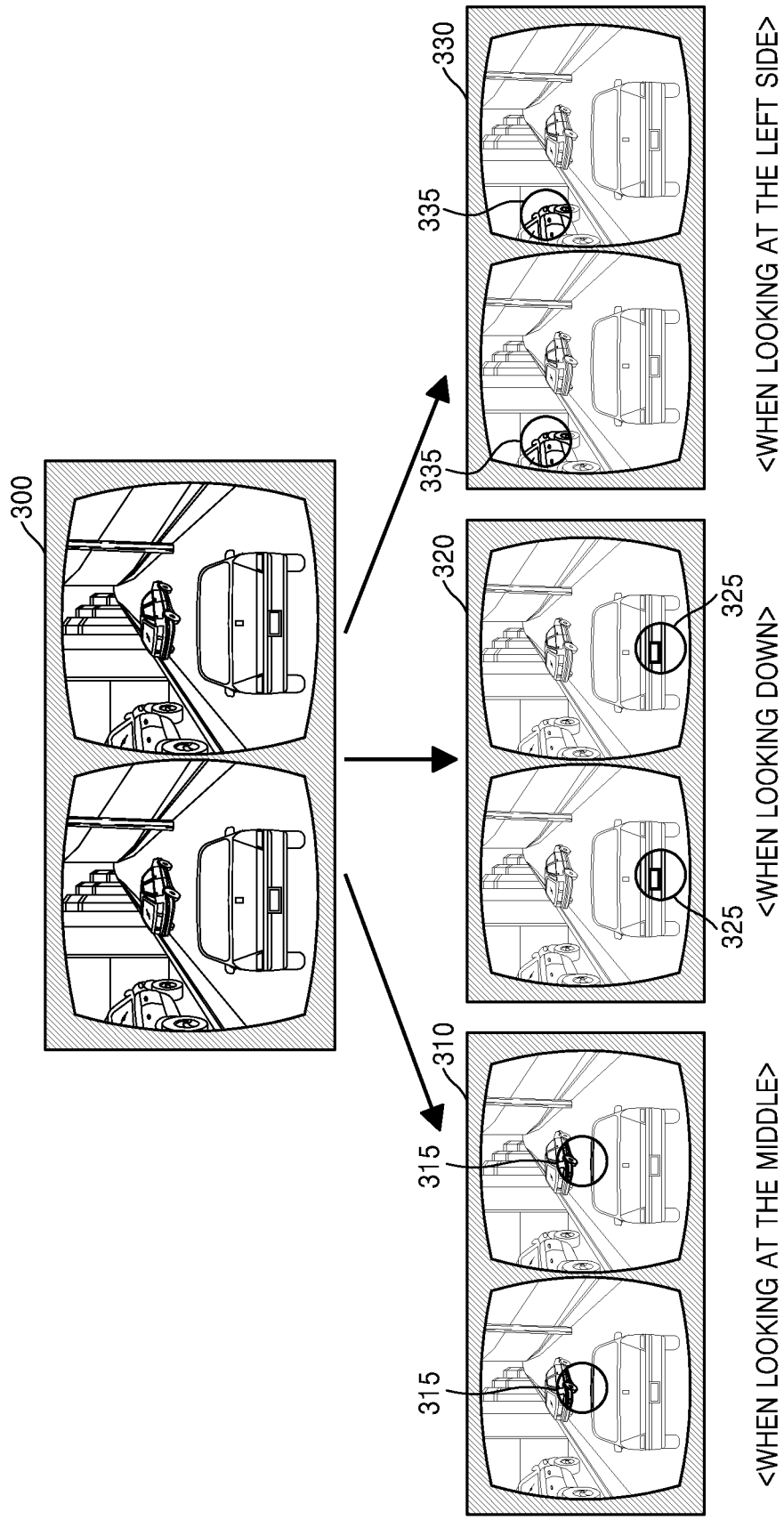
FIG. 3 is a view for explaining foveated rendering.

FIG. 3 is a view for explaining foveated rendering.

Referring to FIG. 3, when a user watches a VR image 300 through the electronic device 1000, a VR image that the user actually sees may vary according to the focus of the user's eyes. For example, when the user gazes at a center portion of the VR image 300, the focus is located at the center portion, only a focus area 315 located in the center of a VR image 310 is clearly visible, and an area outside the focus area 315 is blurred. When the user gazes at a lower portion of the VR image 300, the focus is located at the lower portion, only a focus area 325 located in the lower portion of a VR image 320 is clearly visible, and an area outside the focus area 325 is blurred. When the user gazes at a left portion of the VR image 300, the focus is located at the left portion, only a focus area 335 located in the left portion of a VR image 330 is clearly visible, and an area outside the focus area 335 is blurred.

Even when the surroundings of a focus area of a VR image is blurred, the user's eyes may not be able to distinguish that the surroundings are blurred. In other words, the role of cones is important for the human eye to distinguish objects, and cones are concentrated at about ±10° on an image that forms on the retina, and, in the area outside ±10°, the image that forms on the retina is difficult to clearly distinguish because it is blurred. Therefore, even when the surroundings of the focus area of the VR image are blurred, the user's eyes may not be able to distinguish that the surroundings are blurred.

As a result, when the VR image is processed according to a foveated rendering technique, processed image data may be reduced.

Techniques for reducing processing delay among MTP latencies considering foveated rendering, according to various embodiments of the disclosure, will now be described.

Figure 4:
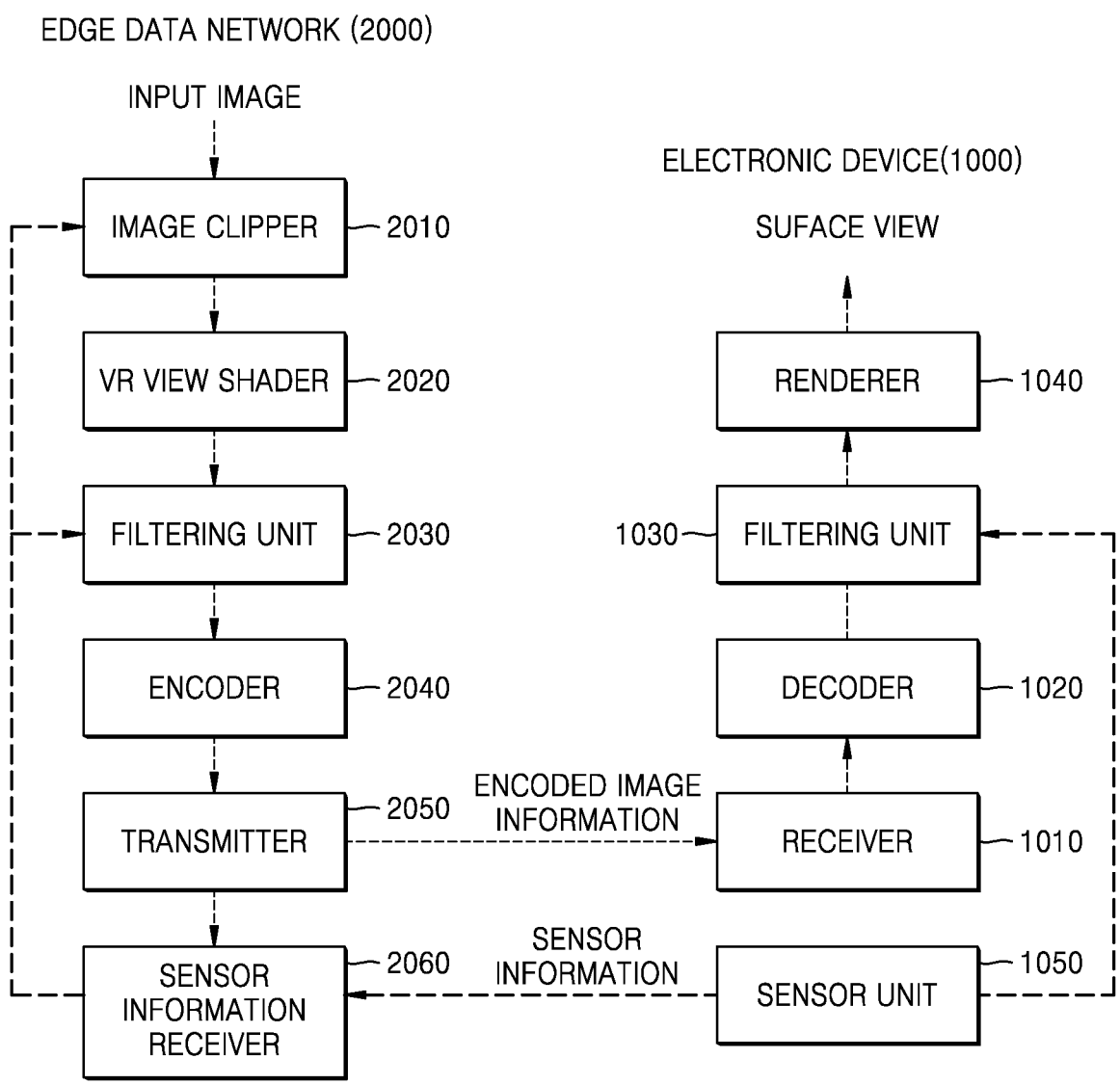
FIG. 4 is a diagram for schematically explaining an operation procedure between an electronic device and an edge data network.

FIG. 4 is a diagram for schematically explaining an operation procedure between an electronic device and an edge data network.

Referring to FIG. 4, the edge data network 2000 may perform an operation by using one VR image (e.g., a first image) of a VR image sequence as an input image. In this case, an image clipper 2010 included in the edge data network 2000 may obtain a first partial image from the first image by clipping the first image, based on the azimuth information included in the sensor information received from the electronic device 1000. According to an embodiment, it may take about 4 to 5 ms for the image clipper 2010 to obtain the first partial image from the first image.

A VR view shader 2020 included in the edge data network 2000 may perform a process of transforming a 3D first partial image into a planar first partial image. According to an embodiment, it may take approximately 1 ms for the VR view shader 2020 to perform a process of transforming a 3D first partial image into a planar first partial image of a plane.

An encoder 2040 included in the edge data network 2000 may encode the first partial image using various conventional codecs (e.g., H.264, HEVC, VP9, and AV1). A transmitter 2050 included in the edge data network 2000 may transmit encoded first partial image information to the electronic device 1000. In this case, the encoded first partial image information may be transmitted in a bitstream form, and, in particular, in a packet form. According to an embodiment, it may take about 5 to 6 ms to encode and transmit the first partial image.

A receiver 1010 included in the electronic device 1000 may receive the encoded first partial image information from the edge data network 2000. The receiver 1010 included in the electronic device 1000 may obtain the first partial image information from the encoded first partial image information in the packet form and output the first partial image information to a decoder 1020. According to an embodiment, it may take about 1 to 2 ms for the receiver 1010 to receive the first partial image information from the edge data network 2000 and output the first partial image information to the decoder 1020.

The decoder 1020 included in the electronic device 1000 may decode the encoded first partial image information to obtain a reconstructed first partial image. According to an embodiment, it may take about 1 ms for the decoder 1020 to decode the first partial image information.

A renderer 1040 included in the electronic device 1000 may receive a reconstructed first partial image in a plane form and project the reconstructed first partial image to a virtual sphere to output a reconstructed first partial image in a 3D form.

A sensor unit 1050 of the electronic device 1000 may obtain sensor information such as azimuth information or focus position information of the electronic device 1000 periodically or aperiodically when a value of the sensor information changes, and may transmit the sensor information to the edge data network 2000. A sensor information receiver 2060 included in the edge data network 2000 may receive the sensor information from the electronic device 1000.

In a technique for reducing a processing delay among MTP latencies, according to various embodiments of the disclosure, the edge data network 2000 may include a filtering unit 2030 between the VR view shader 2020 and the encoder 2040. The electronic device 1000 may include a filtering unit 1030 between the decoder 1020 and the renderer 1040.

The filtering unit 2030 may perform filtering on the planar first partial image output by the VR view shader 2020 to obtain a filtered first partial image, and may output the filtered first partial image to the encoder 2040. By compressing the first partial image by filtering, the filtering unit 2030 may reduce the size of the encoded first partial image, thereby reducing the time required for encoding, and also reduce a network bandwidth. Consequently, the edge data network 2000 may reduce the operating time of the encoder 2040 and the transmitter 2050. According to an embodiment, the processing delay may be about 10 to 12 ms in the edge data network 2000, may be about 2 to 3 ms in the electronic device 1000, and consequently, a total processing delay may be a sum of a network delay and a processing delay (about 12 to 15 ms) of the electronic device 1000 and the edge data network 2000, but the processing delay may be reduced through operations of the filtering unit 2030 and the filtering unit 1030.

The electronic device 1000 may reduce the operation time of the receiver 1010 and the decoder 1020 by receiving and decoding a compressed encoded first partial image of which the size is reduced through filtering. The filtering unit 1030 may reconstruct the first partial image in a foveated form by interpolating the reconstructed first partial image through an interpolation technique.

As a result, the filtering unit 2030 may obtain a focus area so that the focus area may be encoded without changes, and may obtain only a portion of an area except for the focus area so that only the portion may be encoded through filtering, or may compress information of the area except for the focus area through filtering (e.g., a low-pass filter, such as a Gaussian blur filter).

After the electronic device 1000 receives and decodes an image obtained through filtering by the filtering unit 2030 from the edge data network 2000, the filtering unit 1030 may interpolate a non-obtained portion of the remainder except for a portion of the area except for the focus area of the first partial image obtained by the filtering unit 2030 through the interpolation technique, or process a reconstructed image obtained by the decoder 1020 through filtering, thereby reconstructing the first partial image so that the user may feel that the area other than the focus area is not awkward.

Figure 5:
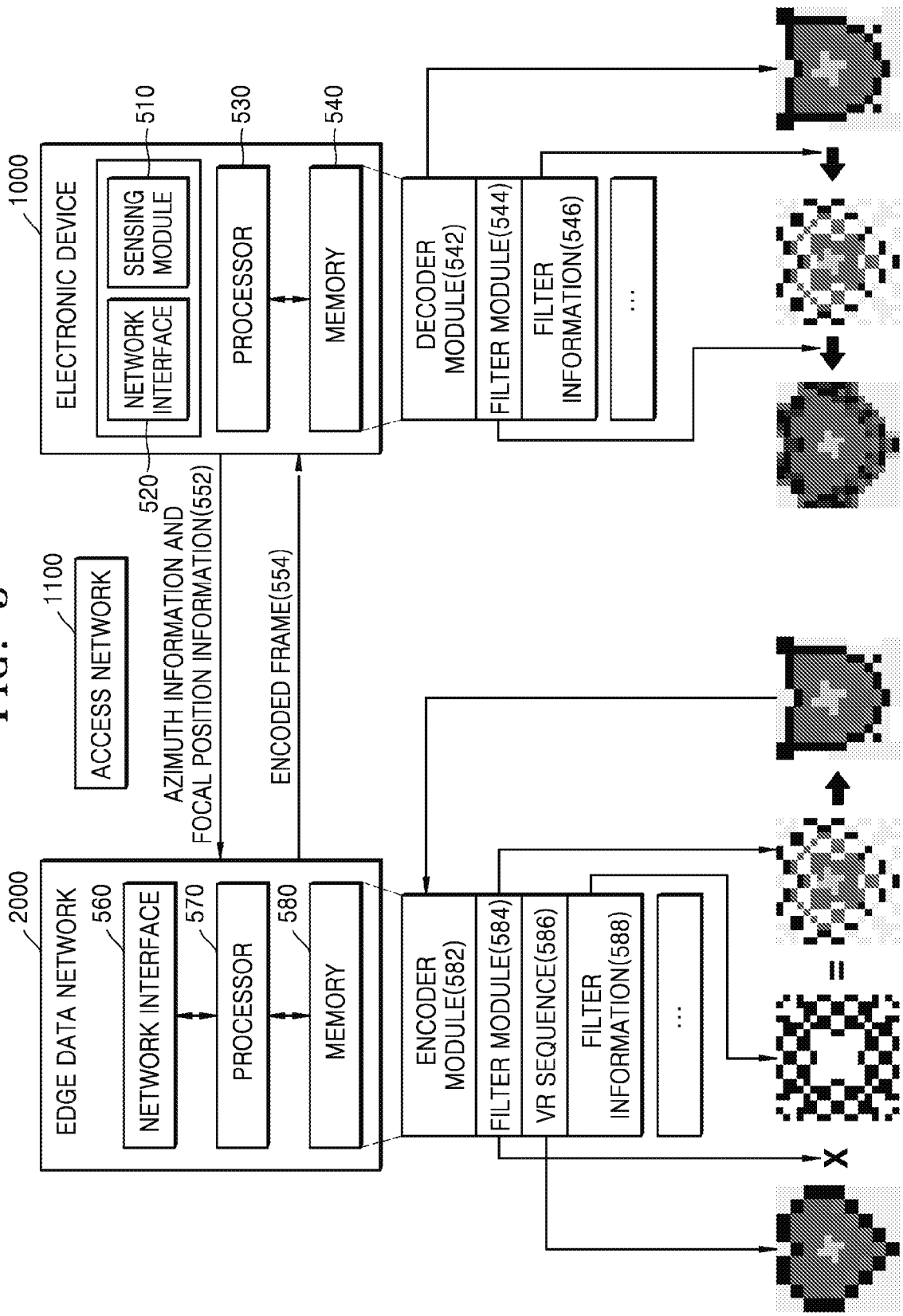
FIG. 5 is a diagram for schematically explaining an operation procedure between an electronic device and an edge data network.

FIG. 5 is a diagram for schematically explaining an example operation procedure between an electronic device and an edge data network.

According to an embodiment, the electronic device 1000 may include a sensing module 510, a network interface 520, a processor 530, and a memory 540. However, the structure of an electronic device is not limited thereto, and the electronic device may include more or less components than those illustrated in FIG. 5.

The electronic device 1000 may decode images received from the edge data network 2000 or the cloud server 3000, and may display the decoded images on the display of the electronic device. The electronic device 1000 may obtain sensor information including azimuth information and focal position information regarding reproduced images using the sensing module 510. The azimuth information may include angle values of the gaze desired by the user of the electronic device measured using a sensing module (including a sensor). The focal position information may be information indicating the position of the focus of the user's pupil.

For example, the sensor information may include first azimuth information corresponding to the first partial image, and a location of the first partial image may be determined within a first VR image, based on the first azimuth information. In other words, the azimuth information may indicate respective locations of partial images with respect to a VR image, and a location of each of the partial images may be determined within the VR image, based on the azimuth information. According to an embodiment, the range of a partial image within the VR image that may be distinguished based on the azimuth information may vary according to the area of a display (e.g., the size of a view port area) in a display device that the user of the electronic device 1000 can view.

According to an embodiment, the electronic device 1000 may sense azimuth information (for example, a roll value, a pitch value, and/or a yaw value) of a user's gaze that stares at a specific partial image within the VR image using the sensing module (for example, a 3-axis inclination sensor), and may match the sensed azimuth information to a partial image corresponding to the azimuth information. The electronic device 1000 may share information about which portion of the VR image a user of a current electronic device views, with the edge data network 2000, by transmitting the sensed azimuth information to the edge data network 2000.

The electronic device 1000 transmits azimuth information and focal position information 552 to the edge data network 2000 using the network interface 520. At this time, the electronic device 1000 may transmit, to the edge data network 2000, frame index information when the azimuth information and the focal position information are sensed. However, the disclosure is not limited thereto, and the electronic device 1000 may transmit, to the edge data network 2000, reference frame information included in a frame reconstructed before the azimuth information and the focal position information are sensed. The frame index may be information indicating the encoding/decoding order of frames, but is not limited thereto and may be information indicating the rendering order of the frames.

The processor 530 may control the overall operation of the electronic device 1000 by executing one or more instructions stored in the memory 540. For example, the processor 530 may control the sensing module 510 and the network interface 520 by executing the one or more instructions stored in the memory 540. According to an embodiment, the processor 530 may obtain the first partial image, based on the first azimuth information regarding the first partial image reproduced by the electronic device 1000, from the edge data network 2000. In this case, the first partial image may be an Intra-coded (I) frame or a Predictive-coded (P) frame (or a Bidirectional-coded (B) frame).

For example, the edge data network 2000 may store a VR sequence including all frames in a database (DB). The edge data network 2000 may identify the first partial image from the VR sequence stored in the DB, using the first azimuth information obtained by the electronic device 1000.

According to an embodiment, the processor 530 may receive encoded frame information 554 from the edge data network 2000 and may decode the first partial image, based on the encoded frame information 554, to obtain the first partial image. The processor 530 may reconstruct the first partial image using one filter among a plurality of filters determined based on the focal position information. The processor 530 may determine one filter among the plurality of filters, based on the focal position information, and may perform filtering on the first partial image using the determined one filter to reconstruct the first partial image. For example, the processor 530 may extend the first partial image using filter information, and may obtain the first partial image by interpolating the extended first partial image using an interpolation technique (for example, using an interpolation filter). An operation of processing the frame 554 received from the edge data network 2000, based on filter information 546, will be described later in detail with reference to FIG. 7.

The processor 530 may reproduce the reconstructed first partial image.

The processor 530 may receive information of an area-corresponding filter corresponding to each of a plurality of areas from the edge data network 2000, and may store information of the plurality of area-corresponding filters in the memory 540.

The processor 530 may receive information of a plurality of area-corresponding filter sets, and may store the information of the plurality of area-corresponding filter sets in the memory 540. Each of the plurality of area-corresponding filter sets may include an area-corresponding filter corresponding to each of a plurality of predetermined areas within an image.

According to an embodiment, the memory 540 may include a decoder module 542 for storing instructions for decoding encoded frames received from the edge data network 2000, and a filter module 544 for performing filtering on a decoded image, and may store the filter information 546 used in the filter module 544, but the disclosure is not limited thereto. For example, the filter module 544 may include, but is not limited to, a module for storing an instruction for executing a method of reconstructing the first partial image in a computer using one filter among the plurality of filters determined using the focus position information.

According to an embodiment, the edge data network 2000 may include a network interface 560, a processor 570, and a memory 580. However, the structure of the edge data network 2000 is not limited to the above-described structure, and the edge data network 2000 may include more components than those illustrated in FIG. 5, or some of the components illustrated in FIG. 5 may be omitted.

The edge data network 2000 may obtain the azimuth information and the focal position information from the electronic device 1000 using the network interface 560, and may transmit encoded frame information from the edge data network 2000 to the electronic device.

The processor 570 controls the overall operation of the edge data network 2000 by executing one or more instructions stored in the memory 580. For example, the processor 570 may determine one filter among the plurality of filters, based on the focal position information, and may perform filtering on a first partial image corresponding to the azimuth information using the one filter to generate a filtered first partial image.

The processor 570 may generate information of the area-corresponding filter corresponding to each of the plurality of predetermined areas within the image, based on the focal position information, and may store the generated information in the memory 580. The server 570 may transmit the information of the plurality of area-corresponding filters to the electronic device 1000.

The processor 570 may generate information of a plurality of area-corresponding filter sets (for example, filter information 588) and may store the information in the memory 580. One area-corresponding filter set may include a plurality of area-corresponding filters.

The processor 570 may determine one area among the plurality of areas, based on the focal position information, and may determine an area-corresponding filter corresponding to the determined area.

The processor 570 may generate a reduced first partial image by performing filtering on the first partial image corresponding to the azimuth information, based on information stored regarding the area-corresponding filter corresponding to the determined area. An operation of processing the first partial image using the azimuth information and focal position information 552 received from the electronic device 1000 and the filter information 588 stored in the memory 580 will be described in detail below with reference to FIG. 6.

According to an embodiment, the memory 580 may include an encoder module 582 for storing instructions for encoding images to be transmitted by the edge data network 2000 to the electronic device 1000, and a filter module 584 for performing filtering before encoding, and may store a VR sequence 586 including overall image data about the VR sequence and the filter information 588, but the disclosure is not limited thereto.

Figure 6:
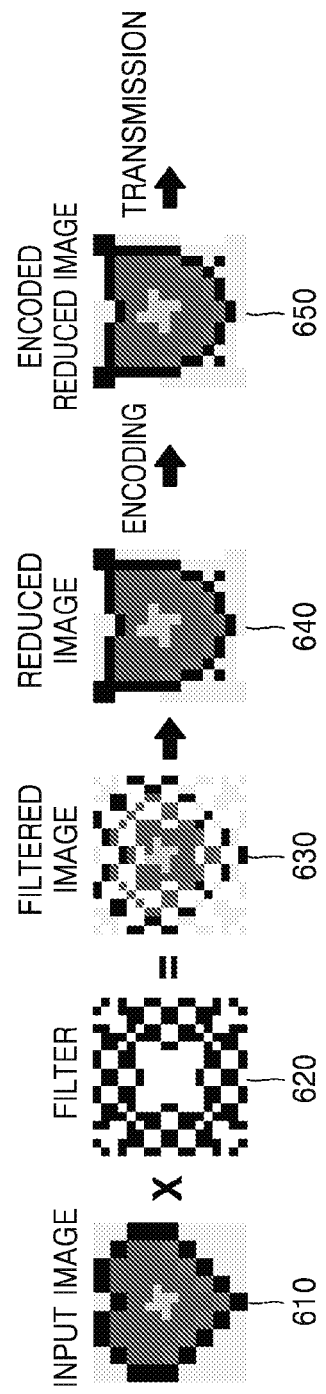
FIG. 6 is a view for explaining a process by which an edge data network encodes and transmits a reduced image by using a filter, according to various embodiments.

FIG. 6 is a view for explaining a process by which an edge data network encodes and transmits a reduced image by using a filter, according to various embodiments.

Referring to FIG. 6, the edge data network 2000 may obtain an original image 610 corresponding to azimuth information included in a VR image. The edge data network 2000 may obtain a filtered image 630 by using a filter 620. For example, the filter may be a digital filter of which a coefficient is expressed as 0 or 1. Preferably, the coefficient of a filter corresponding to a focus area may be 1 considering a focal position, and only a portion of the coefficient of a filter corresponding to an area other than the focus area may be 1 and may decrease in a direction away from the focus area.

The edge data network 2000 may obtain the filtered image 630 by multiplying the elements of the matrix of the original image 610 by the elements of a filter matrix including the coefficient of the filter 620. When the filter coefficient is 1, the edge data network 2000 may obtain only data of the pixels in an image corresponding to the filter coefficient, and, when the filter coefficient is 0, the edge data network 2000 may not obtain data of the pixels in an image corresponding to the filter coefficient. As a result, the filtered image may be an image of which a portion has no data.

The edge data network 2000 may reduce a portion without data by rearranging pixels having data (data pixels) in the filtered image 630, and consequently may obtain a reduced image 640. The pixels having data may be rearranged according to a predetermined method. For example, the predetermined method refers, for example, to a method of rearranging pixels having data in the order of data pixels scanned in the filtered image 630 according to a predetermined scan order. The predetermined scan order may be, but is not limited to, one of a raster scan order, a vertical scan order, a horizontal scan order, or a zigzag scan order. The predetermined method is not limited to a method based on the predetermined scan order, and may be any of various methods.

The edge data network 2000 may generate an encoded reduced image 650 by encoding the reduced image 640, and may transmit the encoded reduced image 650.

The edge data network 2000 may perform filtering using the filter 620 to obtain the reduced image 640, and encode the reduced image 640, thereby reducing the amount of encoded image data and thus reducing a processing delay.

Figure 7:
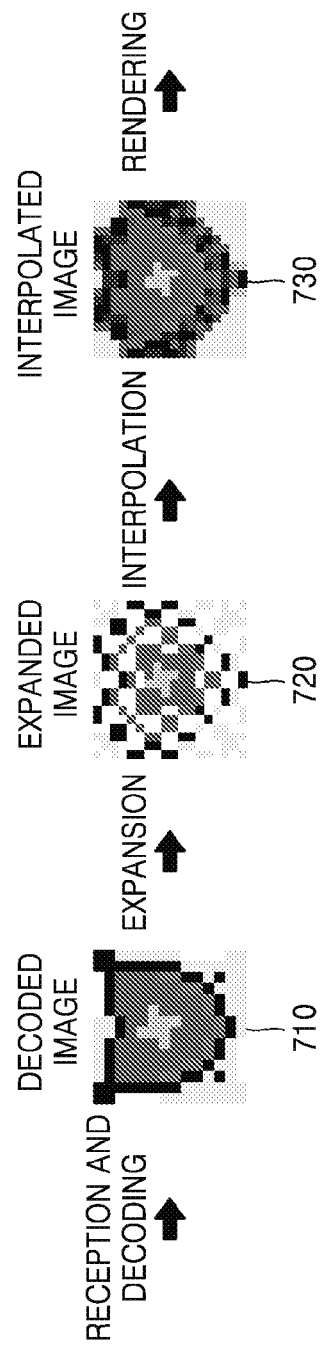
FIG. 7 is a view for explaining a process by which an electronic device expands and interpolates a decoded image by using a filter and renders the interpolated image, according to various embodiments.

FIG. 7 is a view for explaining a process by which an electronic device expands and interpolates a decoded image by using a filter and renders the interpolated image, according to various embodiments.

Referring to FIG. 7, the electronic device 1000 may obtain a decoded image 710 by receiving and decoding the encoded reduced image 650 from the edge data network 2000.

The electronic device 1000 may expand the decoded image 710. At this time, based on the filter information received from the edge data network 2000, the electronic device 1000 may move pixels having data to the locations of pixels where the data was originally positioned, by reversing the rearrangement of the pixels with data by the edge data network 2000 according to a predetermined method, and may obtain an expanded image 720, and pixels without data may exist in the expanded image 720.

The electronic device 1000 may obtain an interpolated image 730 by performing interpolation on the expanded image 720. The electronic device 1000 may render the interpolated image 730.

The electronic device 1000 may expand a reduced image obtained by the edge data network 2000 to obtain an image of the same size as the original image 610, and interpolate an area without data generated through filtering in the edge data network 2000, thereby reconstructing an image that does not make a user feel awkward when being watched by the user from the data of the reduced image.

Figure 8A:
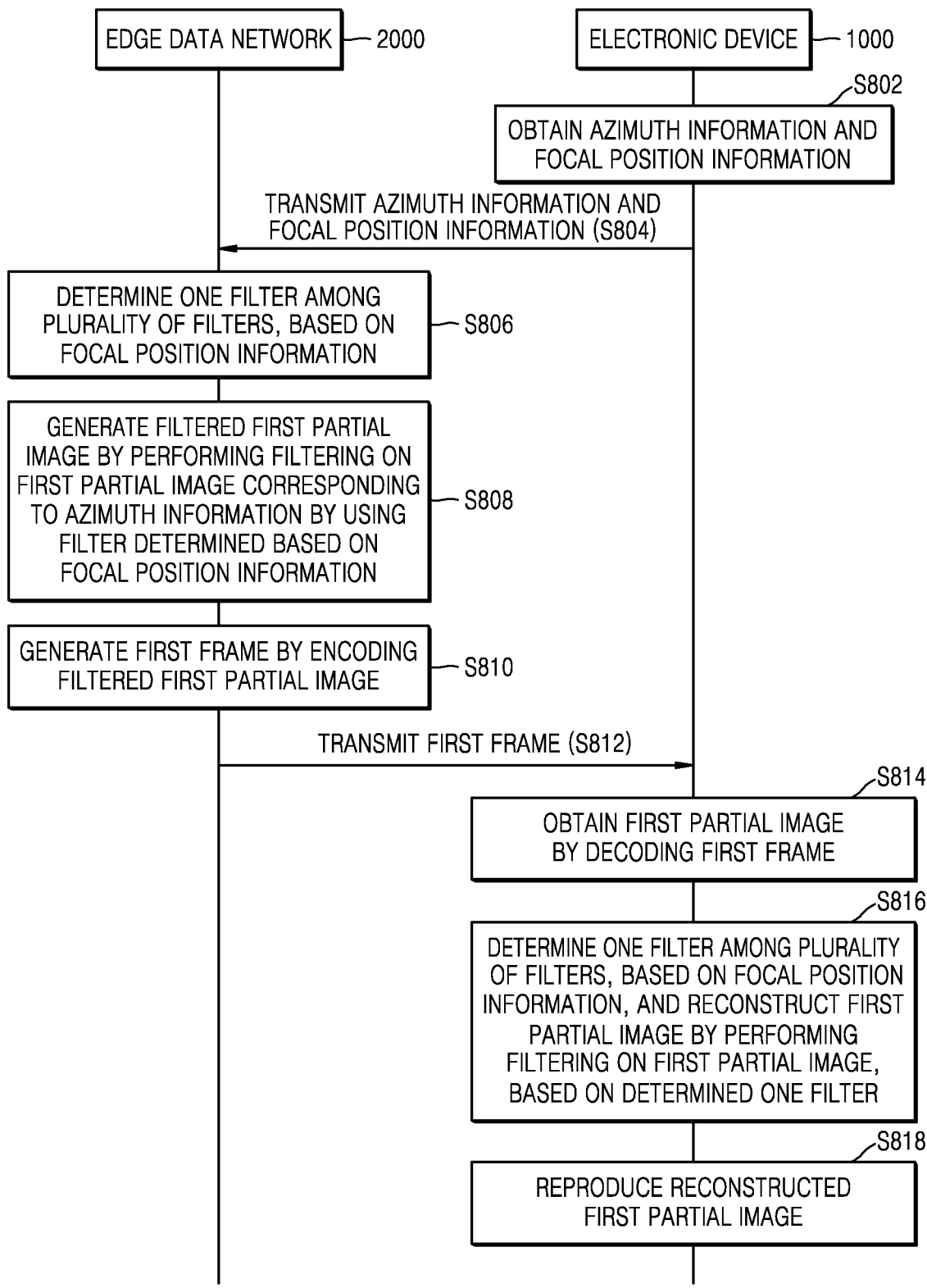
FIG. 8A is a flowchart of an operation procedure between an electronic device and an edge data network according to various embodiments.

FIG. 8A is a flowchart of an operation procedure between an electronic device and an edge data network according to various embodiments.

Referring to FIG. 8A, in operation S802, the electronic device 1000 may obtain azimuth information and focal position information. According to an embodiment, the azimuth information may include information indicating a location of a first partial image reproduced by the electronic device 1000 within a first VR image. According to an embodiment, the focal position information refers to information indicating the location of the focus of a user's pupils within the first partial image reproduced by the electronic device 1000, and may, for example, be gaze information of the user's pupils obtained through an eye tracker.

In operation S804, the electronic device 1000 may transmit the azimuth information and the focal position information to the edge data network 2000.

In operation S806, the edge data network 2000 may determine one filter among a plurality of filters, based on the focal position information. In this case, when at least one of an area to which a filter is applied (e.g., an area excluding a focus area), the size of a mask, and the value of a coefficient within the mask is different between filters, the plurality of filters may be considered to be different filters. For example, even when Gaussian filters are used, when at least one of the size of a mask of a Gaussian filter, an area to which the Gaussian filter is applied, and the value of a coefficient within the mask is different between the Gaussian filters, the plurality of Gaussian filters may be considered to be different filters.

In operation S808, the edge data network 2000 may generate a filtered first partial image by performing filtering on a first partial image corresponding to the azimuth information using the filter determined based on the focal position information.

In operation S810, the edge data network 2000 may generate a first frame by encoding the filtered first partial image. For example, the edge data network 2000 may generate the first frame, such as an I frame or a P frame (or a B frame), by encoding the first partial image. The aforementioned I frame, P frame, and B frame may be data frames used to compress an image according to a lossy compression algorithm developed by an international standardization organization, Moving Picture Experts Group (MPEG). In addition, the B frame may denote a data frame for compressing an image at a high compression rate, by referring to at least one of the P frame or the I frame.

In operation S812, the edge data network 2000 may transmit the first frame to the electronic device 1000.

In operation S814, the electronic device 1000 may obtain a first partial image by decoding the first frame.

In operation S816, the electronic device 1000 may determine one filter among the plurality of filters, based on the focal position information, and may perform filtering on the first partial image using the one filter to reconstruct the first partial image. In this case, the focal position information may be information obtained in operation S802, but is not limited thereto, and may be information newly obtained at a time for determining a current filter.

In operation S818, the electronic device 1000 may reproduce the reconstructed first partial image.

Figure 8B:
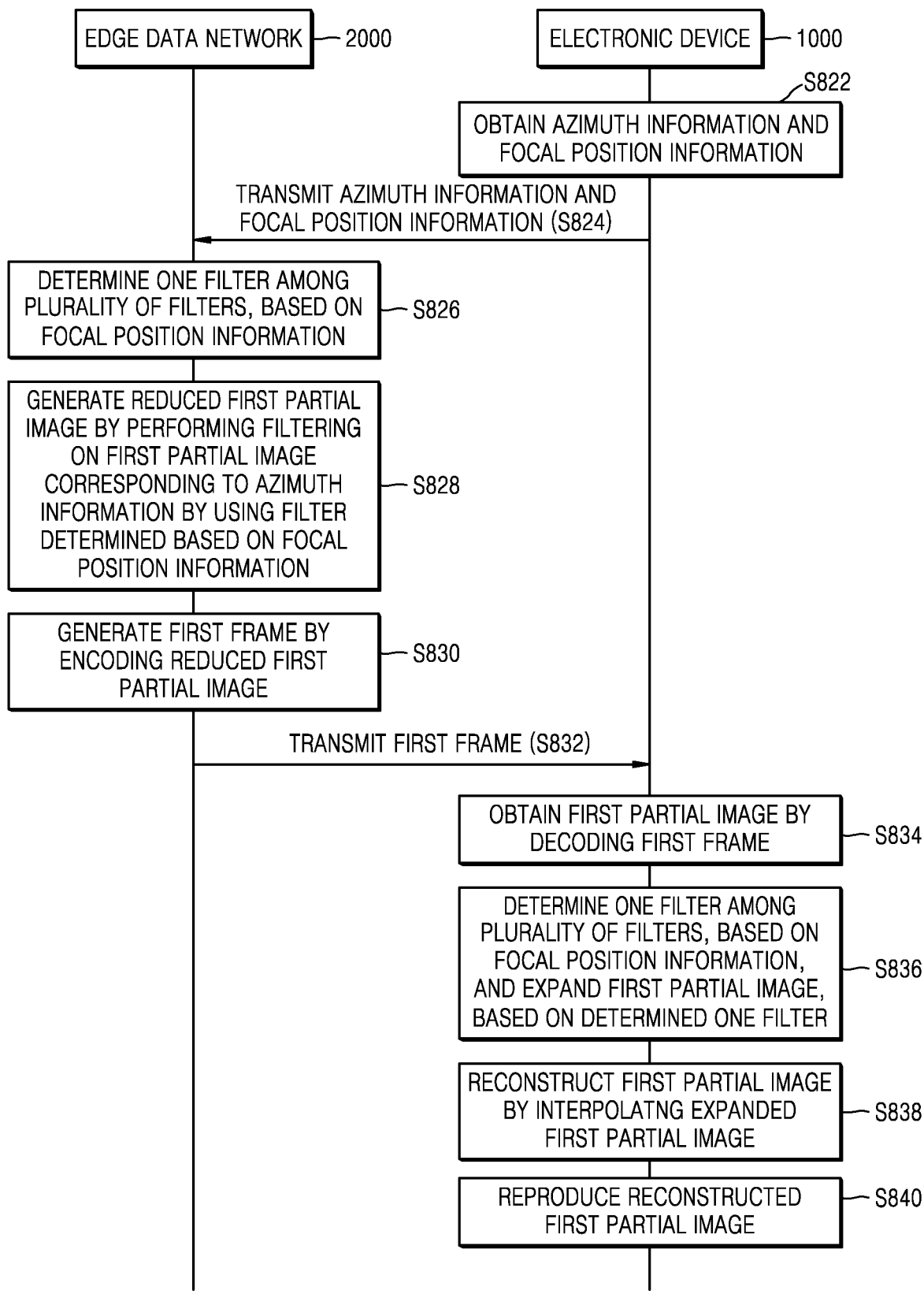
FIG. 8B is a flowchart of an operation procedure between an electronic device and an edge data network according to various embodiments.

FIG. 8B is a flowchart of an operation procedure between an electronic device and an edge data network according to various embodiments.

Operations other than operations S828, S830, S836, and S838 of FIG. 8B may correspond to those of FIG. 8A, and thus, detailed descriptions thereof will not be repeated.

In operation S828, the edge data network 2000 may generate a reduced first partial image by performing filtering on a first partial image corresponding to azimuth information using a filter determined based on focal position information. An example of generating the reduced first partial image by performing filtering has been described above with reference to FIG. 6.

In operation S830, the edge data network 2000 may generate a first frame by encoding the reduced first partial image.

In operation S836, the electronic device 1000 may determine one filter among a plurality of filters, based on the focal position information, and may expand the first partial image using the determined one filter. An example of expanding the first partial image by using a filter has been described above with reference to FIG. 7.

In operation S838, the electronic device 1000 may reconstruct the first partial image by interpolating the expanded first partial image.

Figure 9A:
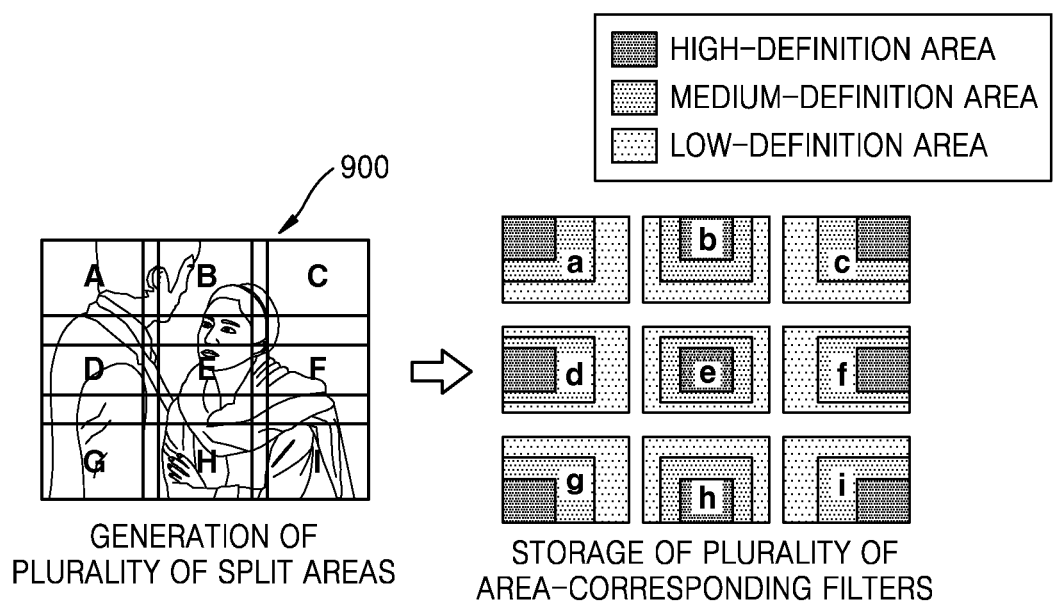
FIG. 9A is a view for explaining a plurality of area-corresponding filters according to various embodiments.

FIG. 9A is a view for explaining a plurality of area-corresponding filters according to various embodiments.

Referring to FIG. 9A, the edge data network 2000 may generate a plurality of split areas (for example, areas A, B, C, D, E, F, G, H, and I) within an image 900, and may store area-corresponding filters respectively corresponding to the plurality of split areas (for example, a filter a corresponding to the area A, a filter b corresponding to the area B, . . . , and a filter i corresponding to the area I). In this case, an area near each split area is a high-definition area, and areas are classified into a medium-definition area and a low-definition area in a direction away from each split area, so that the coefficients of the area-corresponding filters may be determined. In this case, most of the coefficients of high-definition areas may be coefficients greater than or equal to a first value, the coefficients of medium-definition areas may have a smaller number of coefficients greater than or equal to the first value than the coefficients of the high-definition areas, and the coefficients of low-definition areas may have a smaller number of coefficients greater than or equal to the first value than the coefficients of the medium-definition areas. The first value may be 1, but is not limited thereto.

The edge data network 2000 obtains the data of a high-definition area corresponding to a focus area without changes by performing filtering on a first partial image, based on information of an area-corresponding filter of an area where the focus of the pupils of a user using the electronic device 1000 is located from among information of the stored plurality of area-corresponding filters, and selectively obtains only a portion of the data of a medium-definition area and a low-definition area, thereby reducing the size of the data.

Figure 9B:
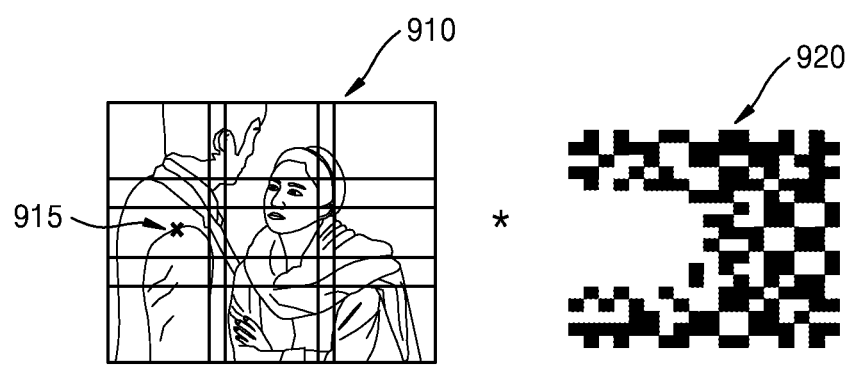
FIG. 9B is a view for explaining a method of performing filtering by using an area-corresponding filter corresponding to a focus area among a plurality of area-corresponding filters, according to various embodiments.

FIG. 9B is a view for explaining a method of performing filtering using an area-corresponding filter corresponding to a focus area among a plurality of area-corresponding filters, according to various embodiments.

Referring to FIG. 9B, the edge data network 2000 may determine a location of a focus 915 within a first partial image 910, based on focal position information received from the electronic device 1000. The edge data network 2000 may perform filtering by performing a multiplication operation on a matrix 920 stored with respect to the area-corresponding filter d corresponding to the area D, which is the area where the focus 915 is located, and a matrix of the first partial image 910.

Figure 9C:
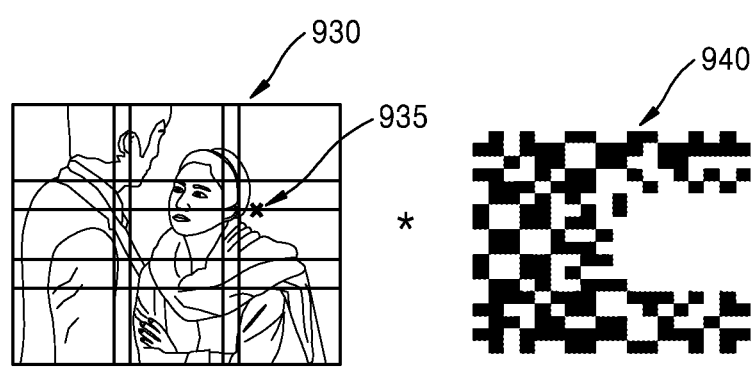
FIG. 9C is a view for explaining a method of performing filtering by using an area-corresponding filter corresponding to a focus area among a plurality of area-corresponding filters, according to various embodiments.

FIG. 9C is a view for explaining a method of performing filtering using an area-corresponding filter corresponding to a focus area among a plurality of area-corresponding filters, according to various embodiments.

Referring to FIG. 9C, the edge data network 2000 may determine a location of a focus 935 within a first partial image 930, based on focal position information received from the electronic device 1000. The edge data network 2000 may perform filtering by performing a multiplication operation on a matrix 940 stored with respect to the area-corresponding filter f corresponding to the area F, which is the area where the focus 935 is located, and the matrix of the first partial image 910.

Figure 10A:
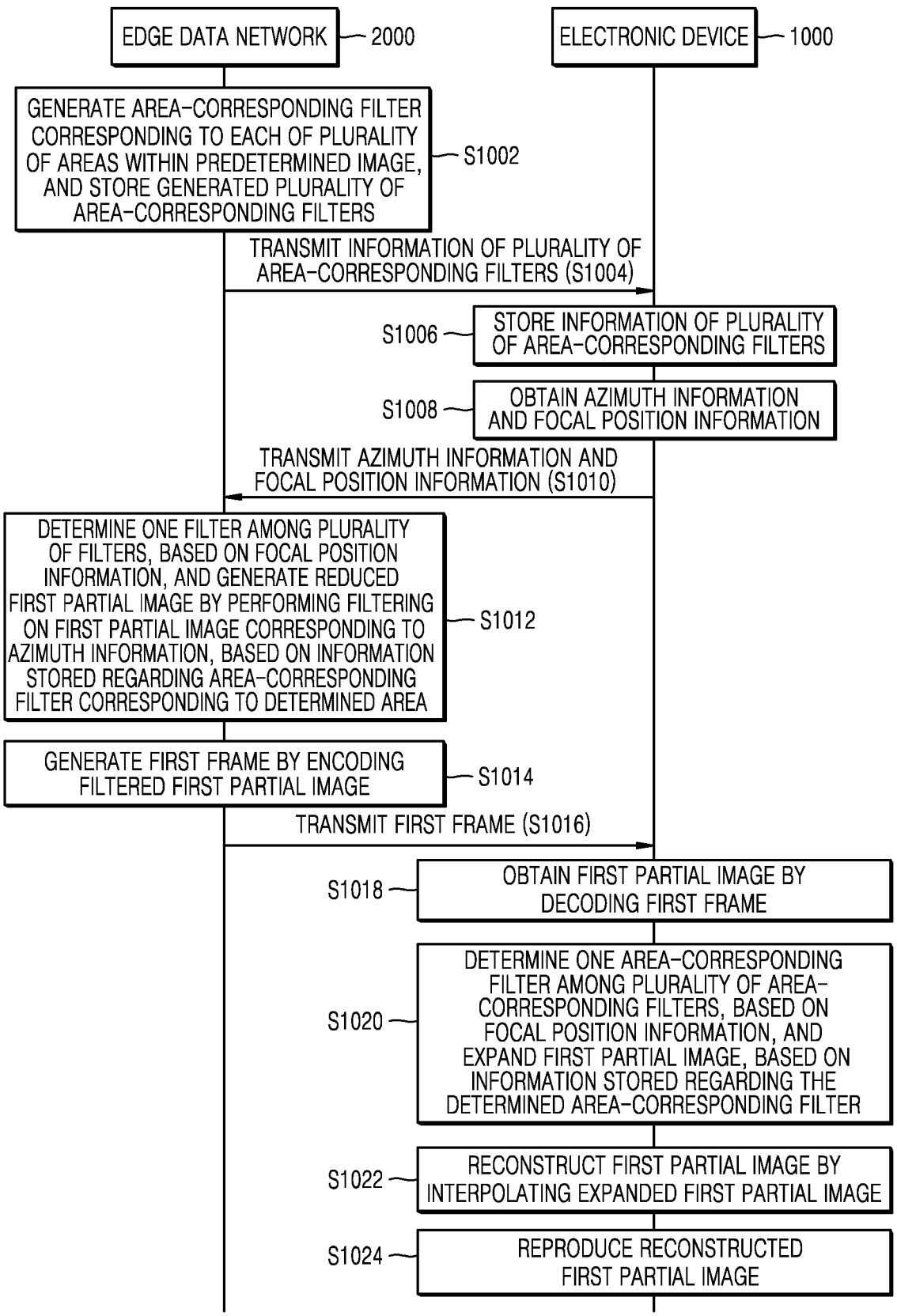
FIG. 10A is a flowchart of an operation procedure between an electronic device and an edge data network according to various embodiments.

FIG. 10A is a flowchart of an operation procedure between an electronic device and an edge data network according to various embodiments.

Referring to FIG. 10A, in operation S1002, the edge data network 2000 may generate a plurality of area-corresponding filters within a predetermined image, and may store the generated plurality of area-corresponding filters. Each of the area-corresponding filters may be stored in the form of a Look-Up Table (LUT).

In operation S1004, the edge data network 2000 may transmit information of the plurality of area-corresponding filters to the electronic device 1000.

In operation S1006, the electronic device 1000 may store the information of the plurality of area-corresponding filters.

In operation S1008, the electronic device 1000 may obtain azimuth information and focal position information.

In operation S1010, the electronic device 1000 may transmit the azimuth information and the focal position information to the edge data network 2000.

In operation S1012, the edge data network 2000 may determine one area among a plurality of areas, based on the focal position information, and may generate a reduced first partial image by performing filtering on a first partial image corresponding to the azimuth information, based on information stored regarding an area-corresponding filter corresponding to the determined area.

In operation S1014, the edge data network 2000 may generate a first frame by encoding a filtered first partial image.

In operation S1016, the edge data network 2000 may transmit the first frame to the electronic device 1000.

In operation S1018, the electronic device 1000 may obtain a first partial image by decoding the first frame.

In operation S1020, the electronic device 1000 may determine one area-corresponding filter among the plurality of area-corresponding filters, based on the focal position information, and may expand the first partial image using information stored regarding the determined area-corresponding filter.

In operation S1022, the electronic device 1000 may reconstruct the first partial image by interpolating the expanded first partial image.

In operation S1024, the electronic device 1000 may reproduce the reconstructed first partial image.

Figure 10B:
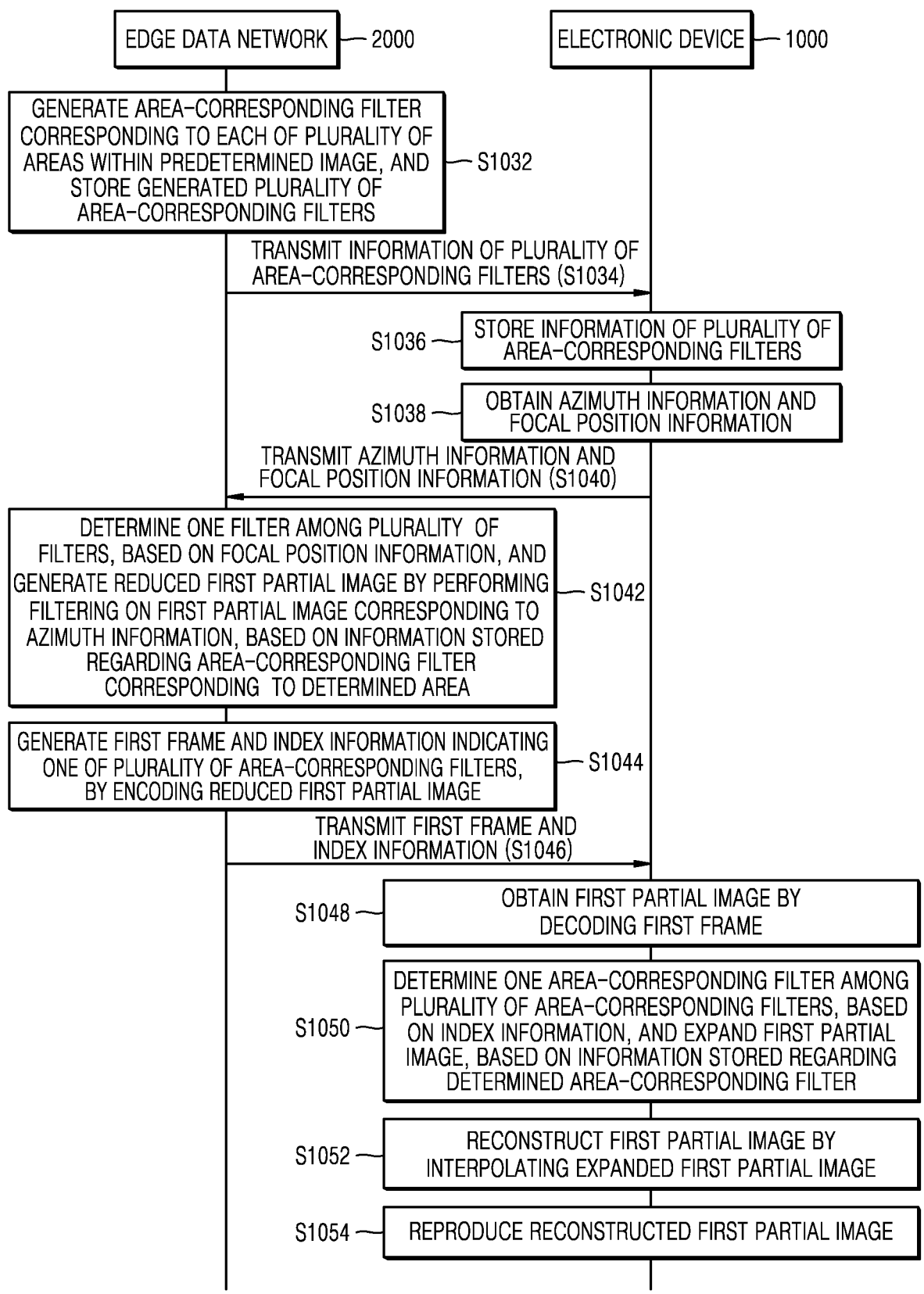
FIG. 10B is a flowchart of an operation procedure between an electronic device and an edge data network according to various embodiments.

FIG. 10B is a flowchart of an operation procedure between an electronic device and an edge data network according to various embodiments.

Operations other than operations S1044, S1046, and S1050 of FIG. 10B may correspond to those of FIG. 10A, and thus, detailed descriptions thereof will not be repeated.

Referring to FIG. 10B, in operation S1044, the edge data network 2000 may generate a first frame and index information indicating one of a plurality of area-corresponding filters, by encoding a reduced first partial image.

In operation S1046, the edge data network 2000 may transmit the first frame and the index information to the electronic device 1000.

In operation S1050, the electronic device 1000 may determine one area-corresponding filter among the plurality of area-corresponding filters, based on the index information, and may expand the first partial image using information stored regarding the determined area-corresponding filter.

Figure 11A:
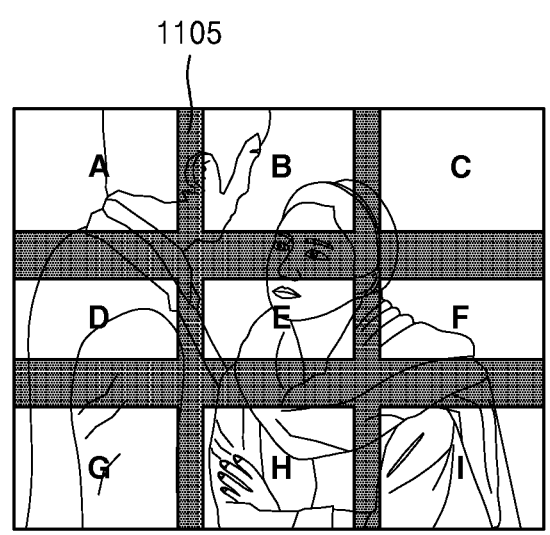
FIG. 11A is a view for explaining overlapping areas between a plurality of filter areas according to various embodiments.

FIG. 11A is a view for explaining overlapping areas between a plurality of filter areas according to various embodiments.

Referring to FIG. 11A, areas A, B, C, D, E, F, G, H, and I for determining area-corresponding filters may include overlapping areas 1105 between adjacent areas.

For example, a right portion of the area A and a left portion of the area B may be an overlapping area. In the overlapping area, an area-corresponding filter a corresponding to the area A may be determined, and an area-corresponding filter b corresponding to the area B may be determined. The reason why a plurality of areas are determined so that an overlapping area exists is to allow an image to be reproduced naturally in a boundary area between adjacent areas.

A method, performed by the edge data network 2000, of performing filtering by using a plurality of area-corresponding filters having overlapping areas between adjacent areas, according to an embodiment of the disclosure, will now be described with reference to FIGS. 11B and 11C.

FIG. 11B is a view for explaining a method, performed by the edge data network 2000, of performing filtering using a plurality of area-corresponding filters having overlapping areas between adjacent areas, according to various embodiments.

The edge data network 2000 may determine an area-corresponding filter in an overlapping area 1110 between areas A and B, based on current focal position information and focus movement vector information. For example, referring to FIG. 11B, when a current focus is located in the overlapping area 1110, the size of a focus movement vector is greater than or equal to a predetermined size, and the direction of the focus movement vector is from the area A to the area B, the edge data network 2000 may determine a filter b corresponding to the area B in the overlapping area 1110, and may perform filtering on a first partial image corresponding to azimuth information by applying the filter b. However, the disclosure is not limited thereto, and the edge data network 2000 may determine a filter a corresponding to the area A, when the size of the focus movement vector is less than or equal to the predetermined size.

Figure 11C:
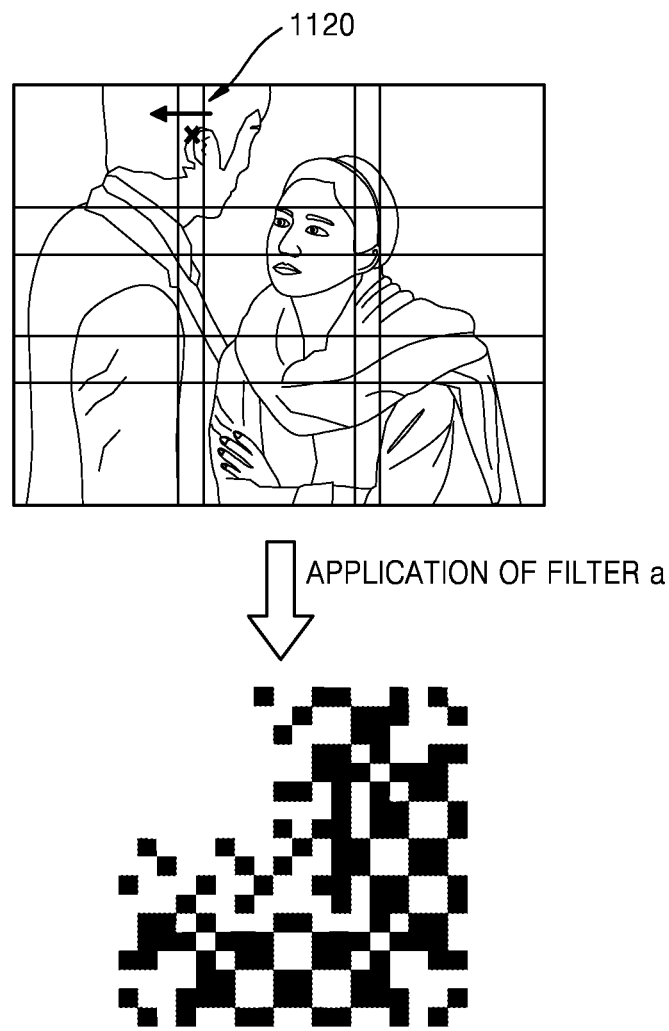
FIG. 11C is a view for explaining a method, performed by the edge data network 2000, of performing filtering by using a plurality of area-corresponding filters having overlapping areas between adjacent areas, according to various embodiments.

FIG. 11C is a view for explaining a method, performed by the edge data network 2000, of performing filtering using a plurality of area-corresponding filters having overlapping areas between adjacent areas, according to various embodiments.

Referring to FIG. 11C, when a current focus is located in an overlapping area 1120 between areas A and B, the size of a focus movement vector is greater than or equal to a predetermined size, and the direction of the focus movement vector is from the area B to the area A, the edge data network 2000 may determine a filter a corresponding to the area A in the overlapping area 1120, and may perform filtering on a first partial image corresponding to azimuth information by applying the filter a. However, the disclosure is not limited thereto, and the edge data network 2000 may determine a filter b corresponding to the area B, when the size of the focus movement vector is less than or equal to the predetermined size.

FIG. 12A is a flowchart of an operation procedure between an electronic device and an edge data network according to various embodiments.

Referring to FIG. 12A, in operation S1202, the edge data network 2000 may generate an area-corresponding filter corresponding to each of a plurality of predetermined areas and may store the generated plurality of area-corresponding filters.

In operation S1204, the edge data network 2000 may transmit information of the plurality of area-corresponding filters to the electronic device 1000.

In operation S1206, the electronic device 1000 may store the information of the plurality of area-corresponding filters.

In operation S1208, the electronic device 1000 may obtain azimuth information, focal position information, and focus movement vector information. In this case, a focus movement vector may refer, for example, to a vector having a focus position before a predetermined time as a starting point and a current focus position as an end point.

In operation S1210, the electronic device 1000 may transmit the azimuth information, the focal position information, and the focus movement vector information to the edge data network 2000.

In operation S1212, the edge data network 2000 may determine one area-corresponding filter among the plurality of area-corresponding filters, based on the focal position information and the focus movement vector information, and may generate a reduced first partial image by performing filtering on a first partial image corresponding to the azimuth information, based on information stored regarding the determined one area-corresponding filter. An example in which the electronic device 1000 determines one area-corresponding filter among the plurality of area-corresponding filters using the focal position information and the focus movement vector information has been described above with reference to FIGS. 11B and 11C.

In operation S1214, the edge data network 2000 may generate a first frame by encoding the reduced first partial image.

In operation S1216, the edge data network 2000 may transmit the first frame to the electronic device 1000.

In operation S1218, the electronic device 1000 may obtain a first partial image by decoding the first frame.

In operation S1220, the electronic device 1000 may determine one area-corresponding filter among the plurality of area-corresponding filters, based on the focal position information and the focus movement vector information, and may expand the first partial image using information stored regarding the determined area-corresponding filter.

In operation S1222, the electronic device 1000 may reconstruct the first partial image by interpolating the expanded first partial image.

In operation S1224, the electronic device 1000 may reproduce the reconstructed first partial image.

Figure 12B:
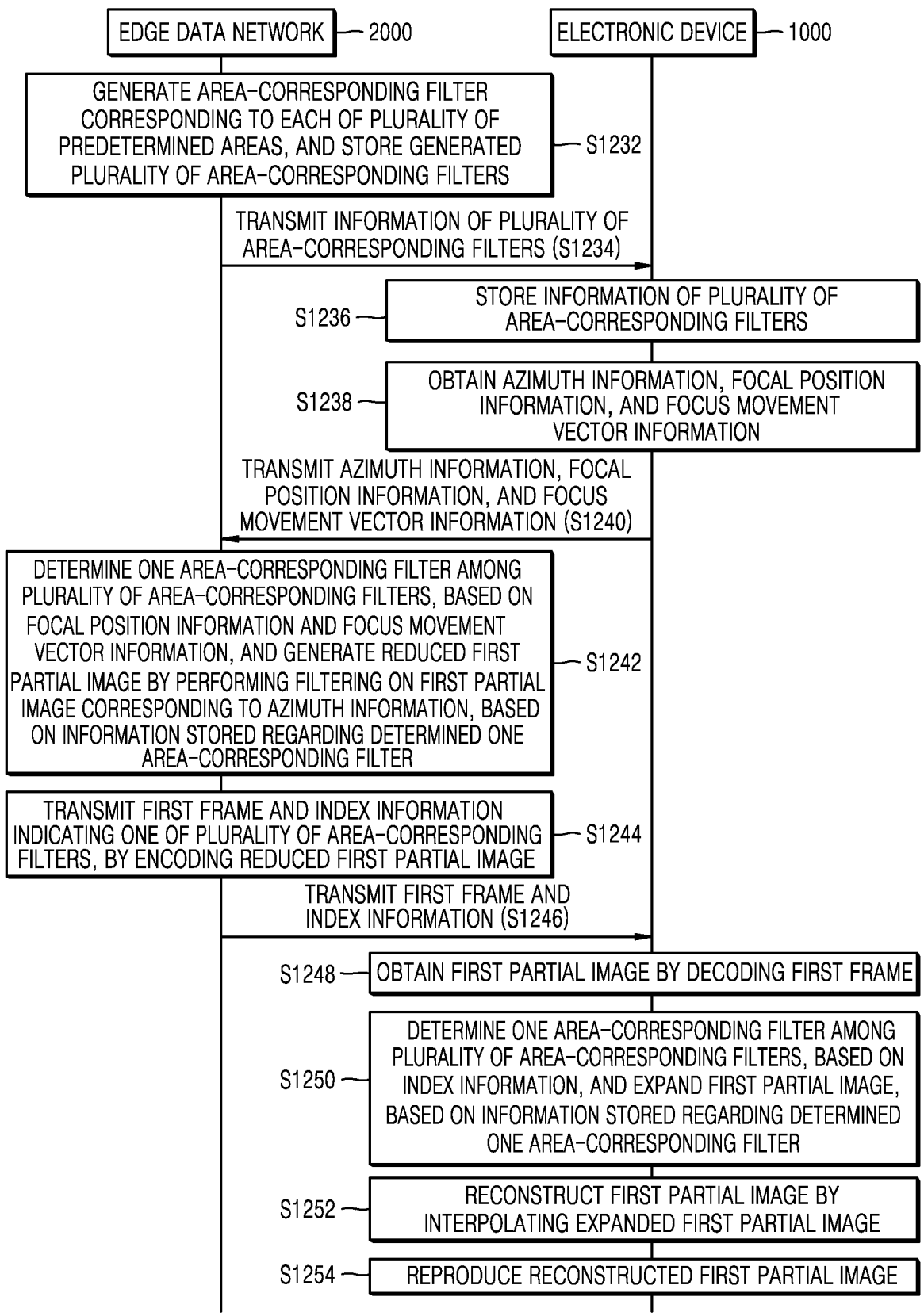
FIG. 12B is a flowchart of an operation procedure between an electronic device and an edge data network according to various embodiments.

FIG. 12B is a flowchart of an operation procedure between an electronic device and an edge data network according to various embodiments.

Operations other than operations S1244, S1246, and S1250 of FIG. 12B may correspond to those of FIG. 12A, and thus, detailed descriptions thereof will not be repeated.

In operation S1244, the edge data network 2000 may transmit a first frame and index information indicating one of a plurality of area-corresponding filters, by encoding a reduced first partial image.

In operation S1246, the edge data network 2000 may transmit the first frame and the index information to the electronic device 1000.

In operation S1250, the electronic device 1000 may determine one area-corresponding filter among the plurality of area-corresponding filters, based on the index information, and may expand the first partial image using information stored regarding the determined one area-corresponding filter.

Figure 12C:
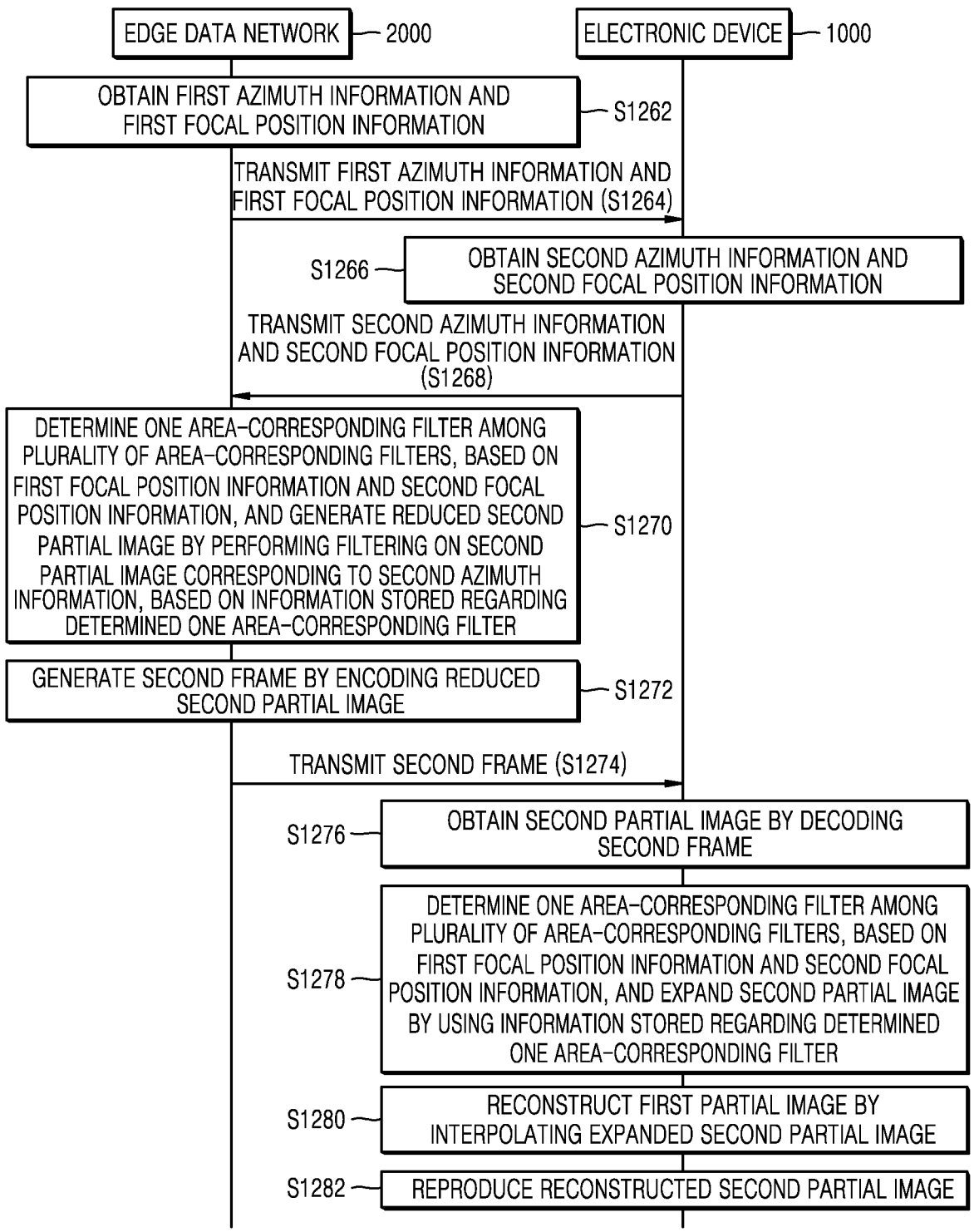
FIG. 12C is a flowchart of an operation procedure between an electronic device and an edge data network according to various embodiments.

FIG. 12C is a flowchart of an operation procedure between an electronic device and an edge data network according to various embodiments.

Operations other than operations S1262 through S1270 of FIG. 12C may correspond to those of FIG. 12A, and thus, detailed descriptions thereof will not be repeated. Although not shown in FIG. 12C, as described above with reference to FIGS. 12A and 12B, the edge data network 2000 may generate an area-corresponding filter corresponding to each of a plurality of areas, and the generated plurality of area-corresponding filters may be stored in the edge data network 2000 and the electronic device 1000.

Referring to FIG. 12C, in operation S1262, the electronic device 1000 may obtain first azimuth information and first focal position information. According to an embodiment, the electronic device 1000 may obtain a triaxial angle value indicating a location of a first partial image within a first VR image as the first azimuth information, using a sensing module included in the electronic device. According to another embodiment, the first azimuth information may include a plurality of pieces of azimuth information for partial images reproduced before the first partial image is reproduced by the electronic device.

According to an embodiment, the edge data network 2000 may further receive, in addition to the first azimuth information, from the electronic device 1000, information on a frame index indicating a frame number within a VR sequence (e.g., a frame number of a first partial image to be currently reproduced, but the disclosure is not limited thereto, or frame numbers of partial images reproduced before the first partial image is reproduced by the electronic device).

In operation S1264, the electronic device 1000 may transmit the first azimuth information and the first focal position information to the edge data network 2000. Thereafter, the electronic device 1000 and the edge data network 2000 may perform operations S1012 through S1024 of FIG. 10A.

In operation S1266, the electronic device 1000 may obtain second azimuth information and second focal position information. In this case, the electronic device 1000 may obtain the second azimuth information and the second focal position information after a predetermined time period after obtaining the first azimuth information and the first focal position information.

In operation S1268, the electronic device 1000 may transmit the second azimuth information and the second focal position information to the edge data network 2000. At this time, the electronic device 1000 may transmit, to the edge data network 2000, only changed information among azimuth information and focal position information.

In operation S1270, the edge data network 2000 may determine one area-corresponding filter among a plurality of area-corresponding filters, based on the first focal position information and the second focal position information, and may generate a reduced second partial image by performing filtering on a second partial image corresponding to the second azimuth information, based on information stored regarding the determined one area-corresponding filter.

According to an embodiment, the edge data network 2000 may determine whether there is a change in azimuth, based on the first azimuth information and the second azimuth information.

When a difference between a first azimuth and a second azimuth is within a predetermined range, the edge data network 2000 may determine that there is no change in the azimuth. When there is a change in the azimuth, the electronic device 1000 and the edge data network 2000 may perform operations S1012 through S1024 of FIG. 10A. For example, when an average of difference values for each angular component (e.g., a pitch value, a roll value, or a yaw value) between the first azimuth information and the second azimuth information is greater than a preset critical value, the edge data network 2000 may determine that the first azimuth information and the second azimuth information are not consistent with each other (there is a change in azimuth).

When it is determined that there is no difference between the first azimuth indicated by the first azimuth information and the second azimuth indicated by the second azimuth information, the electronic device 1000 may not transmit the second azimuth information. In this case, the edge data network 2000 may identify that the second azimuth information is not transmitted, and determine that there is no change in azimuth from the first azimuth.

When there is no change in azimuth, the edge data network 2000 may determine one area-corresponding filter among a plurality of area-corresponding filters, based on the first focal position information and the second focal position information, and may generate a reduced second partial image by performing filtering on a second partial image corresponding to the second azimuth information, based on information stored regarding the determined one area-corresponding filter. For example, the edge data network 2000 may determine one area-corresponding filter among the plurality of area-corresponding filters, based on a difference between a first focus position indicated by the first focus position information and a second focus position indicated by the second focus position information. At this time, focus movement vector information may be obtained from the difference between the first focus position and the second focus position, and the edge data network 2000 may perform an operation similar to operation S1212 of FIG. 12A.

In operation S1272, the edge data network 2000 may generate a second frame by encoding the reduced second partial image. The edge data network 2000 may generate a second frame by encoding the reduced second partial image.

In operation S1274, the edge data network 2000 may transmit the second frame to the electronic device 1000.

In operation S1276, the electronic device 1000 may obtain a second partial image by decoding the second frame.

In operation S1278, the electronic device 1000 may determine one area-corresponding filter among the plurality of area-corresponding filters, based on the first focal position information and the second focal position information, and may expand the second partial image using information stored regarding the determined one area-corresponding filter.

In operation S1280, the electronic device 1000 may reconstruct the second partial image by interpolating the expanded second partial image.

In operation S1282, the electronic device 1000 may reproduce the reconstructed second partial image.

In an embodiment, and, unlike the description given in operations S1272, S1274, and S1278, the edge data network

2000 may generate index information indicating one of the plurality of area-corresponding filters and transmit the index information to the electronic device 1000, and the electronic device 1000 may determine one area-corresponding filter among the plurality of area-corresponding filters, based on the index information.

Figure 13A:
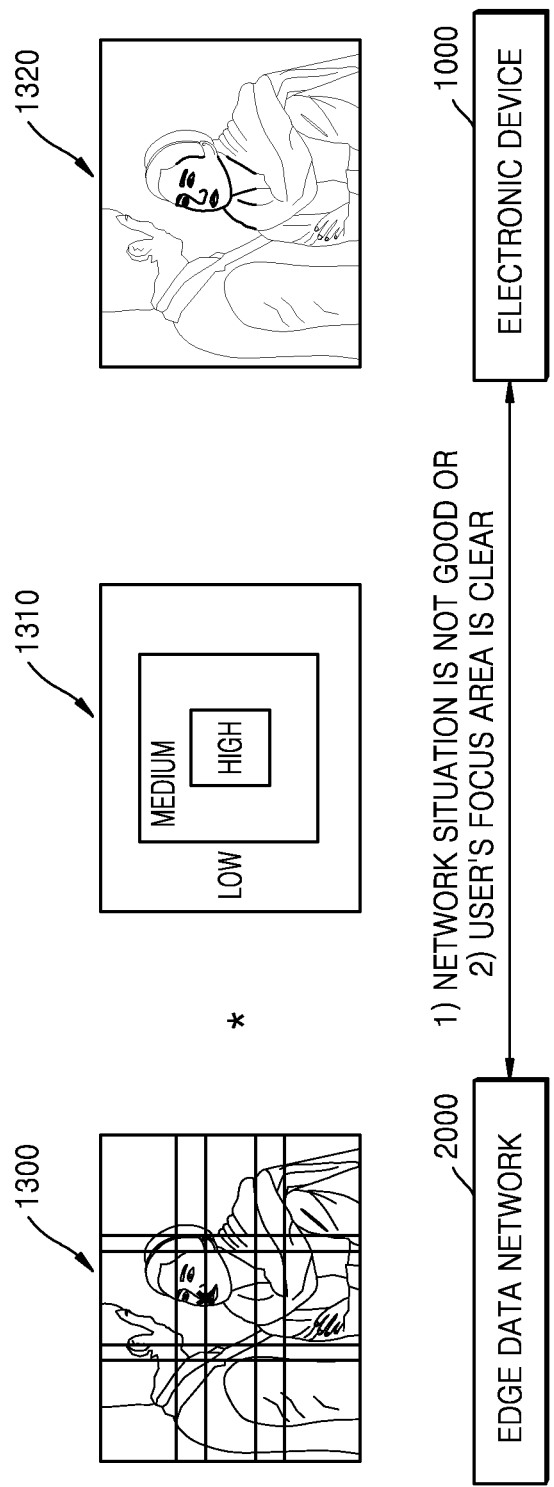
FIG. 13A is a view for explaining a filter used when a network situation is good or a user's focus area is clear, according to various embodiments.

FIG. 13A is a view for explaining a filter used when a network situation is good or a user's focus area is clear, according to various embodiments.

Referring to FIG. 13A, when a network connected to the electronic device 1000 is in poor condition or the user's focus area is clear, the edge data network 2000 may perform filtering on a first partial image 1300 using one area-corresponding filter 1310 corresponding to a focus position among a first filter set including a plurality of area-corresponding filters having narrow high-definition areas, thereby generating a filtered first partial image 1320. In this case, the focus area being clear may mean being in focus because the movement of the pupil is not large.

Figure 13B:
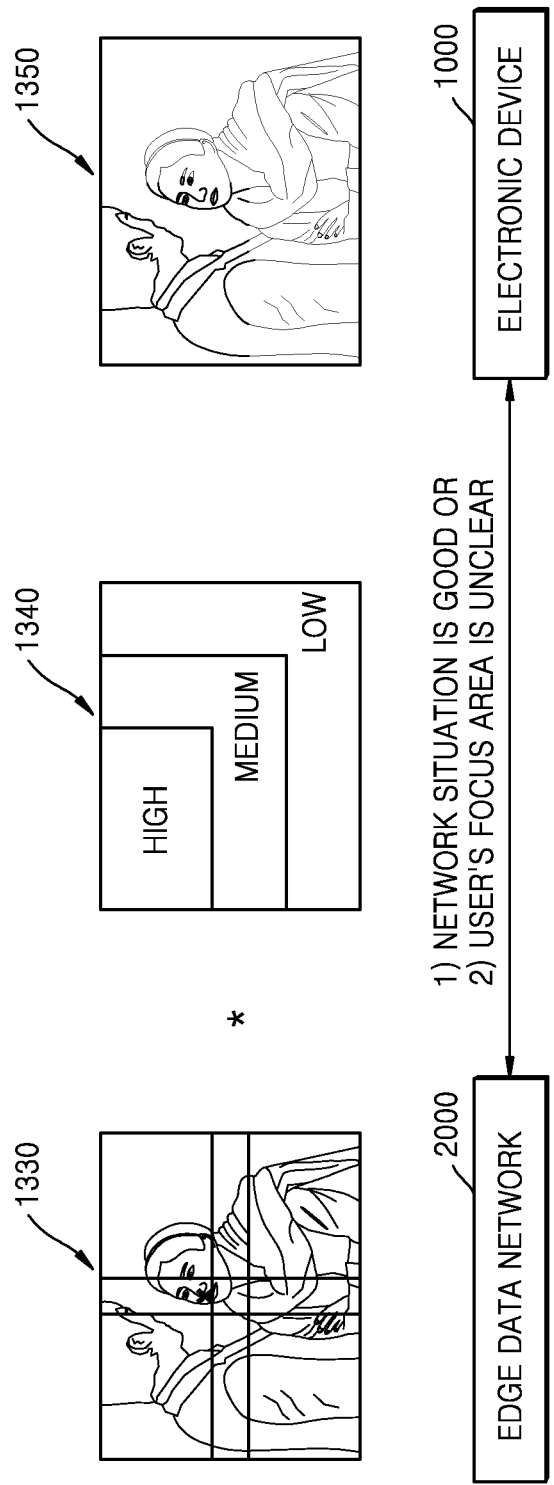
FIG. 13B is a view for explaining a filter used when a network situation is not good or a user's focus area is not clear, according to various embodiments.

FIG. 13B is a view for explaining a filter used when a network situation is not good or a user's focus area is not clear, according to various embodiments.

Referring to FIG. 13B, when a network connected to the electronic device 1000 is in good condition or the user's focus area is unclear, the edge data network 2000 may perform filtering on a first partial image 1330 using one area-corresponding filter 1340 corresponding to a focus position among a second filter set including a plurality of area-corresponding filters having wide high-definition areas, thereby generating a filtered first partial image 1350. The focus area being unclear may refer, for example, to being out of focus because the movement of the pupil is large (a movement speed of the pupil is high).

FIG. 14A is a flowchart of an operation procedure between an electronic device and an edge data network according to various embodiments.

Referring to FIG. 14A, in operation S1401, the edge data network 2000 may generate a plurality of area-corresponding filter sets, and may store the generated plurality of area-corresponding filter sets. One area-corresponding filter set may include a plurality of area-corresponding filters. In this case, the area-corresponding filter sets may be different from each other in terms of the sizes of a plurality of areas and the number of areas.

In operation S1402, the edge data network 2000 may transmit information of the plurality of area-corresponding filter sets to the electronic device 1000.

In operation S1403, the electronic device 1000 may store the information of the plurality of area-corresponding filter sets.

In operation S1404, the electronic device 1000 may obtain azimuth information and focal position information.

In operation S1405, the electronic device 1000 may transmit the azimuth information and the focal position information to the edge data network 2000. At this time, network information may also be transmitted.

In operation S1406, the edge data network 2000 may determine one area-corresponding filter set among the plurality of area-corresponding filter sets, based on the network information. As described above, the network information may be received from the electronic device 1000, but the disclosure is not limited thereto, and the edge data network 2000 may not receive the network information from the electronic device 1000. The network information may, for example, be information about a network condition (e.g., a connection state), but the disclosure is not limited thereto, and pieces of information, such as a target bit rate and a target resolution, may also be used as information for determining a corresponding filter set.

The edge data network 2000 may determine one area-corresponding filter among the plurality of area-corresponding filters included in the one area-corresponding filter set, based on the focal position information, and may generate a reduced first partial image by performing filtering on a first partial image corresponding to the azimuth information, based on information stored regarding the determined one area-corresponding filter.

In operation S1407, the edge data network 2000 may generate a first frame by encoding the reduced first partial image.

In operation S1408, the edge data network 2000 may transmit the first frame to the electronic device 1000.

In operation S1409, the electronic device 1000 may obtain a first partial image by decoding the first frame.

In operation S1410, the electronic device 1000 may determine one area-corresponding filter set among the plurality of area-corresponding filter sets, based on the network information. The electronic device 1000 may determine one area-corresponding filter among the plurality of area-corresponding filters included in the one area-corresponding filter set, based on the focal position information, and may expand the first partial image by using information stored regarding the determined one area-corresponding filter.

In operation S1411, the electronic device 1000 may reconstruct the first partial image by interpolating the expanded first partial image.

In operation S1412, the electronic device 1000 may reproduce the reconstructed first partial image.

Figure 14B:
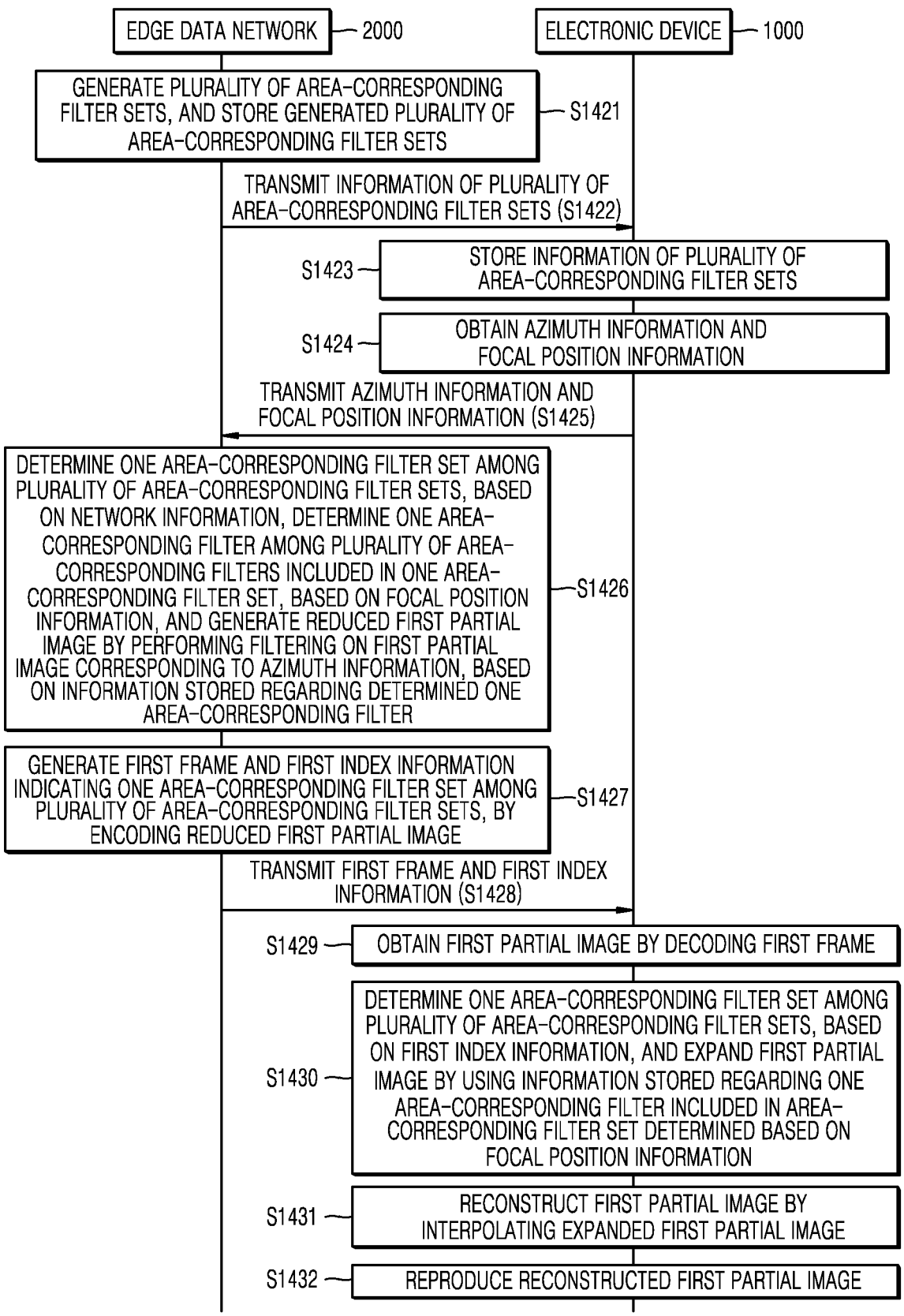
FIG. 14B is a flowchart of an operation procedure between an electronic device and an edge data network according to various embodiments.

FIG. 14B is a flowchart of an operation procedure between an electronic device and an edge data network according to various embodiments.

Operations other than operations S1427, S1428, and S1430 of FIG. 14B may correspond to those of FIG. 14A, and thus, detailed descriptions thereof will not be repeated.

In operation S1427, the edge data network 2000 may generate a first frame and first index information indicating one area-corresponding filter set among a plurality of area-corresponding filter sets, by encoding a reduced first partial image.

In operation S1428, the edge data network 2000 may transmit the first frame and the first index information to the electronic device 1000.

In operation S1430, the electronic device 1000 may determine one area-corresponding filter set among the plurality of area-corresponding filter sets, based on the first index information, and may expand the first partial image using information stored regarding one area-corresponding filter included in the area-corresponding filter set determined based on the focal position information.

Figure 14C:
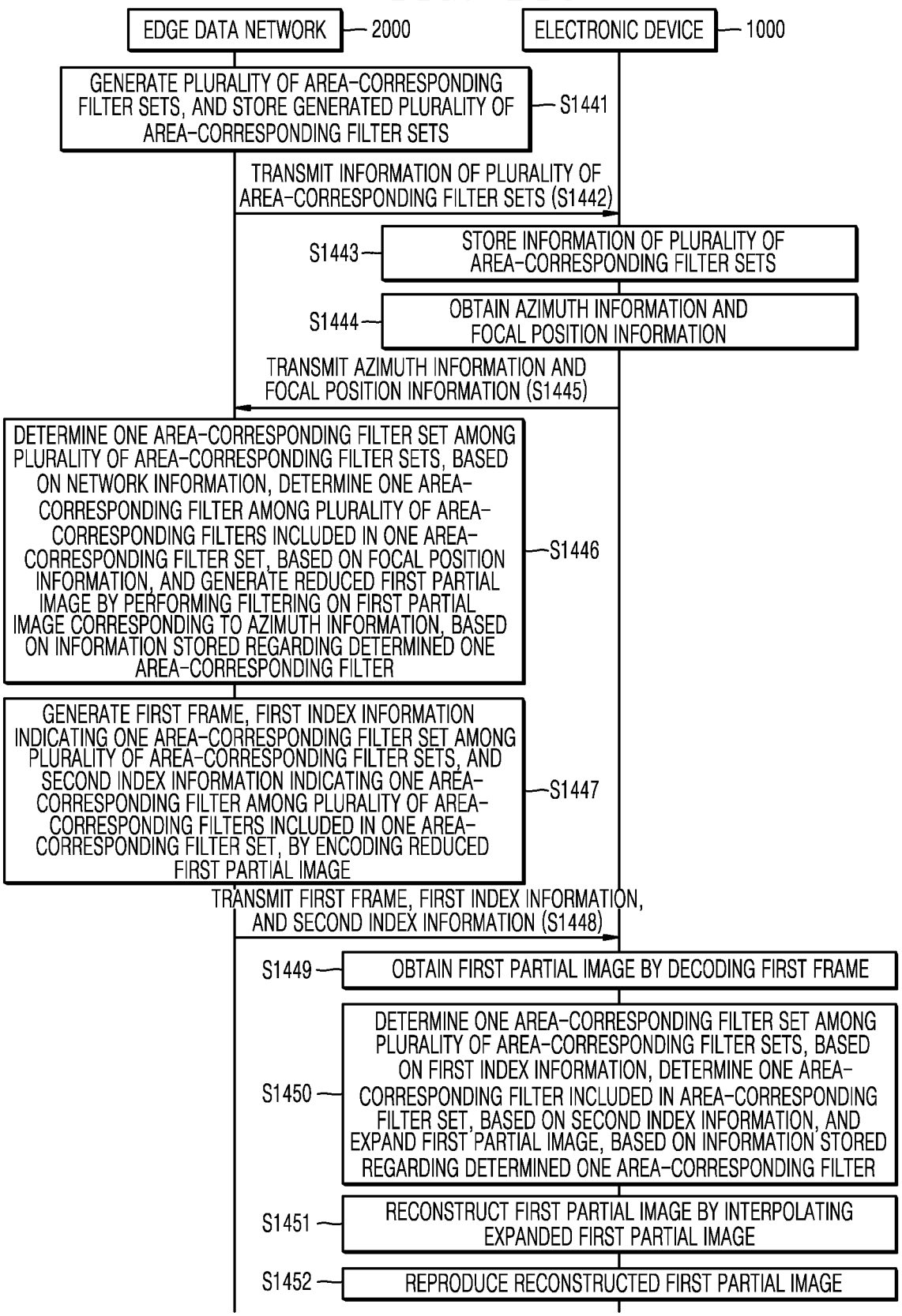
FIG. 14C is a flowchart of an operation procedure between an electronic device and an edge data network according to various embodiments.

FIG. 14C is a flowchart of an operation procedure between an electronic device and an edge data network according to various embodiments.

Operations other than operations S1447, S1448, and S1450 of FIG. 14C may correspond to those of FIG. 14A, and thus, detailed descriptions thereof will not be repeated.

In operation S1447, the edge data network 2000 may generate a first frame, first index information indicating one area-corresponding filter set among a plurality of area-corresponding filter sets, and second index information indicating one area-corresponding filter among a plurality of area-corresponding filters included in the one area-corresponding filter set, by encoding a reduced first partial image.

In operation S1448, the edge data network 2000 may transmit the first frame, the first index information, and the second index information to the electronic device 1000.

In operation S1450, the electronic device 1000 may determine one area-corresponding filter set among the plurality of area-corresponding filter sets, based on the first index information. The electronic device 1000 may determine one area-corresponding filter included in the one area-corresponding filter set, based on the second index information, and may expand a first partial image, based on information stored regarding the determined one area-corresponding filter.

Figure 14D:
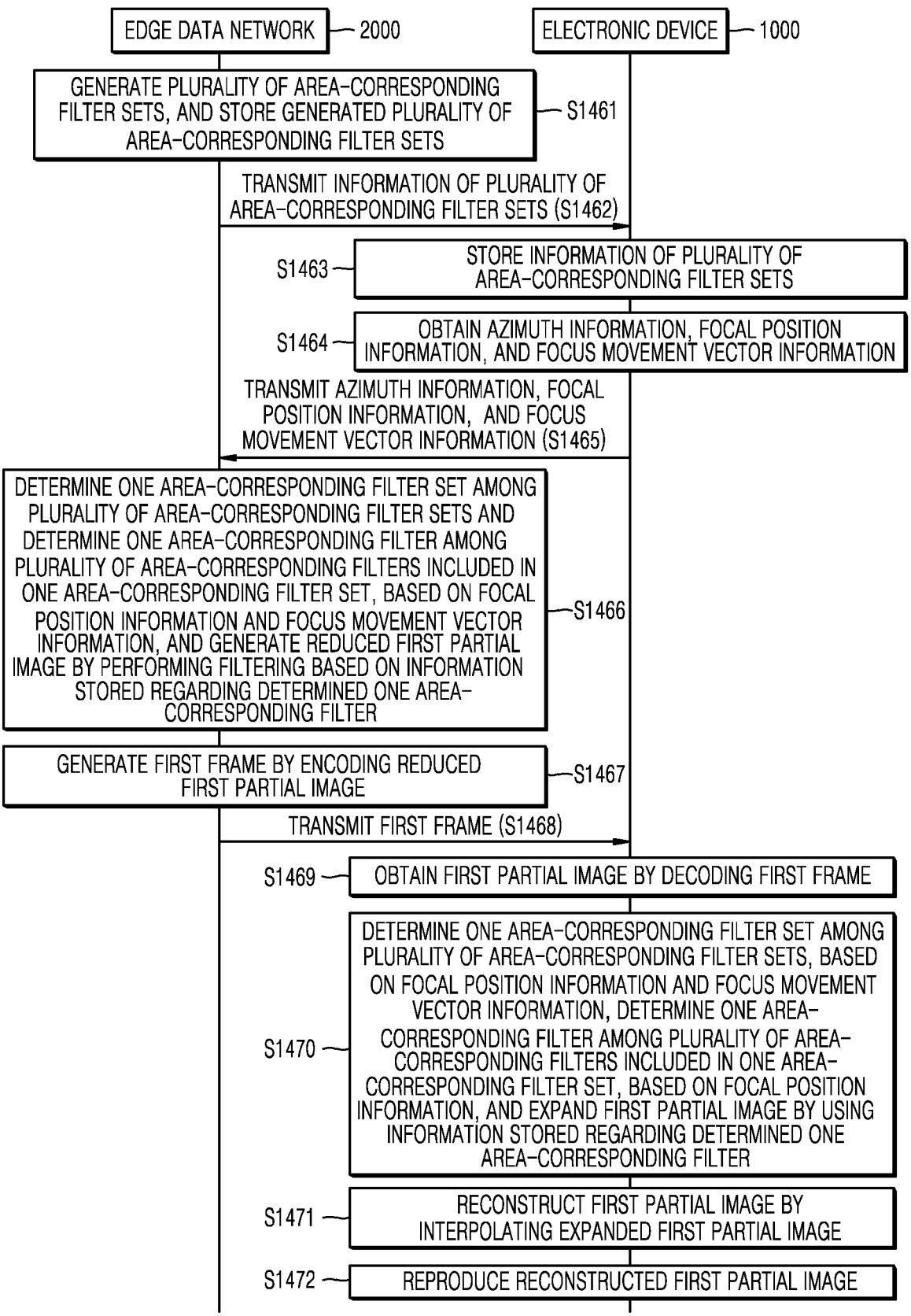
FIG. 14D is a flowchart of an operation procedure between an electronic device and an edge data network according to various embodiments.

FIG. 14D is a flowchart of an operation procedure between an electronic device and an edge data network according to various embodiments.

Operations other than operations S1464, S1465, S1466, and S1470 of FIG. 14D may correspond to those of FIG. 14A, and thus, detailed descriptions thereof will not be repeated.

In operation S1464, the electronic device 1000 may obtain azimuth information, focal position information, and focus movement vector information.

In operation S1465, the electronic device 1000 may transmit the azimuth information, the focal position information, and the focus movement vector information to the edge data network 2000.

In operation S1466, the edge data network 2000 may determine one area-corresponding filter set among a plurality of area-corresponding filter sets and determine one area-corresponding filter among a plurality of area-corresponding filters included in the one area-corresponding filter set, based on the focal position information and the focus movement vector information, and may generate a reduced first partial image by performing filtering based on information stored regarding the determined one area-corresponding filter.

In operation S1470, the electronic device 1000 may determine one area-corresponding filter set among the plurality of area-corresponding filter sets and determine one area-corresponding filter among the plurality of area-corresponding filters included in the one area-corresponding filter set, based on the focal position information and the focus movement vector information. The electronic device 1000 may expand a first partial image, based on information stored regarding the determined one area-corresponding filter.

The disclosure is not limited thereto, and it may be understood that an area-corresponding filter may be determined using previously-obtained focal position information instead of the focus movement vector information. As described above with reference to FIGS. 14B through 14C, it may be understood that the electronic device 1000 may determine an area-corresponding filter by further transmitting first index information indicating one area-corresponding filter set among a plurality of area-corresponding filter sets and second index information indicating one area-corresponding filter among a plurality of area-corresponding filters included in the one area-corresponding filter set, together with a first frame.

Figure 15:
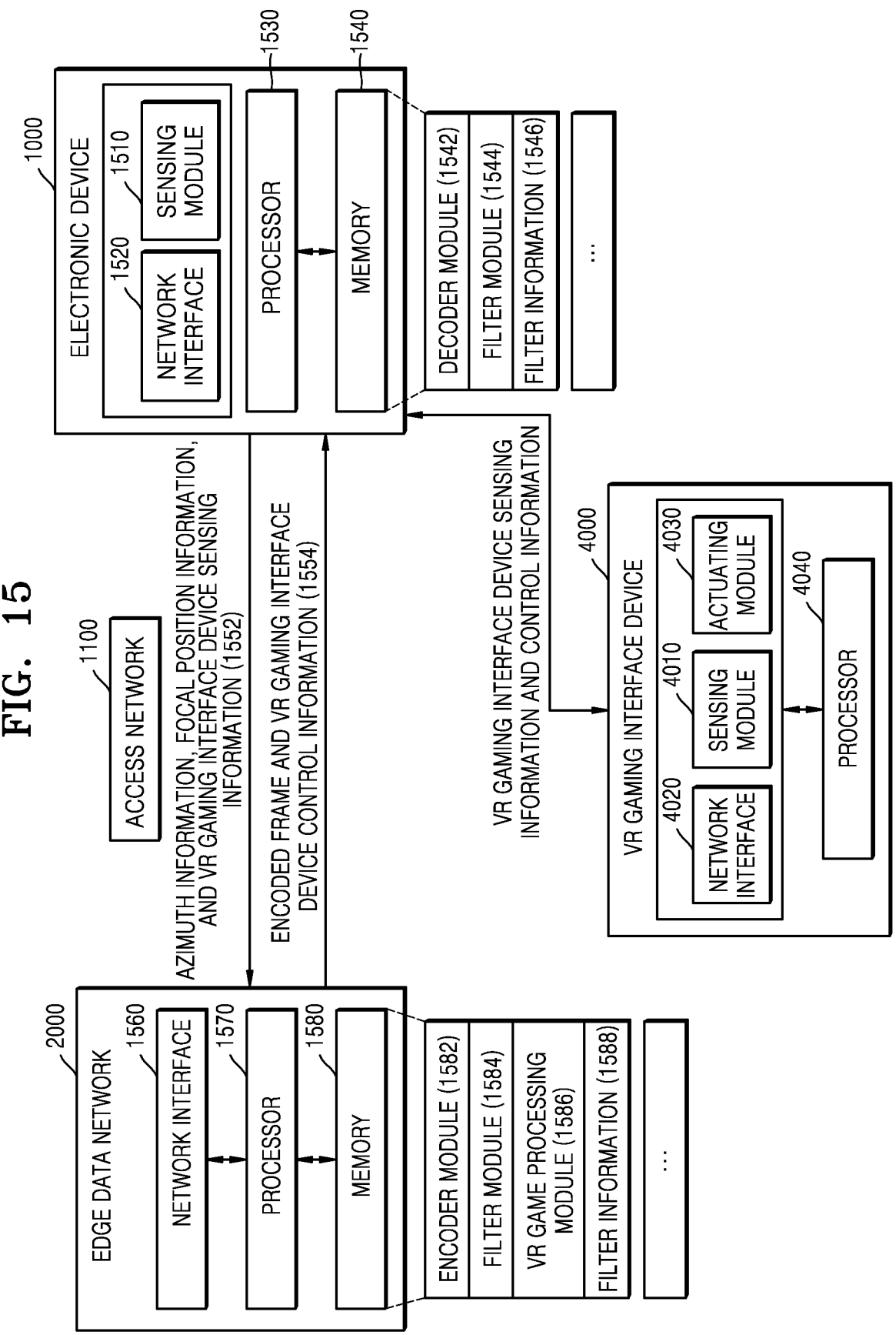
FIG. 15 is a diagram for schematically explaining an operation procedure between an electronic device, an edge data network, and a VR gaming interface device.

FIG. 15 is a diagram for schematically explaining an operation procedure between an electronic device, an edge data network, and a VR gaming interface device.

Referring to FIG. 15, unlike FIG. 5, a VR gaming interface device 4000 is further illustrated. In the VR gaming field, unlike the VR streaming field, a user's interaction exists, and accordingly, the VR gaming interface device 4000 may be used in addition to the electronic device 1000.

The operation procedure between the electronic device and the edge data network in the VR streaming field has been described above with reference to FIG. 5, and thus, a repetitive description thereof will not be repeated. The operation procedure between the electronic device, the edge data network, and the VR gaming interface device in the VR gaming field will be described below.

The edge data network 2000 may generate a VR game image (interactive VR image) included in a VR sequence, based on instructions of a VR game processing module 1586.

In detail, the VR game processing module 1586 may store instructions for generating a first partial image of the VR game image, based on azimuth information, focal position information, and VR gaming interface device sensing information 1552. The VR game processing module 1586 may store instructions for outputting VR gaming interface device control information 1554.

The electronic device 1000 may transmit the VR gaming interface device sensing information 1552 to the edge data network 2000 in order to perform VR game processing. In this case, the electronic device 1000 may receive VR gaming interface device sensing information from the VR gaming interface device 4000.

The VR gaming interface device 4000 may include a network interface 4020, a sensing module 4010, and an actuating module 4030. The network interface 4020 may be a module for communicating with the outside, and the sensing module 4010 may be a module for sensing a motion of the user. The sensing module 4010 may obtain the VR gaming interface device sensing information.

The actuating module 4030 may be a module that provides the user with various types of outputs (e.g., haptic feedback), such as vibrations. The actuating module 4030 may provide the user with various types of outputs, based on VR gaming interface device sensing control information.

The VR gaming interface device 4000 may transmit the VR gaming interface device sensing information to the electronic device 1000. The VR gaming interface device 4000 may receive the VR gaming interface device control information from the electronic device 1000.

It has been described above that the VR interface device sensing information is transmitted to the edge data network 2000 via the electronic device 1000, or the VR interface device sensing information and the VR gaming interface device control information are transmitted to the VR gaming interface device 4000 via the electronic device 1000. However, the disclosure is not limited thereto, and they may be directly exchanged between the VR gaming interface device 4000 and the edge data network 2000. In this case, synchronization information for synchronization with the electronic device 1000 may be also transmitted.

Although the operation procedure between the electronic device, the edge data network, and the VR gaming interface device in the VR gaming field has described above with respect to FIG. 15, the disclosure is not limited thereto, and it will be understood that interactive VR may be mainly utilized in many fields in which a user may directly intervene in content and perform activities, e.g., simulation, training, or the like.

Figure 16:
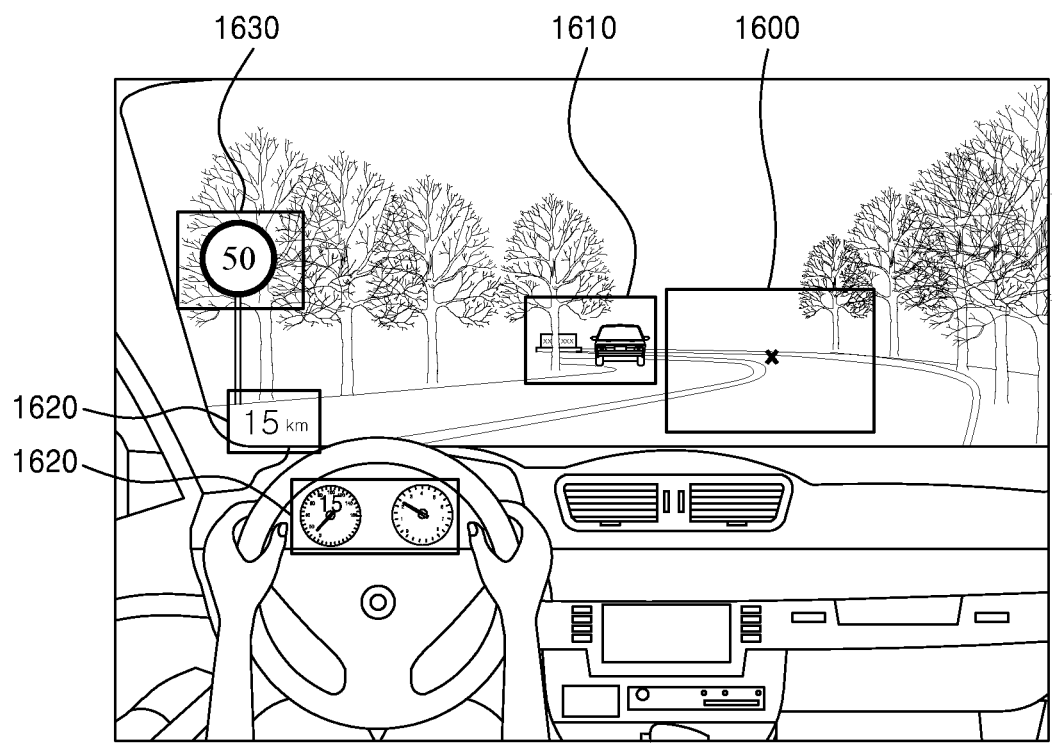
FIG. 16 is a view for explaining an operation of additionally filtering a focus movement prediction area and an interface area in a VR gaming field, according to various embodiments.

FIG. 16 is a view for explaining an operation of additionally filtering a focus movement prediction area and an interface area in the VR gaming field, according to various embodiments.

Referring to FIG. 16, when a user is watching a VR racing game image, the focus of the user's pupil may be located on a road in front of a vehicle. However, according to an expected travel direction of the vehicle, the user is highly likely to see the road to be reached in the future. In other words, the edge data network 2000 may additionally filter a focus movement expected area 1610 other than a focus area 1600 according to the expected travel direction of the vehicle. An interface area 1620 or a major terrain feature area 1630 may be difficult to identify when it becomes blurred, because it is displayed with text, or may be an important part in the progress of a game. The edge data network 2000 may further filter the interface area 1620 or the major terrain feature area 1630.

The electronic device 1000 and the edge data network 2000 may previously determine a portion of an area to be additionally filtered other than a focus area when a VR gaming application is executed, or the edge data network 2000 may dynamically transmit information about the area to be additionally filtered to the electronic device 1000. The information about the area to be filtered may be index information indicating at least one split area among predetermined split areas of an image. The disclosure is not limited thereto, and, when the area to be filtered is a rectangular area, information about the area to be filtered may be information about the location of an upper left vertex (reference point) and the size of the area, and, when the area to be filtered is a circular area, the area to be filtered may be information about a central location and a radius (in the case of an ellipse, a radius by a long axis and a short axis). In this case, in order to reduce the amount of information, limited candidates may be determined and the information about the area to be filtered may be transmitted in the form of index information indicating one of the limited candidates. However, the disclosure is not limited thereto, and various techniques for reducing the amount of information may be used.

FIG. 17A is a flowchart of a method, performed by an edge data network, of streaming image content, according to various embodiments.

Referring to FIG. 17A, in operation S1702, the edge data network 2000 may obtain azimuth information and focal position information from an electronic device.

In operation S1704, the edge data network 2000 may determine one filter among a plurality of filters, based on the focal position information.

In operation S1706, the edge data network 2000 may generate a filtered first partial image by performing filtering on a first partial image corresponding to the azimuth information using the filter determined based on the focal position information.

In operation S1708, the edge data network 2000 may generate a first frame by encoding the filtered first partial image.

In operation S1710, the edge data network 2000 may transmit the first frame to the electronic device.

Figure 17B:
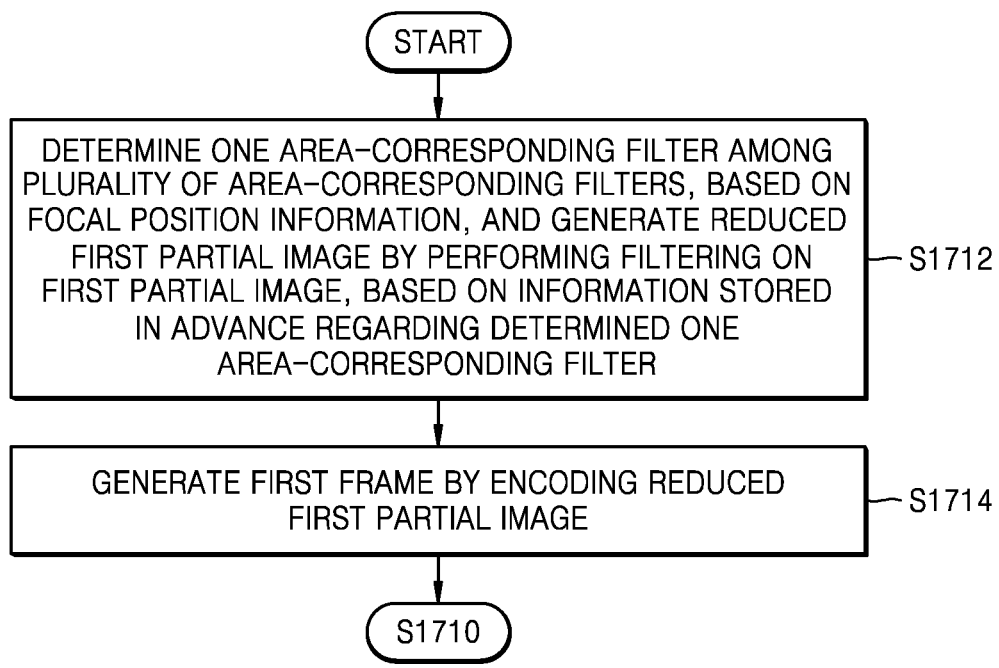
FIG. 17B is a flowchart for explaining, in detail, a method, performed by an edge data network, of determining an area-corresponding filter, based on focal position information, and filtering a first partial image, based on information stored in advance with respect to the determined area-corresponding filter, according to various embodiments.

FIG. 17B is a flowchart for explaining, in detail, a method, performed by an edge data network, of determining an area-corresponding filter, based on focal position information, and filtering a first partial image, based on information stored in advance with respect to the determined area-corresponding filter, according to various embodiments.

Referring to FIG. 17B, in operation S1712, the edge data network 2000 may determine one area-corresponding filter among a plurality of area-corresponding filters, based on the focal position information, and may generate a reduced first partial image by performing filtering on the first partial image, based on information stored in advance regarding the determined one area-corresponding filter.

In operation S1714, the edge data network 2000 may generate a first frame by encoding the reduced first partial image.

Figure 17C:
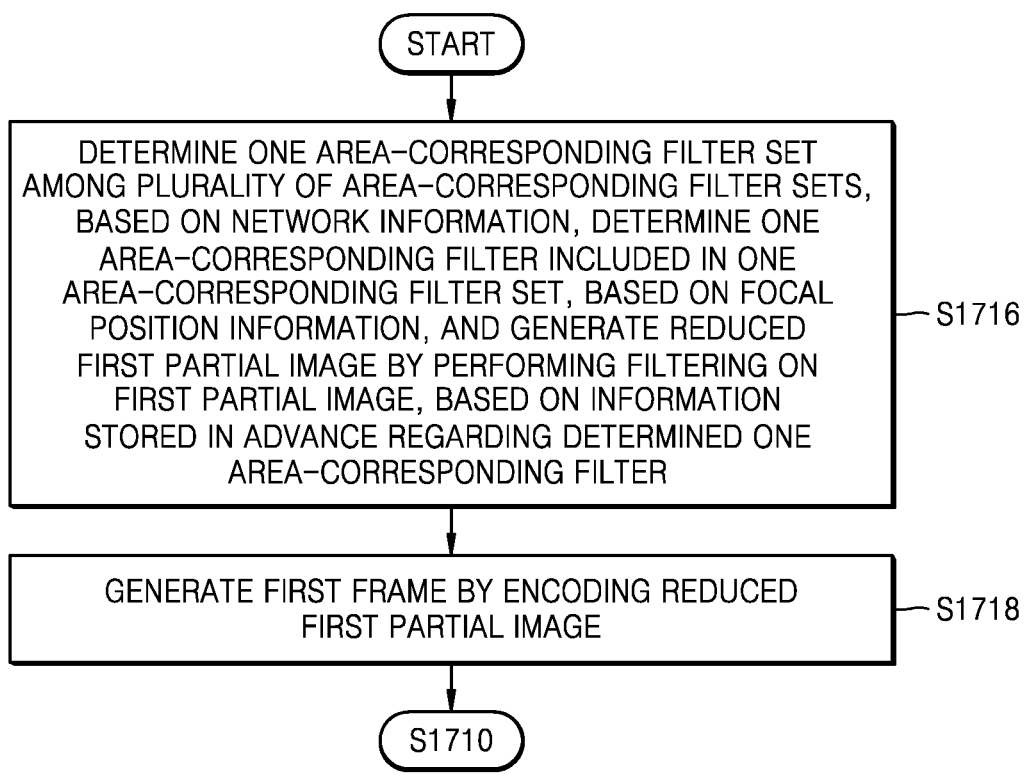
FIG. 17C is a flowchart for explaining, in detail, a method, performed by an edge data network, of determining an area-corresponding filter, based on focal position information, and filtering a first partial image, based on information stored in advance with respect to the determined area-corresponding filter, according to various embodiments.

FIG. 17C is a flowchart for explaining, in detail, a method, performed by an edge data network, of determining an area-corresponding filter, based on focal position information, and filtering a first partial image, based on information stored in advance with respect to the determined area-corresponding filter, according to various embodiments.

Referring to FIG. 17C, in operation S1716, the edge data network 2000 may determine one area-corresponding filter set among a plurality of area-corresponding filter sets, based on network information, may determine one area-corresponding filter included in the one area-corresponding filter set, based on the focal position information, and may generate a reduced first partial image by performing filtering on the first partial image, based on information stored in advance regarding the determined one area-corresponding filter.

In operation S1718, the edge data network 2000 may generate a first frame by encoding the reduced first partial image.

Figure 17D:
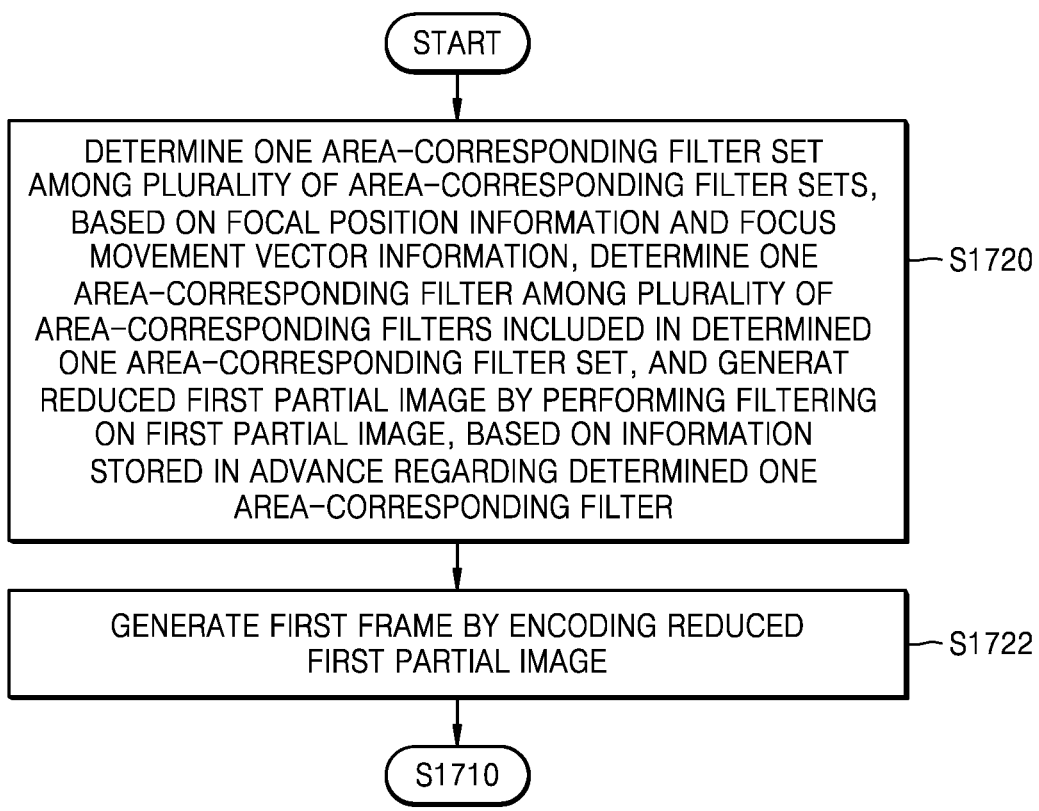
FIG. 17D is a flowchart for explaining, in detail, a method, performed by an edge data network, of determining an area-corresponding filter, based on focal position information, and filtering a first partial image, based on information stored in advance with respect to the determined area-corresponding filter, according to various embodiments.

FIG. 17D is a flowchart for explaining, in detail, a method, performed by an edge data network, of determining an area-corresponding filter, based on focal position information, and filtering a first partial image, based on information stored in advance with respect to the determined area-corresponding filter, according to various embodiments.

In operation S1720, the edge data network 2000 may determine one area-corresponding filter set among a plurality of area-corresponding filter sets, based on the focal position information and focus movement vector information, may determine one area-corresponding filter among a plurality of area-corresponding filters included in the determined one area-corresponding filter set, and may generate a reduced first partial image for the first partial image, based on information stored in advance regarding the determined one area-corresponding filter.

In operation S1722, the edge data network 2000 may generate a first frame by encoding the reduced first partial image.

Figure 18A:
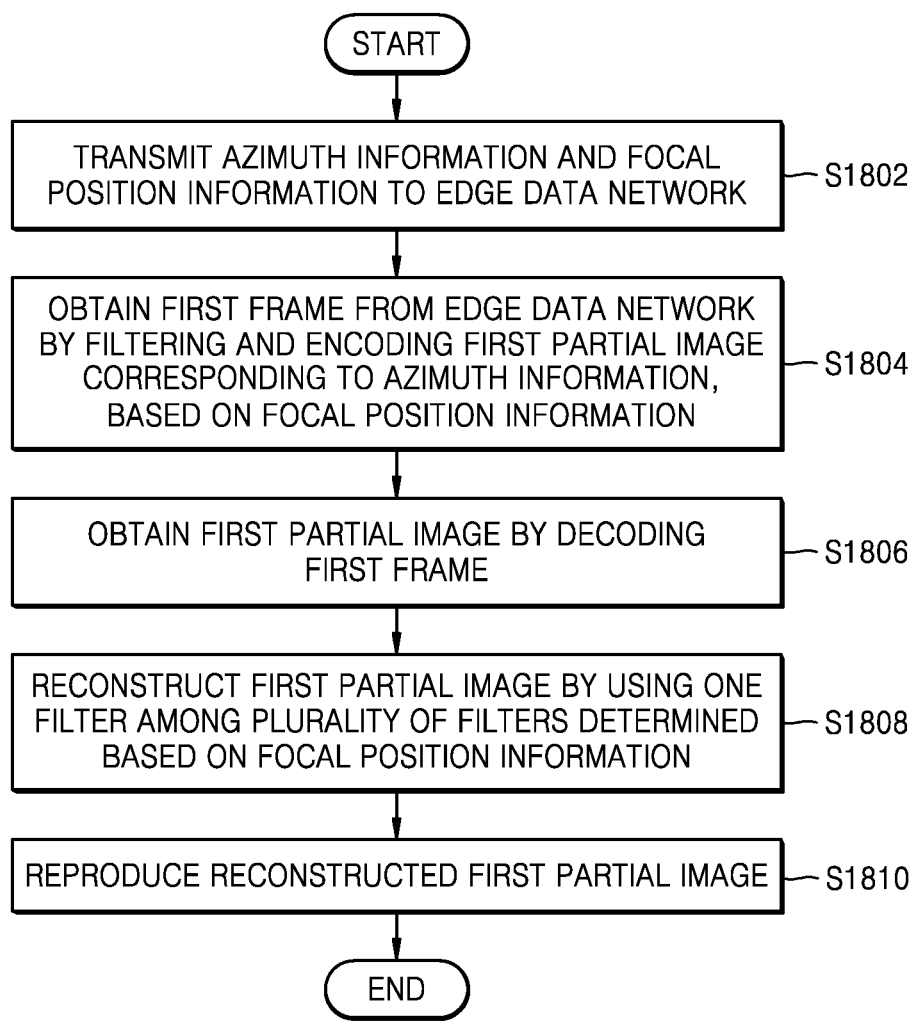
FIG. 18A is a flowchart of a method, performed by an electronic device, of streaming image content obtained from an edge data network, according to an various embodiments.

FIG. 18A is a flowchart of a method, performed by an electronic device, of streaming image content obtained from an edge data network, according to various embodiments.

In operation S1802, the electronic device 1000 may transmit azimuth information and focal position information to the edge data network 2000.

In operation S1804, the electronic device 1000 may obtain a first frame from the edge data network 2000 obtained by filtering and encoding a first partial image corresponding to the azimuth information, based on the focal position information.

In operation S1806, the electronic device 1000 may obtain the first partial image by decoding the first frame.

In operation S1808, the electronic device 1000 may reconstruct the first partial image using one filter among a plurality of filters determined based on the focal position information. The disclosure is not limited thereto, and, in some cases, this operation may be omitted, and the first partial image obtained by decoding the first frame may be a reconstructed first partial image.

In operation S1810, the electronic device 1000 may reproduce the reconstructed first partial image.

Figure 18B:
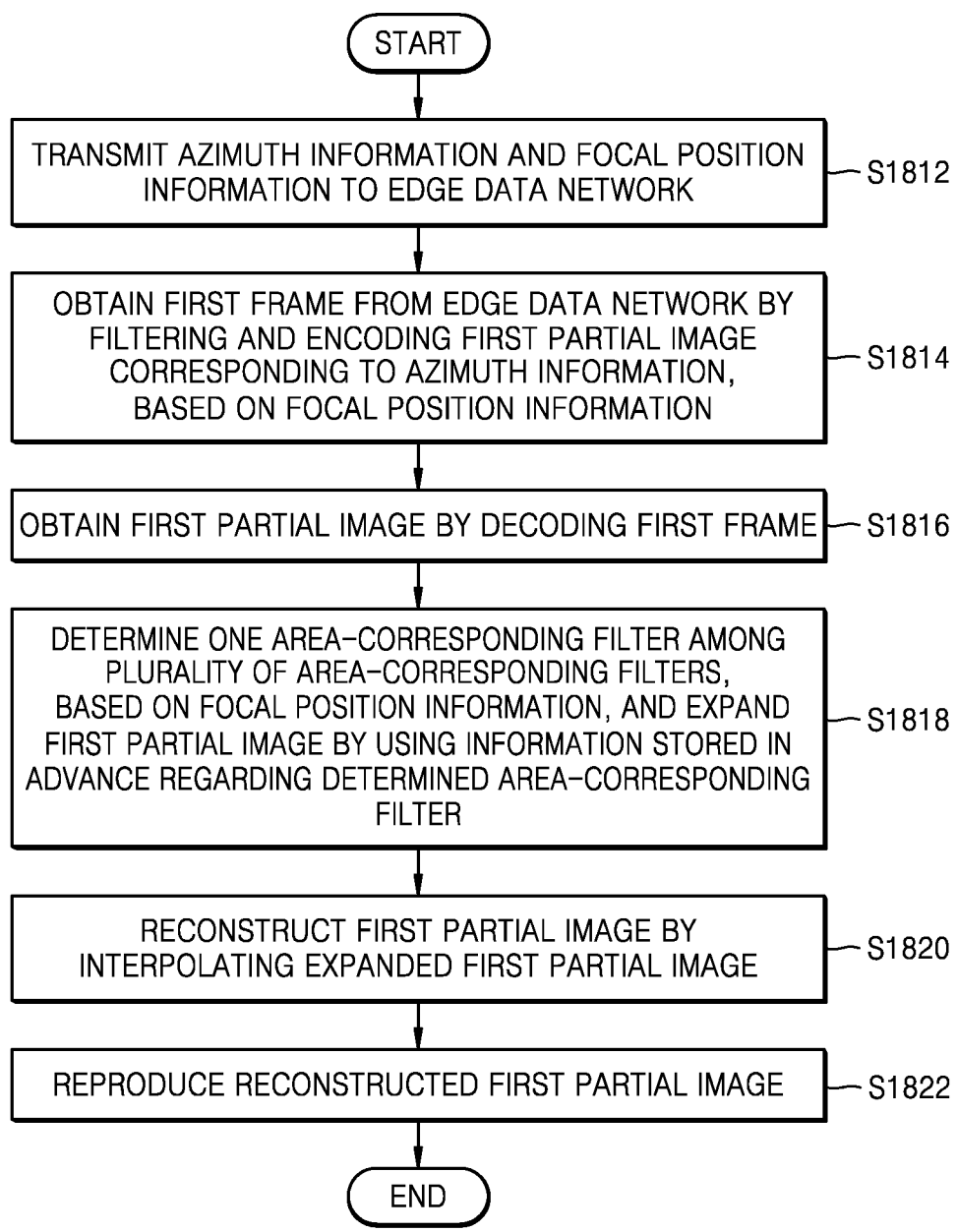
FIG. 18B is a flowchart of a method, performed by an electronic device, of streaming image content obtained from an edge data network, according to various embodiments.

FIG. 18B is a flowchart of a method, performed by an electronic device, of streaming image content obtained from the edge data network 2000, according to various embodiments.

In operation S1812, the electronic device 1000 may transmit azimuth information and focal position information to the edge data network 2000.

In operation S1814, the electronic device 1000 may obtain a first frame from the edge data network 2000 by filtering and encoding a first partial image corresponding to the azimuth information, based on the focal position information.

In operation S1816, the electronic device 1000 may obtain the first partial image by decoding the first frame.

In operation S1818, the electronic device 1000 may determine one area-corresponding filter among a plurality of area-corresponding filters, based on the focal position information, and may expand the first partial image using information stored in advance regarding the determined area-corresponding filter.

In operation S1820, the electronic device 1000 may reconstruct the first partial image by interpolating the expanded first partial image.

In operation S1822, the electronic device 1000 may reproduce the reconstructed first partial image.

Figure 18C:
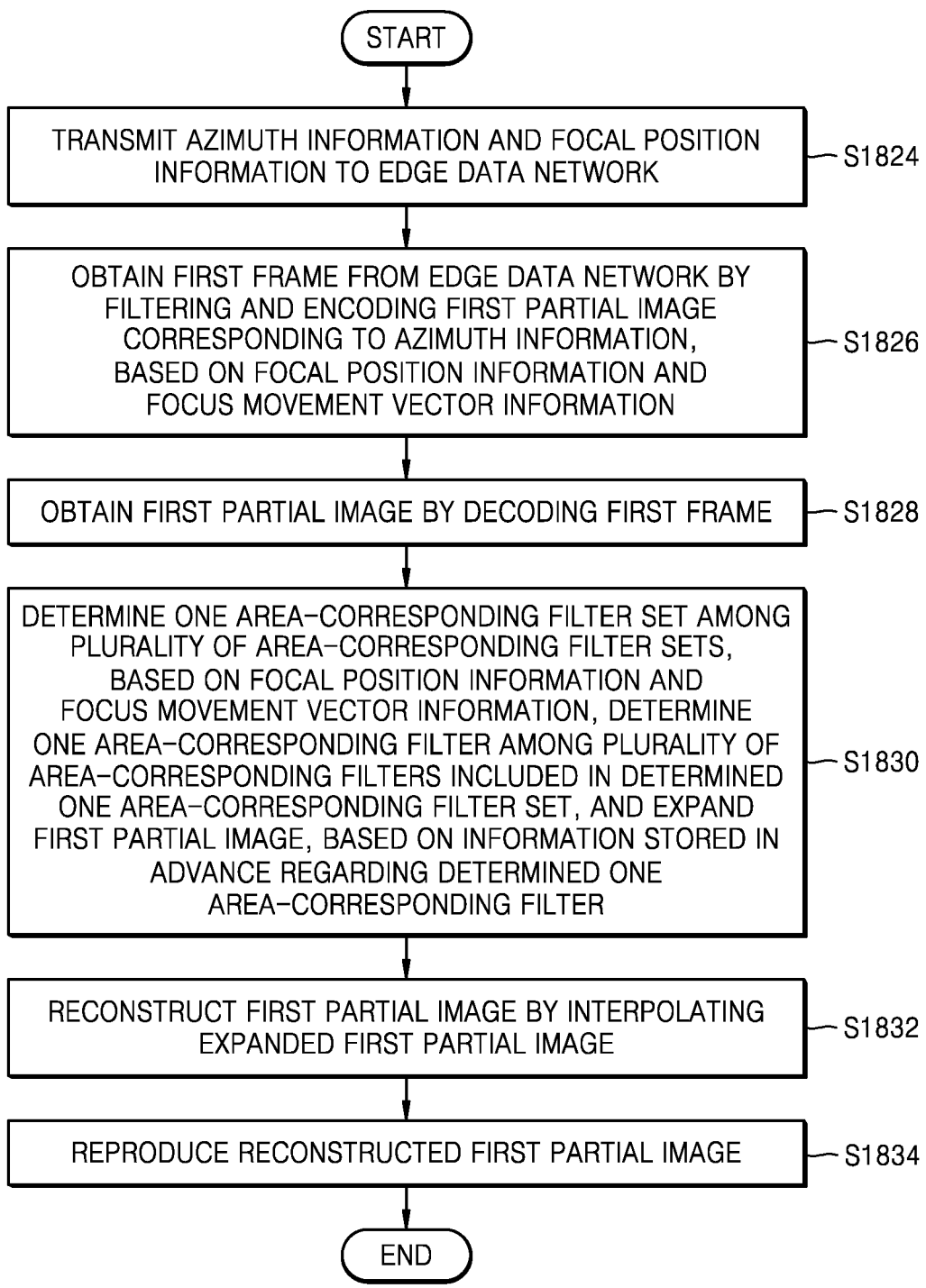
FIG. 18C is a flowchart of a method, performed by an electronic device, of streaming image content obtained from an edge data network, according to various embodiments.

FIG. 18C is a flowchart of a method, performed by an electronic device, of streaming image content obtained from the edge data network 2000, according to various embodiments.

Referring to FIG. 18C, in operation S1824, the electronic device 1000 may transmit azimuth information, focal position information, and focus movement vector information to the edge data network 2000.

In operation S1826, the electronic device 1000 may obtain a first frame from the edge data network 2000 obtained by filtering and encoding a first partial image corresponding to the azimuth information, based on the focal position information and the focus movement vector information.

In operation S1828, the electronic device 1000 may obtain the first partial image by decoding the first frame.

In operation S1830, the electronic device 1000 may determine one area-corresponding filter set among a plurality of area-corresponding filter sets, based on the focal position information and the focus movement vector information, may determine one area-corresponding filter among a plurality of area-corresponding filters included in the determined one area-corresponding filter set, and may expand the first partial image, based on information stored in advance regarding the determined one area-corresponding filter.

In operation S1832, the electronic device 1000 may reconstruct the first partial image by interpolating the expanded first partial image.

In operation S1834, the electronic device 1000 may reproduce the reconstructed first partial image.

Figure 18D:
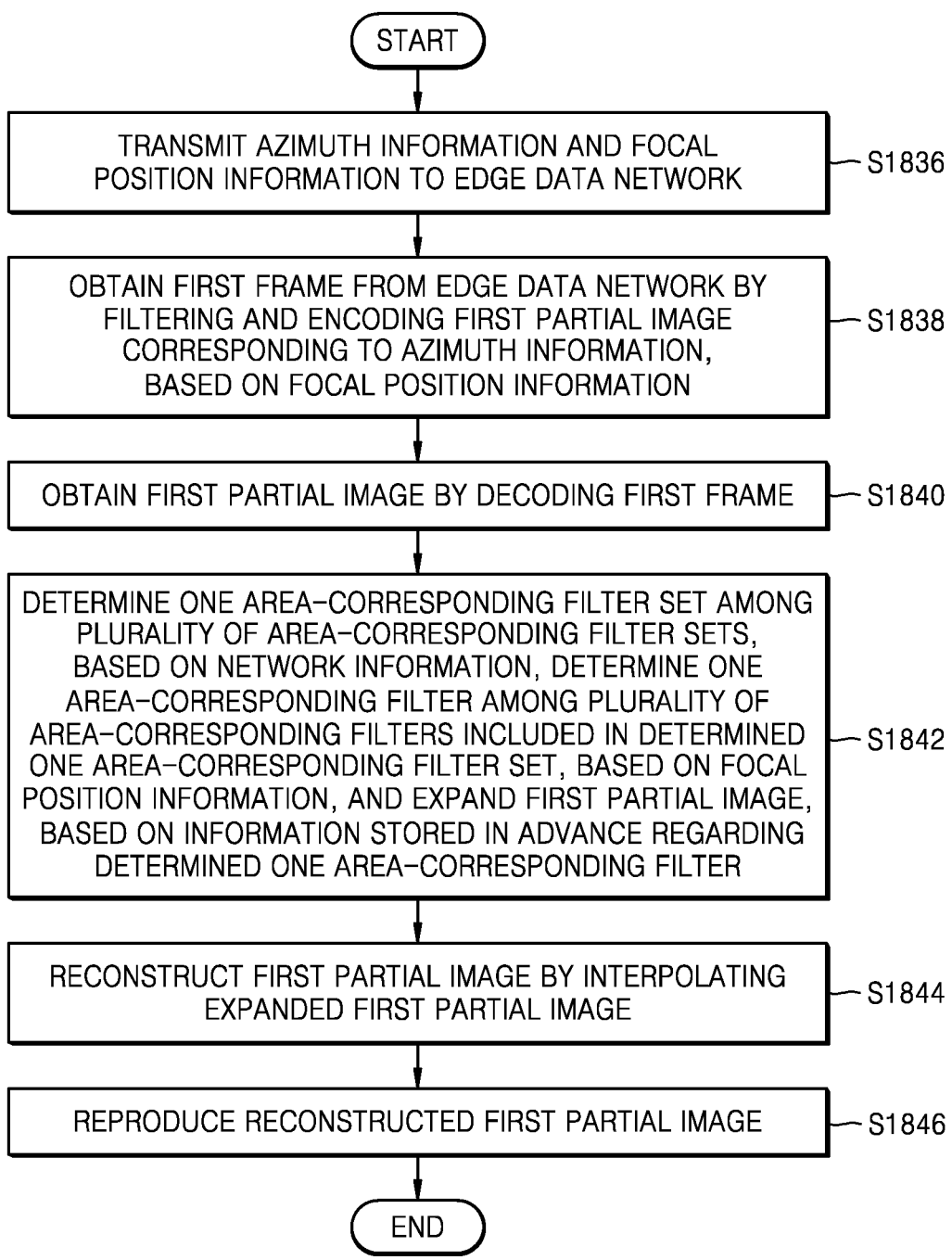
FIG. 18D is a flowchart of a method, performed by an electronic device, of streaming image content obtained from an edge data network, according to various embodiments.

FIG. 18D is a flowchart of a method, performed by an electronic device, of streaming image content obtained from the edge data network 2000, according to various embodiments.

In operation S1836, the electronic device 1000 may transmit azimuth information and focal position information to the edge data network 2000.

In operation S1838, the electronic device 1000 may obtain a first frame from the edge data network 2000 obtained by filtering and encoding a first partial image corresponding to the azimuth information, based on the focal position information.

In operation S1840, the electronic device 1000 may obtain the first partial image by decoding the first frame.

In operation S1842, the electronic device 1000 may determine one area-corresponding filter set among a plurality of area-corresponding filter sets, based on network information, may determine one area-corresponding filter among a plurality of area-corresponding filters included in the determined one area-corresponding filter set, based on the focal position information, and may expand the first partial image, based on information stored in advance regarding the determined one area-corresponding filter.

In operation S1844, the electronic device 1000 may reconstruct the first partial image by interpolating the expanded first partial image.

In operation S1846, the electronic device 1000 may reproduce the reconstructed first partial image.

Figure 19:
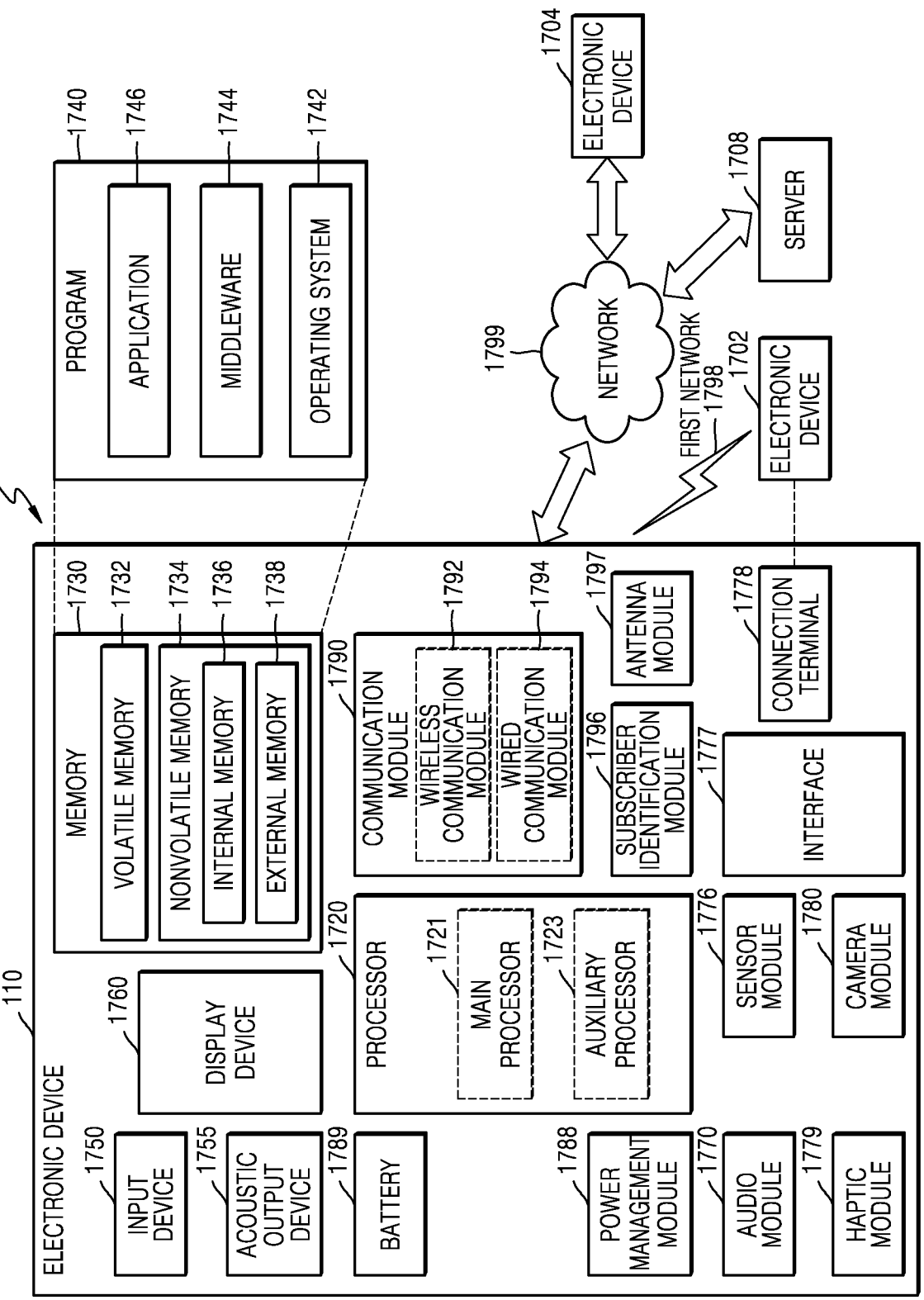
FIG. 19 is a block diagram of an example electronic device according to various embodiments.

FIG. 19 is a block diagram of an example electronic device according to various embodiments.

An electronic device connected to the edge data network of FIGS. 1 through 18 may correspond to an electronic device 110 of FIG. 19. For example, in a network environment 100, the electronic device 110 may communicate with an electronic device 1702 (here, the electronic device includes a VR gaming interface device) via a first network 1798 (e.g., a short-range wireless communication network), or may communicate with an electronic device 1704 or a server 1708 via a second network 1799 (e.g., a long-range wireless communication network). According to an embodiment, the electronic device 110 may communicate with the electronic device 1704 via the server 1708. According to an embodiment, the electronic device 110 may include a processor 1720, a memory 1730, an input device 1750, a sound output device 1755, a display device 1760, an audio module 1770, a sensor module 1776, an interface 1777, a connection terminal 178, a haptic module 1779, a camera module 1780, a power management module 1788, a battery 1789, a communication module 1790, a subscriber identification module 1796, or an antenna module 1797. In various embodiments, in the electronic device 110, at least one (e.g., the display device 1760 or the camera module 1780) of the components may be omitted, or one or more other components may be further included. In various embodiments, some of the components may be implemented by one integrated circuit. For example, the sensor module 1776 (e.g., a fingerprint sensor, an iris sensor, or an illuminance sensor) may be implemented by being embedded in the display device 1760 (e.g., a display).

The processor 1720 may control one or more other components (e.g., hardware or software components) of the electronic device 110 connected to the processor 1720 by executing software (e.g., a program 1740), and may perform various data processing or calculations. According to an embodiment, as at least some of the data processing or calculations, the processor 1720 may load, in a volatile memory 1732, commands or data received from another component (e.g., the sensor module 1776 or the communication module 1790), process the command or data stored in the volatile memory 1732, and store resultant data in a non-volatile memory 1734.

According to an embodiment, the processor 1720 may execute an application client, and, according to the execution of the application client, the processor 1720 may transmit, to the edge data network 2000, a request message for checking a network protocol to be used by the application client. In addition, the processor 1720 may receive, from the edge data network 2000, a response message indicating a network protocol that is to be used by the application client. The processor 1720 may update a network protocol to be used by a UE application, based on the response message. The processor 1720 may select a network socket corresponding to the updated network protocol. The processor 1720 may receive data generated for the application client, from the edge data network 2000, by using the selected network socket.

According to an embodiment, the processor 1720 may include a main processor 1721 (e.g., a CPU or an application processor (AP)) and an auxiliary processor 1723 (e.g., a graphics processing unit (GPU), an image signal processor (ISP), a sensor hub processor, or a communication processor (CP)) that is operable independently of or together with the main processor 1724. Additionally or substitutionally, the auxiliary processor 1723 may be configured to use lower power than the main processor 1721 or to be specialized to a designated function. The auxiliary processor 1723 may be implemented separately from or as part of the main processor 1721.

Instead of the main processor 1721 when the main processor 1721 is in an inactive state (e.g., a sleep state), or together with the main processor 1721 when the main processor 1721 is in an active state (e.g., an application execution state), the auxiliary processor 1723 may control at least some of the functions or states related to at least one component (e.g., the display device 1760, the sensor module 1776, or the communication module 1790) of the components of the electronic device 110. According to an embodiment, the auxiliary processor 1723 (e.g., an image signal processor or a communication processor) may be implemented as a part of functionally related other components (e.g., the camera module 1780 or the communication module 1790).

The memory 1730 may store various data used by at least one component of the electronic device 110 (e.g., the processor 1720 or the sensor module 1776). The data may include, for example, software (e.g., the program 1740) and input data or output data about commands related to the software. The memory 1730 may include the volatile memory 1732 or the non-volatile memory 1734.

The program 1740 may be stored as software in the memory 1730, and may include, for example, an operating system (OS) 1742, middleware 1744, or an application 1746. According to an embodiment, the program 1740 may include the first application client 122 and the second application client 124 of FIG. 1. The program 1740 may include the edge enabler client 130 of FIG. 1.

The input device 1750 may receive a command or data to be used for a component (e.g., the processor 1720) of the electronic device 1710, from the outside (e.g., a user) of the electronic device 110.

The audio output device 1755 may output an audio signal to the outside of the electronic device 110. The sound output device 1755 may include, for example, a speaker. The speaker may be used for general purposes such as multimedia playback or recording playback.

The display device 1760 may visually provide information to the outside of the electronic device 110. The display device 1760 may include, for example, a display, a hologram device, or a projector, and a control circuit for controlling a corresponding device. According to an embodiment, the display device 1760 may include a touch circuitry configured to detect a touch, or a sensor circuit (e.g., a pressure sensor) configured to measure the strength of a force generated by the touch.

The audio module 1770 may convert sound into electrical signals or reversely electrical signals into sound. According to an embodiment, the audio module 1770 may obtain sound through the input device 1750, or may output sound through the sound output device 1755 or an external electronic device (e.g., the electronic device 1702) (e.g., a speaker or a headphone) directly or wirelessly connected to the electronic device 110.

The sensor module 1776 may detect an operation state (e.g., power or a temperature) of the electronic device 110, or an external environment state (e.g., a user state), and may generate an electrical signal or data value corresponding to the detected state. According to an embodiment, the sensor module 1776 may include, for example, a gesture sensor, a gyro sensor, a barometer sensor, a magnetic sensor, an acceleration sensor, a grip sensor, a proximity sensor, a color sensor (e.g., an RGB (red, green, blue) sensor), an infrared (IR) sensor, a biometric sensor, a temperature sensor, a humidity sensor, an illuminance sensor, or sensors related to an autonomous vehicle (e.g., an inertia measurement unit (IMU), a global positioning system (GPS) sensor, a camera, a light imaging detection and ranging (LIDAR) sensor, and a radio detection and ranging (RADAR) sensor).

The interface 1777 may support one or more designated protocols that may be used for the electronic device 110 to be directly or wirelessly connected to an external electronic device (e.g., the electronic device 1702).

The connection terminal 1778 may include a connector through which the electronic device 110 may be physically connected to an external electronic device (e.g., the electronic device 1702).

The haptic module 1779 may convert electrical signals into mechanical stimuli (e.g., vibrations or movements) or electrical stimuli that are perceivable by a user through tactile or motor sensations.

The camera module 1780 may capture a still image and a video. According to an embodiment, the camera module 1780 may include one or more lenses, image sensors, image signal processors, or flashes.

The power management module 1788 may manage the power supplied to the electronic device 1710.

The battery 1789 may supply power to at least one of the components of the electronic device 1710.

The communication module 1790 may establish a direct (e.g., wired) communication channel and/or a wireless communication channel between the mobile device 110 and an external electronic device (e.g., the electronic device 1702, the electronic device 1704, or the server 1708), and may support a communication through an established communication channel. The communication module 1790 may be operated independently of the processor 1720 (e.g., an application processor), and may include one or more communication processors supporting a direct (e.g., wired) communication and/or a wireless communication. According to an embodiment, the communication module 1790 may include a wireless communication module 1792 (e.g., a cellular communication module, a short-range wireless communication module, or a global navigation satellite system (GNSS) communication module), or a wired communication module 1794 (e.g., a local area network (LAN) communication module or a power line communication module). A corresponding communication module among the above communication modules may communicate with an external electronic device through the first network 1798 (e.g., a short-range communication network such as Bluetooth, WiFi Direct, or infrared data association (IrDA)) or the second network 1799 (e.g., a long-range communication network such as a cellular network, the Internet, or a computer network (e.g., a LAN or a wide area network (WAN)). These various types of communication modules may be integrated into one component (e.g., a single chip), or may be implemented as a plurality of separate components (e.g., multiple chips).

The wireless communication module 1792 may verify and authenticate the electronic device 110 in a communication network such as the first network 1798 or the second network 1799 by using subscriber information (e.g., an international mobile subscriber identifier (IMSI)) stored in the subscriber identification module 1796.

The antenna module 1797 may transmit signals or power to the outside (e.g., an external electronic device) or receive the signals or the power from the outside.

At least some of the components may be connected to each other through a communication method between peripheral devices (e.g., a bus, general purpose input and output (GPIO), a serial peripheral interface (SPI), or a mobile industry processor interface (MIPI)) and may mutually exchange signals (e.g., commands or data).

According to an embodiment, the commands or data may be transmitted or received between the electronic device 110 and the external electronic device 1704 through the server 1708 connected to the second network 1799. The electronic devices 1702 and 1704 may be of the same or different type than the electronic device 110.

According to an embodiment, all or some of operations executed in the electronic device 110 may be executed in one or more external electronic devices among the external electronic devices, namely, the electronic devices 1702 and 1704 and the server 1708. For example, when the electronic device 110 needs to perform a function or service automatically or in response to a request from a user or another device, the electronic device 110 may request one or more external electronic devices 1702 and 1704 to perform part or the whole of the function or service, instead of performing the function or service or in addition to performing the function or service. The one or more electronic devices receiving the request may execute at least a portion of the requested function or service or an additional function or service related to the request, and may transmit a result of the execution to the electronic device 110. The electronic device 110 may process the received result without changes or additionally, and provide a processed result as at least a portion of a response to the request. To this end, for example, a cloud computing technology, a distributed computing technology, or a client-server computing technology may be used.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method, performed by an edge data network, of transmitting image content, the method comprising:
obtaining azimuth information and focal position information associated with a user gaze, from an electronic device connected to the edge data network;
determining, based on the focal position information, one filter among a plurality of filters each of which corresponds to an area of an image;
generating a reduced-size first partial image by filtering a first partial image corresponding to the azimuth information using the determined filter and rearranging pixels having data in the filtered first partial image;
generating a first frame by encoding the filtered first partial image; and
transmitting the generated first frame to the electronic device.

2. The method of claim 1, wherein the first partial image is a partial image within a first VR image having a frame index of a VR sequence including a plurality of frames, and the first partial image includes azimuth information indicating a location of the partial image.

3. The method of claim 1, further comprising:
generating information of an area-corresponding filter corresponding to each of a plurality of predetermined areas within an image;
storing the generated information of the plurality of area-corresponding filters; and
transmitting the information of the plurality of area-corresponding filters to the electronic device,
wherein the determining of the one filter among the plurality of filters comprises:
determining one of the plurality of areas of the image, based on the focal position information, and determining an area-corresponding filter corresponding to the determined area,
the generating of the reduced-size first partial image comprises:
filtering the first partial image, based on information stored regarding the area-corresponding filter corresponding to the determined area, and rearranging pixels having data in the filtered first partial image, and
the transmitting of the generated first frame comprises:
transmitting the generated first frame and index information indicating one of the plurality of area-corresponding filters.

4. The method of claim 1, wherein
the obtaining of the azimuth information and the focal position information comprises:
obtaining the azimuth information, the focal position information, and focus movement vector information from the electronic device,
the determining of the one filter among the plurality of filters comprises:
determining one area-corresponding filter among the plurality of area-corresponding filters, based on the focal position information and the focus movement vector information, and
the generating of the reduced-size first partial image comprises:
filtering the first partial image, based on information stored regarding the determined one area-corresponding filter, and rearranging pixels having data in the filtered first partial image.

5. The method of claim 1, wherein
the focal position information comprises first focal position information and second focal position information,
the determining of the one filter among the plurality of filters comprises:

determining one area-corresponding filter among a plurality of area-corresponding filters, based on the first focal position information and the second focal position information, and the generating of the reduced-size first partial image comprises:

filtering the first partial image corresponding to the azimuth information using the determined one filter, and rearranging pixels having data in the filtered first partial image.

6. The method of claim 1, further comprising:

generating information of a plurality of area-corresponding filter sets;

storing the generated information of the generated plurality of area-corresponding filter sets; and transmitting the information of the plurality of area-corresponding filter sets to the electronic device, wherein each of the plurality of area-corresponding filter sets comprises an area-corresponding filter corresponding to each of a plurality of predetermined areas within an image, and wherein the determining of the one filter among the plurality of filters comprises:

determining one area-corresponding filter set among the plurality of area-corresponding filters, based on network information, and determining one area-corresponding filter among a plurality of area-corresponding filters included in the one area-corresponding filter set, based on the focal position information, and the generating of the reduced-size first partial image comprises:

filtering the first partial image corresponding to the azimuth information, based on the determined one area-corresponding filter, and rearranging pixels having data in the filtered first partial image.

7. The method of claim 6, wherein the transmitting of the generated first frame to the electronic device comprises:

transmitting the generated first frame and first index information indicating one area-corresponding filter set from among the plurality of area-corresponding filters to the electronic device.

8. The method of claim 7, wherein the transmitting of the generated first frame and the first index information to the electronic device comprises:

transmitting the generated first frame, the first index information, and second index information indicating one area-corresponding filter included in the one area-corresponding filter set to the electronic device.

9. The method of claim 1, further comprising:

generating information of a plurality of area-corresponding filter sets;

storing the generated information of the generated plurality of area-corresponding filter sets; and transmitting the information of the plurality of area-corresponding filter sets to the electronic device, each of the plurality of area-corresponding filter sets comprises an area-corresponding filter corresponding to each of a plurality of predetermined areas within an image, the obtaining of the azimuth information and the focal position information comprises:

obtaining the azimuth information, the focal position information, and focus movement vector information from the electronic device, the determining of the one filter among the plurality of filters comprises:

determining one area-corresponding filter set among the plurality of area-corresponding filters, based on the focal position information and the focus movement vector information, and determining one area-corresponding filter among a plurality of area-corresponding filters included in the one area-corresponding filter set, based on the focal position information, and the generating of the reduced-size first partial image comprises:

filtering the first partial image corresponding to the azimuth information, based on the determined one area-corresponding filter, and rearranging pixels having data in the filtered first partial image.

10. The method of claim 3, wherein:

a number of coefficients greater than or equal to a first value in a filter applied to a predetermined area corresponding to the area-corresponding filter is greater than a number of coefficients greater than or equal to the first value in a filter applied to an area except for the predetermined area.

11. The method of claim 10, wherein:

overlapping areas are included between predetermined areas corresponding to area-corresponding filters.

12. An edge data network for transmitting image content to an electronic device, the edge data network comprising:

a network interface;

a memory storing one or more instructions; and at least one processor configured to execute the one or more instructions, wherein the at least one processor is configured to execute the one or more instructions to:

obtain azimuth information and focal position information associated with a user gaze, from an electronic device connected to the edge data network;

determine, based on the focal position information, one filter among a plurality of filters each of which corresponds to an area of an image;

generate a reduced-size first partial image by filtering a first partial image corresponding to the azimuth information using the determined filter and rearranging pixels having data in the filtered first partial image;

generate a first frame by encoding the filtered first partial image; and transmit the generated first frame to the electronic device.

13. The edge data network of claim 12, wherein at least one processor is configured to execute the one or more instructions to:

generate information of an area-corresponding filter corresponding to each of a plurality of predetermined areas within an image;

store the generated information of the plurality of area-corresponding filters;

transmit the information of the plurality of area-corresponding filters to the electronic device;

when determining one filter among a plurality of filters, determine one of the plurality of areas of the image, based on the focal position information, and determine an area-corresponding filter corresponding to the determined area;

when generating the reduced-size first partial image, filter the first partial image, based on information stored regarding the area-corresponding filter corresponding to the determined area and rearrange pixels having data in the filtered first partial image; and when transmitting the generated first frame,
    transmit the generated first frame and index information indicating one of the plurality of area-corresponding filters.

14. The edge data network of claim 13, wherein the at least one processor is configured to execute the one or more instructions to:
when obtaining azimuth information and focal position information,
    obtain the azimuth information, the focal position information, and focus movement vector information from the electronic device;
when determining one filter among a plurality of filters,
    determine one area-corresponding filter among the plurality of area-corresponding filters and the focus movement vector information; and
when generating the reduced-size first partial image,
    filter the first partial image, based on information stored regarding the determined one area-corresponding filter and rearrange pixels having data in the filtered first partial image.

15. A non-transitory computer-readable recording medium having recorded thereon a program, which, when executed by a computer, controls an edge data network to perform operations comprising:
    obtaining azimuth information and focal position information associated with a user gaze, from an electronic device connected to the edge data network;
    determining, based on the focal position information, one filter among a plurality of filters each of which corresponds to an area of an image;
    generating a reduced-size first partial image by filtering a first partial image corresponding to the azimuth information by using the determined filter and rearranging pixels having data in the filtered first partial image;
    generating a first frame by encoding the filtered first partial image; and
    transmitting the generated first frame to the electronic device.

* * * * *